United States Patent
Li et al.

(10) Patent No.: US 12,061,485 B2
(45) Date of Patent: Aug. 13, 2024

(54) METHOD AND APPARATUS FOR ENSURING AVIATION SAFETY IN THE PRESENCE OF OWNSHIP AIRCRAFT

(71) Applicant: SEAMATICA AEROSPACE LTD., St. John's (CA)

(72) Inventors: Yake Li, Ottawa (CA); Siu Donald O'Young, St. John's (CA); Maged E. Beshai, Maberly (CA)

( * ) Notice: Subject to any disclaimer, the term of this patent is extended or adjusted under 35 U.S.C. 154(b) by 484 days.

(21) Appl. No.: 17/080,814

(22) Filed: Oct. 26, 2020

(65) Prior Publication Data

US 2021/0124375 A1   Apr. 29, 2021

Related U.S. Application Data

(60) Provisional application No. 62/925,806, filed on Oct. 25, 2019.

(51) Int. Cl.
| | |
|---|---|
| *G05D 1/00* | (2024.01) |
| *G08G 5/00* | (2006.01) |
| *G08G 5/04* | (2006.01) |

(52) U.S. Cl.
CPC .......... *G05D 1/1064* (2019.05); *G05D 1/042* (2013.01); *G08G 5/0013* (2013.01); *G08G 5/0039* (2013.01); *G08G 5/045* (2013.01)

(58) Field of Classification Search
CPC .... G05D 1/1064; G05D 1/042; G08G 5/0013; G08G 5/0039; G08G 5/045; G01S 13/765; G01S 13/886; G01S 13/933
See application file for complete search history.

(56) References Cited

U.S. PATENT DOCUMENTS

| | | | | |
|---|---|---|---|---|
| 2,588,916 | A | * | 3/1952 | Field ......................... G01S 1/02 |
| | | | | 342/52 |
| 3,895,382 | A | * | 7/1975 | Litchford .............. G01S 13/781 |
| | | | | 342/455 |
| 4,027,307 | A | * | 5/1977 | Litchford .............. G01S 13/781 |
| | | | | 342/39 |
| 4,109,248 | A | | 8/1978 | Knowles et al. |
| 4,115,771 | A | | 9/1978 | Litchford |

(Continued)

OTHER PUBLICATIONS

Shiomi et al, "Development of Mobile Passive Secondary Surveillance Radar", ICAS 2012, 28th International Congress of the Aeronautical Sciences, pp. 1-6.

(Continued)

*Primary Examiner* — Frederick M Brushaber
(74) *Attorney, Agent, or Firm* — IP-MEX Inc.; Victoria Donnelly

(57) ABSTRACT

A method and apparatus for enhancing aviation safety, ensuring that unmanned aircraft remain well clear of other flying objects, are disclosed. A control station acquires a direction of a path of a flying object and periodically transmits requests to a transponder of the flying object to acquire specific data. Upon receiving a response to a request, a range of the flying object from the control station is determined. Using data acquired from each three consecutive responses, the displacement magnitude, the speed, and angular displacements of the flying object are determined. The method assesses potential crossing of a protection zone surrounding a protected aircraft based on most recent acquired data.

20 Claims, 41 Drawing Sheets

(56) References Cited

U.S. PATENT DOCUMENTS

| | | | | |
|---|---|---|---|---|
| 4,128,839 | A | * | 12/1978 | McComas ............... G01S 13/78 |
| | | | | 342/32 |
| 4,293,857 | A | * | 10/1981 | Baldwin ............... G01S 13/933 |
| | | | | 342/38 |
| 4,319,243 | A | | 3/1982 | Vachenauer et al. |
| 4,418,349 | A | | 11/1983 | Hofgen et al. |
| 4,782,450 | A | | 11/1988 | Flax |
| 4,910,526 | A | * | 3/1990 | Donnangelo ......... G01S 13/781 |
| | | | | 342/455 |
| 5,075,694 | A | * | 12/1991 | Donnangelo ......... G01S 13/933 |
| | | | | 342/455 |
| 5,173,706 | A | | 12/1992 | Urkowitz |
| 5,196,856 | A | | 3/1993 | Litchford et al. |
| 5,198,823 | A | | 3/1993 | Litchford |
| 5,223,847 | A | * | 6/1993 | Minter ................. G01S 13/762 |
| | | | | 342/417 |
| 5,239,310 | A | * | 8/1993 | Meyers, deceased ...................... |
| | | | | G01S 13/933 |
| | | | | 342/55 |
| 5,506,590 | A | * | 4/1996 | Minter ................. G01S 13/762 |
| | | | | 342/417 |
| 6,285,318 | B1 | | 9/2001 | Schoen |
| 6,344,820 | B1 | | 2/2002 | Shiomi et al. |
| 6,985,103 | B2 | | 1/2006 | Ridderheim et al. |
| 7,570,194 | B2 | | 8/2009 | Galati |
| 7,800,541 | B2 | | 9/2010 | Moshfeghi |
| 9,218,741 | B2 | | 12/2015 | Wu |
| 9,250,317 | B1 | | 2/2016 | Wang |
| 9,291,699 | B2 | | 3/2016 | Sadr et al. |
| 9,734,723 | B1 | | 8/2017 | Bruno et al. |
| 10,743,141 | B2 | | 8/2020 | Fairbanks et al. |
| 2008/0039988 | A1 | * | 2/2008 | Estabrook ............ G08G 5/0013 |
| | | | | 701/14 |
| 2013/0009823 | A1 | | 1/2013 | Wang |
| 2013/0176163 | A1 | | 7/2013 | Margolin |
| 2015/0331099 | A1 | | 11/2015 | Wu |
| 2016/0025849 | A1 | | 1/2016 | Wang |
| 2016/0033630 | A1 | | 2/2016 | Harvey |
| 2018/0172797 | A1 | | 6/2018 | Hauswald et al. |
| 2018/0204469 | A1 | * | 7/2018 | Moster ................. G08G 5/0069 |

OTHER PUBLICATIONS

Shiomi et al, "Development of Passive Surveillance Radar", ICAS 2014, 29th Congress of the International Council of the Aeronautical Sciences, pp. 1-9.

DO-365 "Minimum Operational Performance Standards (MOPS) for Detect and Avoid (DAA) System", Appendix C, RTCA, May 31, 2017, pp. C1-C6.

"Minimum Operational Performance Standards for Air Traffic Control Radar Beacon System / Mode Select (ATCRBS / Mode S) Airborne Equipment", RTCA, Inc., RTCA DO-181E, Washington, DC, Mar. 17, 2011.

RTCA Paper No. 256-20/SC228-076, "Minimum Operational Performance Standards (MOPS) for Detect and Avoid (DAA) Systems", RTCA DO-365-B, Prepared by SC-228 (Sep. 16, 2020), online: www.rtca.org.

* cited by examiner

METHOD AND APPARATUS FOR ENSURING AVIATION SAFETY IN THE PRESENCE OF OWNSHIP AIRCRAFT

CROSS-REFERENCE TO RELATED APPLICATIONS

The present application claims the benefit from U.S. provisional application 62/925,806 entitled "TRANSPONDER POSITIONING SYSTEM USING ACTIVE INTERROGATION SIGNAL OF AN OMNI-DIRECTIONAL ANTENNA AND METHOD THEREFOR", filed on Oct. 25, 2019, the content of which is incorporated herein by reference in its entirety.

FIELD OF THE INVENTION

The invention relates to ensuring aviation safety in the presence of unmanned aircraft.

BACKGROUND

A manned aircraft is typically equipped with mode A/C/S transponder. The position of a transponder may be determined with the help of a secondary surveillance radar ("SSR") system. It is difficult to determine the position of the transponder outside of the range of SSR coverage. The position of the transponder equipped aircraft is difficult to determine without SSR.

A prior art method employs three broadcasting stations, each having an omni-directional antenna. The intersection of the broadcast range of the three omni-directional antennas is used to pinpoint the position of an aircraft. The transmission time of each station should be determined precisely to avoid ambiguity.

Comparatively, a traffic collision avoidance system (TCAS) is a mid-air collision avoidance system imitating the SSR principle, which is designed to operate outside the range of SSR, or with the absence SSR. However, TCAS cannot be used on the ground, and only covers a limited range.

Therefore there is a need for an improved mode A/C/S transponder single-station positioning system which can operate outside the range of SSR coverage of an airport, and may be employed on the ground with a full range of coverage.

SUMMARY OF THE INVENTION

There is an object of the invention to provide methods and apparatus for ensuring aviation safety in the presence of ownship aircraft.

According to one aspect of the invention, there is provided a method of determining a position of a flying object, comprising:
  transmitting an interrogation signal from an omni-directional antenna located at a control station;
  at the control station, detecting a reply signal from a transponder of the flying object, and determining an instantaneous range of the flying object;
  obtaining a heading of the flying object, resulting in two possible paths for the flying; and
  at the control station, detecting an angle of arrival of the reply signal by an antenna arrangement, thereby discriminating between the two possible paths, and determining the position of the flying object.

In the method described above, the control station is one of:
  a ground control station; and
  a control station, which equipment is at least partially disposed at an aircraft.
The method further comprises:
  disregarding the flying object provided an altitude of the flying object is either above or below a protection volume surrounding a specific aircraft;
  where the altitude of the flying object is between the lowest and highest altitudes of the boundary of the protection volume:
    determining a minimum time interval for the flying object to reach the protection volume;
    disregarding the flying object subject to a determination that the minimum time interval is longer than a remainder of preassigned operation time of the specific aircraft; and
    applying further measures for ensuring the specific aircraft remains well clear of a flying object subject to a determination that the minimum time interval is not longer than the preassigned operation time.

In the method described above, the step of applying comprises:
  determining a sufficient time for the flying object to reach the protection volume, and
  disregarding the flying object subject to a determination that the sufficient time is longer than the remainder of the preassigned operation time of the specific aircraft;
  otherwise performing at least one of:
    altering an altitude of the specific aircraft before the flying object reaches the protection volume; and
    implementing avoidance measures.

The method further comprises updating coordinates and boundary of the protection volume based on tracking the specific aircraft.

According to another aspect of the invention, there is provided a method of ensuring a specific aircraft remains well clear of a flying object, the method comprising:
  acquiring a direction of the path for the flying object;
  periodically transmitting from a control station requests to a transponder of the flying object to acquire an altitude of the flying object;
  determining, upon receiving a response to each request:
    a round trip delay between the control station and the flying object;
    a span of the flying object from the control station; and
    length of projected position vector of the flying object onto a flight plane;
  determining for three most recent positions of the flying object:
    displacement magnitude of the flying object;
    speed of the flying object; and
    angular displacements of the projected position vectors from the path of the flying object;
  determining most recent position of the flying object according to a respective span, angular displacement, and said direction;
  defining a protection zone surrounding the specific aircraft; and
  assessing potential crossing of the protection zone by the flying object according to said most recent object position, speed, and said direction.

The method further comprises:
  selecting the protection zone as a sphere;
  determining a top horizontal tangential plane and a bottom horizontal tangential plane of the sphere;

determining an intersection circle of the flight plane of the flying object with the sphere subject to a determination that the flight plane is bounded between the bottom and top horizontal tangential planes.

The method further comprises determining a permissible distance D* between the flying object and any point of the intersection circle based on the speed of the flying object and a remaining operation time T* of the specific aircraft.

The method further comprises:
determining a first circular contour of the position of the flying object within the flight plane based on the span of the flying object at a first time instant;
determining a second circular contour of another position of the flying object within the flight plane based on the span of the flying object at a subsequent second time instant;
determining a shifted circular contour of the first circular contour according to the displacement vector of the flying object between the first time instant and the second time instant;
and determining two candidate object positions as the intersection points of the shifted contour and the second circular contour.

The method further comprises employing an antenna arrangement, collocated with the control station, for identifying one of the candidate positions as an actual position of the flying object.

The method further comprises:
automatically specifying a radius $\rho$, and an altitude $H_p$ of the center, of a sphere based on tracking the specific aircraft; and
indicating safety of the path of the flying object subject to a determination that a current altitude, H, of the flying object satisfies one of the conditions: $H<(Hp-\rho)$ or $H>(H_p+\rho)$.

The method further comprises:
determining a lower bound of the distance between the flying object and the intersection circle; and
indicating safety of the path of the flying object subject to a determination that the lower bound exceeds the permissible distance D*.

The method further comprises:
determining a projected position vector of the actual position of the flying object onto the flight plane;
determining a heading vector of the flying object based on the direction of the flying object;
determining a dot product of the heading vector and the projected position vector;
indicating safety of the path of the flying object subject to a determination that the dot product is not negative.

The method further comprises:
determining two tangential lines from the flying object to the intersection circle, an interior angle of the two tangential lines being less than $\pi$ radians; and
indicating safety of the path of the flying subject to a determination that the path is outside the interior angle.

The method further comprises:
computing two intersection points of the path of the flying object and the intersection circle; and
indicating safety of the path of the flying object subject to a determination that the computing of the intersection points yields non-real numbers.

The method further comprises:
determining distances $D_1$ and $D_2$ between the flying object and the two intersection points subject to a determination the computing the two intersection points are real numbers;

indicating safety of the path of the flying subject to a determination that the smaller of $D_1$ and $D_2$ is greater than the permissible distance D*;

otherwise:
determine a corrective action based on the position of the flying object and the position of the specific aircraft; and
sending instructions from the control station to a controller of the specific aircraft to apply a corrective action.

According to yet another aspect if the invention, there is provided an apparatus for ensuring a specific aircraft remains well clear of a flying object, the method comprising:
a communications assembly comprising:
an airband radio for acquiring a direction of the path for the flying object; and
an interrogation unit for periodically transmitting from a control station requests to a transponder of the flying object to acquire an altitude of the flying object;
an interrogation control unit for determining, upon receiving a response to each request:
a round trip delay between the control station and the flying object;
a span of the flying object from the control station; and
length of projected position vector of the flying object onto a flight plane;
an algorithm-processing unit for determining for three most recent positions of the flying object:
displacement magnitude of the flying object;
speed of the flying object; and
angular displacements of the projected position vectors from the path of the flying object;
most recent position of the flying object according to a respective span, angular displacement, and said direction;
a protection zone surrounding the specific aircraft; and
potential crossing of the protection zone by the flying object according to said most recent object position, speed, and said direction.

In the apparatus described above, the algorithm-processing unit is configured to:
select the protection zone as a sphere;
determine a top horizontal tangential plane and a bottom horizontal tangential plane of the sphere; and
determine an intersection circle of the flight plane of the flying object with the sphere subject to a determination that the flight plane is bounded between the bottom and top horizontal tangential planes.

In the apparatus described above, the algorithm-processing unit is further configured to determine a permissible distance D* between the flying object and any point of the intersection circle based on the speed of the flying object and a remaining operation time T* of the specific aircraft.

The apparatus further comprises:
automatically specifying a radius $\rho$, and an altitude $H_p$ of the center, of a sphere based on tracking the specific aircraft; and
indicating safety of the path of the flying object subject to a determination that a current altitude, H, of the flying object satisfies one of the conditions: $H<(Hp-\rho$ or $H>(H_p+\rho$.

Thus, the improved methods and apparatus for determining a position of the flying object and ensuring the aviation safely in the presence of the ownship have been provided.

BRIEF DESCRIPTION OF THE DRAWINGS

Embodiments of the present invention will be further described with reference to the accompanying exemplary drawings, in which.

TERMINOLOGY

Figure 1:
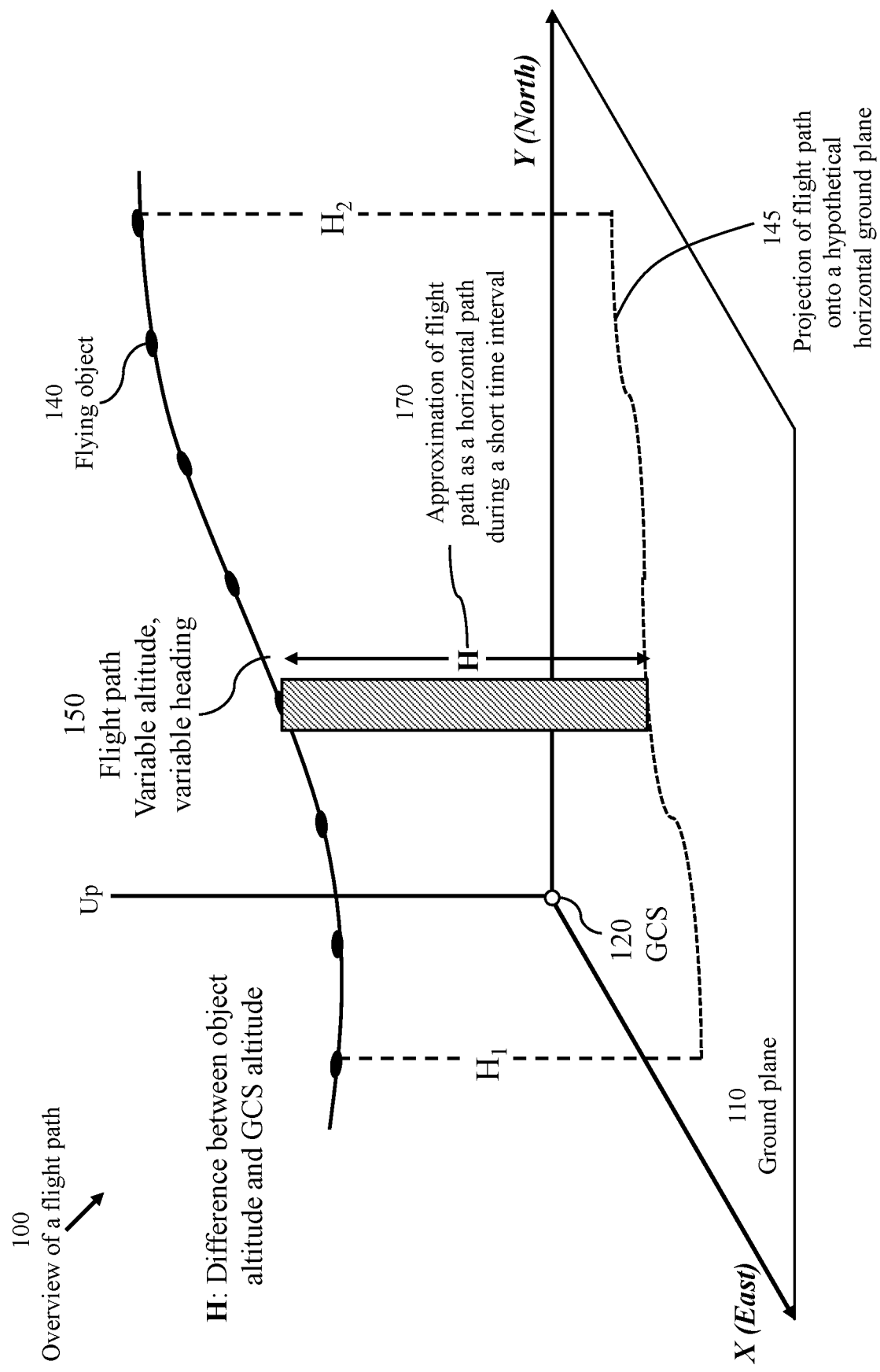
FIG. 1 illustrates flight path of a flying object, hereinafter referenced as an "object"; the path being treated as piecewise linear within a horizontal plane.

The terms "Ground control station" and "control station" are used anonymously in terms of the equipment required for implementing the present invention, however the control station may be located at an Ownship.

The terms "flying object", "object", and "intruder" are used synonymously.

The terms "range" and "span" are used synonymously.

The terms "Unmanned Aerial Vehicle" (UAV) and "Unmanned Aircraft" (UA) are used synonymously. Although the disclosed features are described with reference to unmanned aircraft, the features also apply to a piloted aircraft. The term "Ownship" is used to refer to an Unmanned Aerial Vehicle, an Unmanned Aircraft, or a piloted aircraft.

The term "protection time interval" and "Operational time interval" are used synonymously.

The term "remaining protection time interval" or "remaining operational time interval refer a remaining time of a mission of an ownship aircraft. Thus, assessing safety for the case of a UA which is assigned a mission of a 10-minute duration would be initially based on a protection time interval of 10 minutes but based on a protection time interval of 4 minutes six minutes later.

The term "object displacement" refers to a vector within a horizontal flight plane connecting positions of a flying object at consecutive two positions.

REFERENCE NUMERALS

100: Overview of a flight path
110: Horizontal ground plane
120: Ground control station (GCS) represented as a point
140: Flying object
145: Projection of flight path onto the horizontal ground plane
150: Flight path of variable altitude and variable heading
170: Approximation of flight path as a horizontal path during a relatively short period of time
200: Object proximity to a protection zone
240: Protection zone defined as a sphere of a predefined radius
300: Flight path during a specific time interval
320: Horizontal flight plane
340: Linear flight path
350: Tracking plane of the GCS 120 (represented as a point) and the linear flight path 340
400: Processes of acquiring flight data
410: Process of selecting a cyclic interrogation time interval (Δt)
420: Process of updating location and size of the protection zone 240
430: Process of periodically communicating with a transponder of the object to acquire the altitude of the object and determine the range of the object (the radial distance between the GCS represented as a point)
440: Process of verifying whether the object's heading (flight direction) has already been acquired
450: Process of determining whether the object's heading is needed for assessing the risk of the object crossing the protection zone
460: Process of communicating with a pilot of the flying object to acquire the heading
500: Processes of periodic update of flight-speed calculation according to a first method
510: Process of computing the magnitude of the displacement, d, of the object during successive interrogation time intervals based on two range values and corresponding radial velocities of the object (510A, 510B corresponding to the indicated two interrogation intervals of FIG. 5)
540: Computed radial velocity, $Q_k$, of object corresponding to current object range $R_k$, k being the index of a current interrogation; radial-velocity values, $Q_{(k-1)}$, $Q_{(k-2)}$, $Q_{(k-3)}$, etc., corresponding to range values $R_{k-1}$, $R_{k-2}$, $R_{k-3}$, etc., determined as a result of previous interrogations, are referenced as 541, 542, 543, 544, etc.
600: Processes of periodic update of flight-speed calculation according to a second method
610: Process of computing the magnitude of the displacement, d, of the object during successive interrogation time intervals based on three range values (610A, 610B corresponding to the indicated two interrogation intervals of FIG. 6)
700: First method of determining speed of the object (magnitude of the velocity but not the direction)
710: Altitude of object during tracking period
712: First position of the object
714: Second position of the object after an interrogation interval Δt
780: Unknown angular displacement of flight direction (with respect to the North direction)
800: Details of the first method of determining speed of the object (tracking-plane representation)
900: Second method of determining speed of the object (magnitude of the velocity but not the direction)
910: Altitude of flight plane 320
920: Position of object; 920A, 920B, and 920C correspond to positions at Δt time intervals apart
930: Position vector of object; 930A, 930B, and 930C correspond to positions 920A, 920B, and 920C, respectively
940: Projection of position vector onto ground plane 110; 940A, 940B, and 940C correspond to position vectors 930A, 930B, and 930C, respectively
1000: Details of the second method of determining speed of the object (tracking-plane representation)
1100: Potential object positions corresponding to a set of values (magnitude only) of object's position vectors
1150: A first potential heading corresponding to a displacement of magnitude d and a set $\{R_1, R_2, R_3\}$ of magnitudes of position vectors of the object at positions 1110, 1112, and 1114
1160: A second potential heading corresponding to the displacement magnitude d and a set $\{R^{(1)}, R^{(2)}, R^{(3)}\}$ of magnitudes of position vectors of the object at positions 1120, 1122, and 1124, where $R_1 = R^{(1)}$, $R_2 = R^{(2)}$, $R_3 = R^{(3)}$.

1200: Projection of position vectors of the object onto the flight plane (or the ground plane), and computation of the object's position vector based on an acquired heading of the object, for a specific flight path

1300: Beam antennas

1400: Determination of two positions of the object based on values of the object's range at two distinct time instants and computed displacement vector, for a first case where the object moves away from the GCS

1410: Magnitude of the object displacement vector

1420: Angular displacement with respect to the North direction

1430: Contour of potential positions of the object within the flight plane at a given instant of time ($\tau + \Delta t$)

1435: Shifted contour 1430 where each potential object position undergoes a shift of magnitude d and angle $\Gamma$ with respect to the North direction

1440: Contour of potential positions of the object within the flight plane at a time instant ($\tau + 2 \times \Delta t$)

1432: First position of the object at time ($\tau + \Delta t$)

1434: Second position of the object at time ($\tau + \Delta t$)

1442: First intersection point of shifted contour 1435 and contour 1440

1444: Second intersection point of shifted contour 1435 and contour 1440

1500: Determination of two positions of the object based on values of the object's range at two distinct time instants and computed displacement vector, for a second case where the object moves away from the GCS

1600: Determination of two positions of the object based on values of the object's range at two distinct time instants and computed displacement vector, for a third case where the object moves away from the GCS

1700: Determination of two positions of the object based on values of the object's range at two distinct time instants and computed displacement vector, for a first case where the object moves towards the GCS

1800: Determination of two positions of the object based on values of the object's range at two distinct time instants and computed displacement vector, for a second case where the object moves towards the GCS

1900: Determination of two positions of the object based on values of the object's range at two distinct time instants and computed displacement vector, for a third case where the object moves towards the GCS

2000: Overview of a safety-assessment method of determining potential risk of the object crossing the protection zone

2010: Process of determining the altitude H and three values $R_1$, $R_2$, and $R_3$ of object's range at distinct time intervals

2012: Computation of the magnitude of the object's velocity

2020: Process of updating position, radius, and duration of protection sphere

2030: Process of applying the criterion of the first filter (Filter-I)

2040: Process of applying the criterion of the second filter (Filter-II)

2050: Process of indicating safe object trajectory

2060: Process of communicating with the object to acquire heading information (angle $\Gamma$, angular displacement from the North direction)

2064: Process of determining coordinates ($x_0$, $y_0$) of the object within the flight plane according to current values of $R_1$, $R_2$, $R_3$, H, and $\Gamma$

2070: Computation of the dot product of the position vector of the object and the heading vector

2080: Process of indicating safe object trajectory or applying further assessment criteria

2090: Process of applying criteria of subsequent filters (Filter-IV then Filter-V, or Filter-V directly)

2100: Protection apparatus

2180: Process of indicating safe object's path

2190: Process of invoking corrective action

2200: Filter-I criterion

2212: Known object altitude (first case, 2212A/second case 221B)

2220: Current protection zone 240 (sphere of radius $\rho$, center-coordinates $x_p$, $y_p$, $H_p$)

2221: Altitude of lowest tangential horizontal plane of the current protection zone

2222: Altitude of highest tangential horizontal plane of the current protection zone

2230: First safe space

2240: Second safe space

2300: Intersection of flight plane 320 and protection zone

2310: Projection of protection sphere onto vertical Y-U plane

2312: First intersection level (altitude $h_1$)

2314: Second intersection level (altitude $h_2$)

2316: Third intersection level (altitude $h_3$)

2320: Projection of protection sphere onto flight-plane 320

2322: Intersection circle of radius $\eta_1$ and altitude $h_1$

2324: Intersection circle of radius $\eta_2$ and altitude $h_2$

2326: Intersection circle of radius $\eta_3$ and altitude $h_3$

2400: Filter-II criterion

2410: Known radius $r^*$ of circular contour within flight plane 320

2412: (2412A, 2412B, 2412C, 2412D, 2412E, 2412F) potential positions of object of a contour of center (0,0) and radius $r^*$

2416: Projection circle of protection sphere onto the flight plane 320

2420: Circle of intersection of the protection sphere and the flight plane 320

2421: Radius $P_1$ of inner circle of center (0,0) that is tangential to the projection circle 2420

2422: Radius $P_2$ of outer circle of center (0,0) that is tangential to the projection circle 2420; $P_2 = P_1 + 2 \times \rho$

2430: Center of projection circle 2420

2500: Filter-II details

2600: Filter-III criterion for assessing potential object crossing of the protection zone, based on the dot product of the position vector of the object and the object's heading

2610: (2610A to 2610G) Position vector of object

2620: (2620A to 2620G) unit vector of heading

2700: object's path potential crossing of the protection zone;

2710: Objects coordinates within flight plane 320

2712: Current range of object

2720: Intersection circle of protection sphere within flight plane 320

2730: Coordinates ($x_p$, $y_p$) of the center of the intersection circle

2740: Radius $\eta$ of the circle of intersection, $0 < \eta \le \rho$

2750: Object's path

2760: Coordinates $(x_2, y_2)$ of a first intersection point of object's path 2750 and intersection circle 2720

2770: Coordinates $(x_2, y_2)$ of a first intersection point of object's path 2750 and intersection circle 2720

2800: Projection onto the flight plane 320 of a tangent cone of the spherical protection zone, the apex of the cone being a current position of the object

2810: A first tangential line of the intersection circle 2720 from the projection of the object onto the flight plane 320 (coordinates $(x_0, y_0)$)

2820: A second tangential line of the intersection circle 2720 from the projection of the object onto the flight plane 320 (coordinates $(x_0, y_0)$)

2900: Filter-IV criterion for assessing potential object crossing of the protection zone, based on presence, or otherwise, of the line of flight within the tangent cone

3000: Details of Filter-IV

3010: A first tangential line of the intersection circle 2720 from the projection of the object (coordinates $(x_0, y_0)$) onto the flight plane 320, the first tangential line defining a first boundary of the projection of the tangent cone

3020: A second tangential line of the intersection circle 2720 from the projection of the object (coordinates $(x_0, y_0)$) onto the flight plane 320, the second tangential line defining a boundary of the projection of the tangent cone

3030: Projection onto the flight plane of a first object's path exterior to the tangent cone

3040: Projection onto the flight plane of a second object's path exterior to the tangent cone

3100: Acquisition of data, through communication with the object, including altitude and round-trip delay, to be used for determining current speed of the object

3110: Process of communicating with a transponder of the object at three distinct, consecutive, time instants, for acquiring flight altitude, and measuring respective round-trip delays, the time instants are preferably evenly spaced, sent at time instants $\tau$, $(\tau+\Delta t)$, $(\tau+2\times\Delta t)$

3120: Process of computing values $R_1$, $R_2$, and $R_3$ of the object range at the three time-instants based on the round-trip delays

3130: Step of determining the altitude H of the object based on the responses from the transponder

3140: Computation of projections $r_1$, $r_2$, and $r_3$ of $R_1$, $R_2$, and $R_3$ onto the flight plane 320

3150: Process of determining object displacement magnitude, d, during each time interval $\Delta t$

3160: Computation of the magnitude, d, and magnitude of velocity $|V|$

3200: Process determining the position of the object

3220: Process of acquiring heading data from the object

3240: Computation of angular displacement the flight heading from position vectors of the object

3260: Computation of coordinates of object

3300: Process of defining a protection zone as a spherical zone of a specified center and radius

3320: Process of selecting a radius $\rho$ and center coordinates $(x_p, y_p, H_p)$ of a protection sphere

3340: Process of specifying corresponding protection duration T*

3360: Determining permissible distance D* to border of the protection sphere

3400: An algorithm for protection-zone safety assessment based on partial data acquired from a transponder of the object

3410: Process of determining a current altitude H* and a current range R* of the object according to either of the methods of FIG. 7 and FIG. 9

3420: Computing projection r* of R* on flight plane 320 (or ground plane 110)

3430: Process of applying the criterion of Filter-I

3440: A process of indicating a safe object trajectory with respect to the protection zone

3450: A process of computing the radius $\eta$, $0<\eta\leq\rho$, of the intersection circle of the flight plane 320 and the protection sphere

3460: Process of applying the criterion of Filter-II

3462: Computation of current proximity of object to protection sphere

3464: Process of determining whether further safety assessment is needed

3470: Process of applying Filter-III criterion

3500: Details of the criterion of Filter-III (invoked in process 3470)

3520: Process of determining the current relative position-vector of the object with respect to the center of the protection sphere

3530: Determining a heading unit vector based on heading data received from a pilot of the object

3540: Process of computing a dot product $\chi$ of the relative position vector and the heading unit vector

3550: Process of determining whether further safety assessment is needed

3560: Process of indicating a safe object trajectory

3570: Process of applying Filter-IV criterion

3600: Overview of Filter-IV criterion

3620: Process of determining boundaries of a tangent cone of the spherical protection sphere with the current object position as the apex of the cone

3640: A process of determining whether the flight path is within the tangent cone

3670: Process of indicating a safe object trajectory

3680: Process of applying Filter-V criterion

3700: Details of the criterion of Filter-IV (invoked in process 3570)

3720: Computing the distance $\Lambda$ between the object and the center of the circle of intersection of the flight plane 320 and the protection sphere

3730: Computing the angle $\Theta$ between the line from the object to the center of the circle of intersection and the X-axis (East direction)

3740: Computing the angle $\Phi$ between the line from the object to the center of the circle of intersection and either tangent from the object to the circle of intersection

3750: Process of applying a condition for the object trajectory to be within the tangent cone

3800: Filter-V criterion

3820: Process of determining two intersection points of object trajectory and protection sphere

3830: Process of determining whether the computed intersection points are real numbers

3840: Process of indicating a safe object trajectory

3850: Process of determining distances $D_1$ and $D_2$ within flight plane 320 between the object and the two intersection points

3880: Process of determining whether the smaller of the two distances $D_1$ and $D_2$ is larger than the permissible distance D*

3890: Process of determining a corrective action

3910: A communication assembly

3920: A parameter-storage medium

3930: A memory device 3930
3940: An interrogation control unit
3950: A range calculator
3960: A voice unit
3970: GPS unit
3980: An algorithm-processing unit
3990: Processor
4011: Receiver
4012: An interrogation unit
4013: Airband radio
4011A: A directional antenna
4012A: Omni-directional antennas
4013A: Omni-directional antennas
4181: An algorithm selector
4182: Filter (five filters 4182A to 4182E)
4185: Angle-of-arrival unit
4186: Tracking unit

DETAILED DESCRIPTION

FIG. 1 depicts an overview 100 of a flight path 150 of a flying object 140, hereinafter referenced as an "object". The flight path 150 generally has a variable altitude and variable heading. Successive segments of the path are treated as piece-wise linear within a horizontal plane. A horizontal ground plane 110 is defined according to the altitude of a ground control station (GCS) 120. The ground control station (GCS) 120 is represented as a point in the ground plane 110. The projection 145 of flight path onto the horizontal ground plane 110 is also treated as piecewise linear. During a judicially selected period of time, the flight path 100 is approximated as a horizontal path of a respective altitude H (reference 170)

Figure 2:
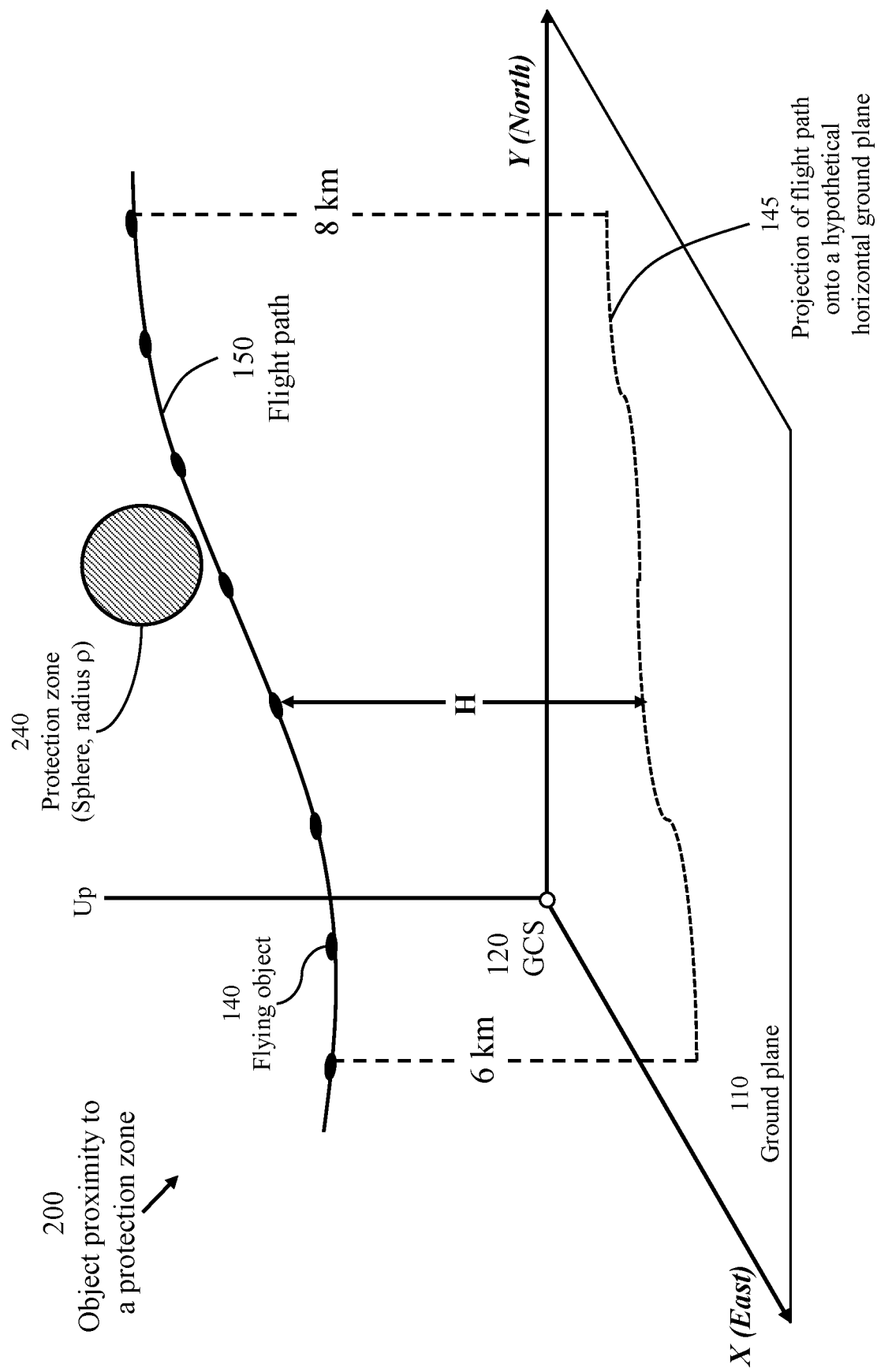
FIG. 2 illustrates the need to track the object to detect proximity to a time-varying protection zone.

FIG. 2 illustrates a snapshot 200 of the object's proximity to a specified protection zone 240. The location and size of the protection zone are generally time varying, though in some applications the protection zone may be static. The object need be tracked to detect proximity to the protection zone. The protection zone is preferably defined as a sphere of a predefined radius and a predefined center.

Figure 3:
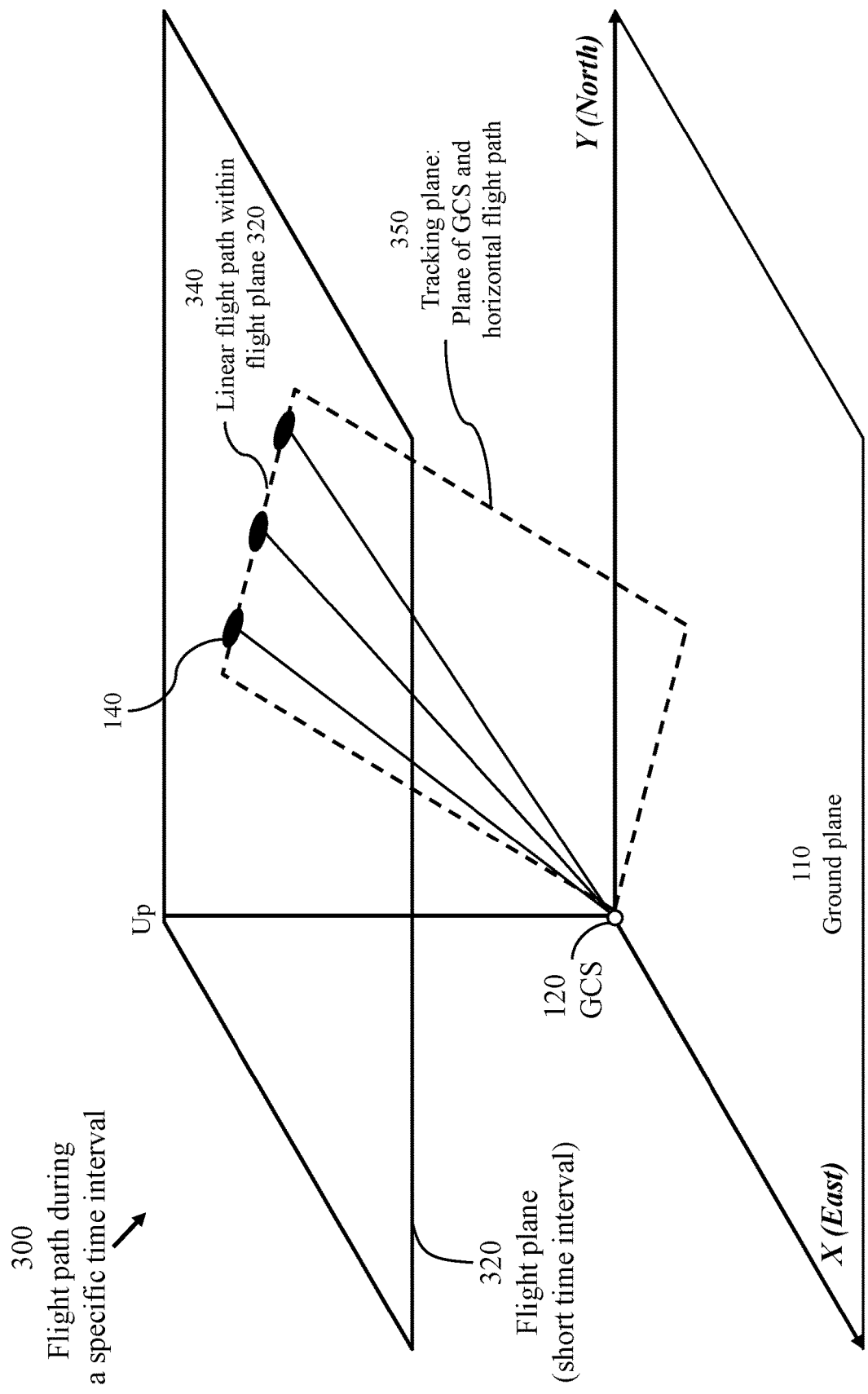
FIG. 3 illustrates a segment of the flight path.

FIG. 3 illustrates a snapshot 300 of a segment of the flight path 150 during a specific time interval. The object remains within a horizontal flight plane 320 during the specified time interval along a linear flight path 340. The specified time interval may correspond to a planned duration of a mission of an Unmanned Aerial Vehicle (UAV). The GCS 120 (represented as a point) and the linear flight path 340 define a "tracking plane" 350.

Figure 4:
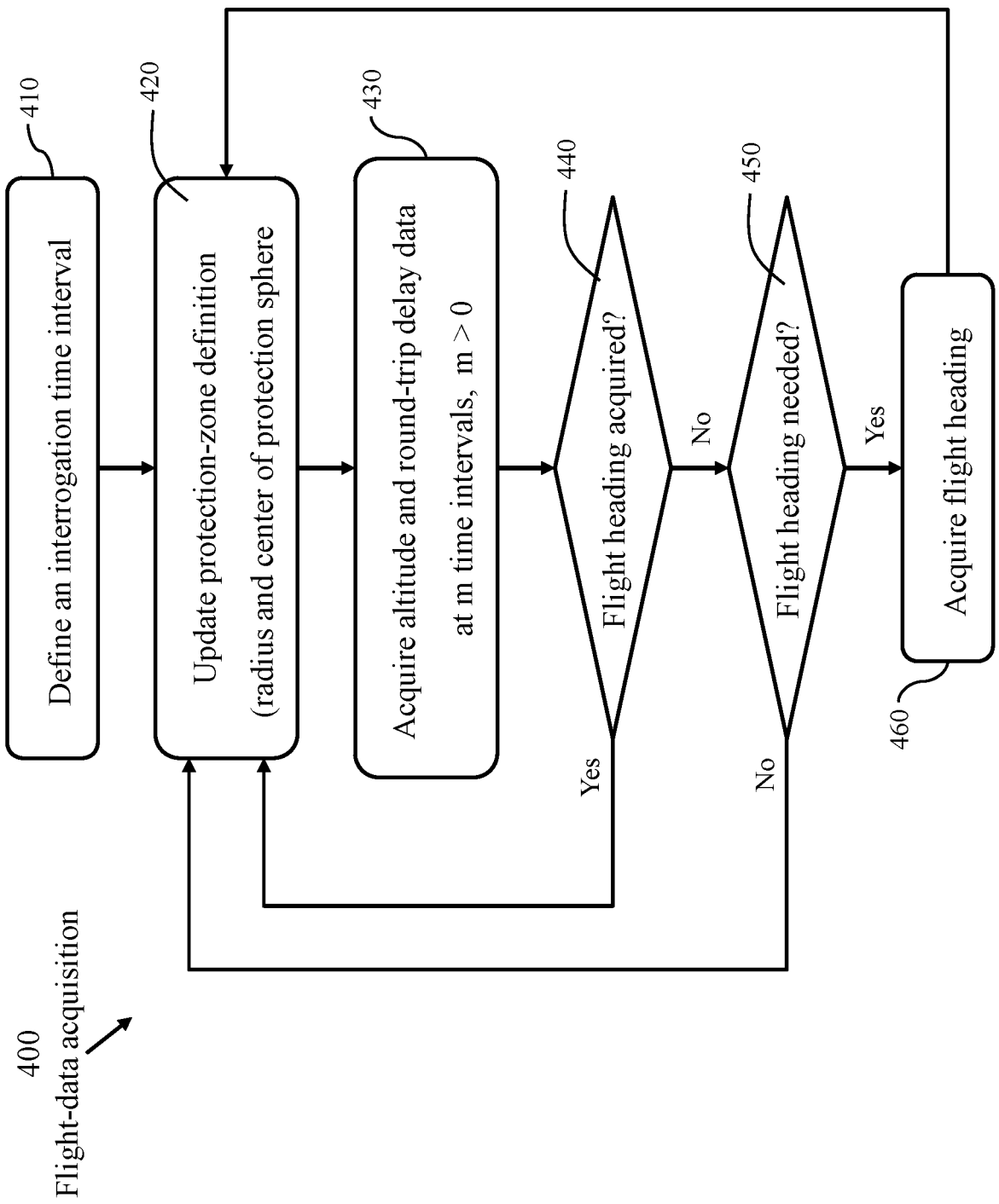
FIG. 4 illustrates acquisition of data needed to assess the risk of the object crossing the protection zone, in accordance with an embodiment of the present invention.

FIG. 4 illustrates processes 400 of acquiring basic flight data needed to assess the risk of the object 140 crossing the protection zone 240. Process 410 selects a cyclic interrogation time interval ($\Delta t$), which may be of the order of a fraction of a second, for example. The time interval between successive interrogations is preferably kept constant for ease of computation; however, the interval may vary during the tracking period of the object (between 0.1 second and one second, for example).

Process 420 specifies initial values of the location and size of the protection zone 240 and updates the location and size periodically or based on information relevant to the route of a protected UAV. Process 430 periodically communicates with a transponder of the object 140 to acquire the altitude of the object 140 and measure the round-trip delay between the CS 120 and the object 140 to determine the range of the object. The range is defined as the radial distance between the GCS (represented as a point) and the object 140. Upon completion of a predefined number m, m>1, of communications with the transponder (interrogating the transponder), process 440 is activated.

Process 440 determines whether the object's heading (flight direction) has already been acquired as described below (process 460). Due to certain regulations, an acquisition of the heading through human contact is limited to be infrequent.

Process 450 determines whether the object's heading is needed for assessing the risk of the object crossing the protection zone. The decision is based on criteria of two filters, labelled "Filter-I" and "Filter II", to be described below, which rely solely on the information acquired in process 420 and process 430. If applying Filter-I and Filter-II indicates that the trajectory of the object has no bearing on the protected zone 240, process 420 is revisited to update the location and size of the protected zone. Otherwise, it is determined that further information relevant to the object's trajectory is needed.

Process 460 initiates a communication session with a pilot or an autopilot of the object 140 to acquire information relevant to the object's heading.

Figure 5:
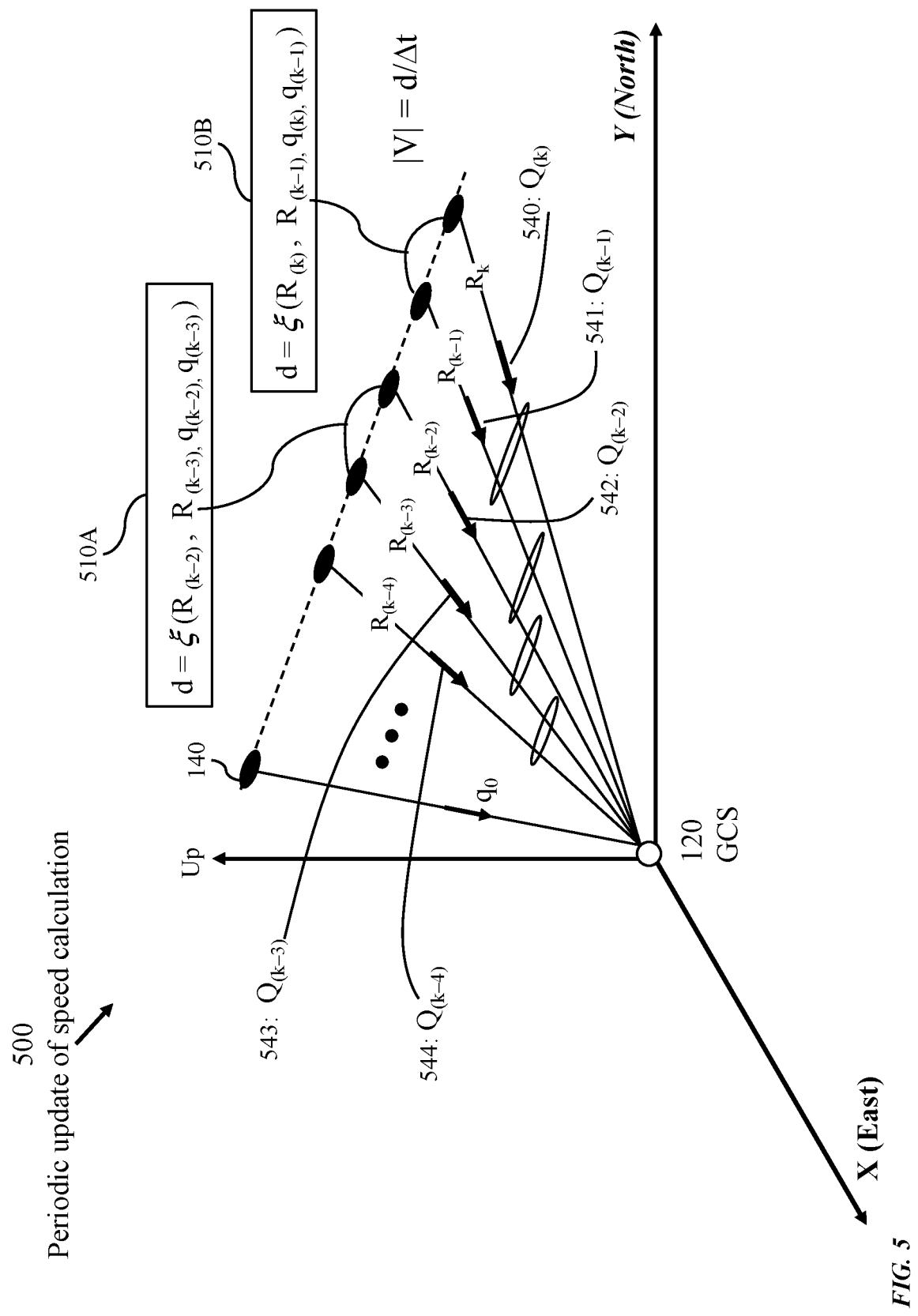
FIG. 5 illustrates periodic acquisition of flight data, including altitude and round-trip delay, between the object and a ground control station (GCS), at distinct time instants, for determining the object displacement between successive time instants and speed of object, based on determining the frequency shift, in accordance with an embodiment of the present invention.

FIG. 5 illustrates a scheme 500 of periodic update of flight-data, for use in process 430, according to a first requisite flight-data type which comprises two successive round-trip delay values and corresponding frequency-shift values.

The flight data includes altitude and round-trip delay between the object and a ground control station (GCS), at distinct time instants, for determining the object displacement between successive time instants and speed of object, based on the round-trip delay and the frequency shift. Process 510 computes the magnitude, d, of the object displacement during successive interrogation time intervals ($\Delta t$ apart) based on two range values and corresponding radial velocities of the object.

At the time instant ($k \times \Delta t$), for k>4, for example, the range values $R_0, \ldots, R_{(k-4)}, R_{(k-3)}, R_{(k-2)}, R_{(k-1)}, R_{(k)}$, would have been determined according to measured round-trip delays at time instants $0, \ldots, (k-4), (k-3), (k-2), (k-1), k$. Corresponding values of radial velocity $q_0, \ldots, Q_{(k-4)}, Q_{(k-3)}, Q_{(k-2)}, Q_{(k-1)}, Q_{(k)}$, would be determined. The computed radial velocity values 540 are referenced as 541, 542, 543, etc.

A number of most recent measurements may be retained over a moving time window for further analysis (not described in the present disclosure). The computation of $R_j$, $j=0, \ldots, k$, is described below with reference to FIG. 7 and FIG. 8. Generally, the magnitude d of the object's displacement, determined at time instant ($j \times \Delta t$), $j>1$, is a function $\xi$ of ($R_{(j-4)}, R_j, Q_{(j-1)}, Q_j$). Thus, for $j=(k-2)$, the displacement magnitude d would be determined as (reference 510A):

$$d = \xi(R_{(k-2)}, R_{(k-3)}, Q_{(k-2)}, Q_{(k-3)}).$$

for $j=k$, the displacement magnitude d would be determined as (reference 510B):

$$d = \xi(R_k, R_{(k-1)}, Q_k, Q_{(k-1)}).$$

The magnitude $|V|$ of the velocity (the speed) is determined as: $|V| = d/\Delta t$.

The value 510A of d determined at time instant ($(k-2) \times \Delta t$) and the value 510B of d determined at time instant ($(k-4) \times \Delta t$) may differ due to varying speed. The speed, however, would be virtually constant during a typical period of interest.

Figure 6:
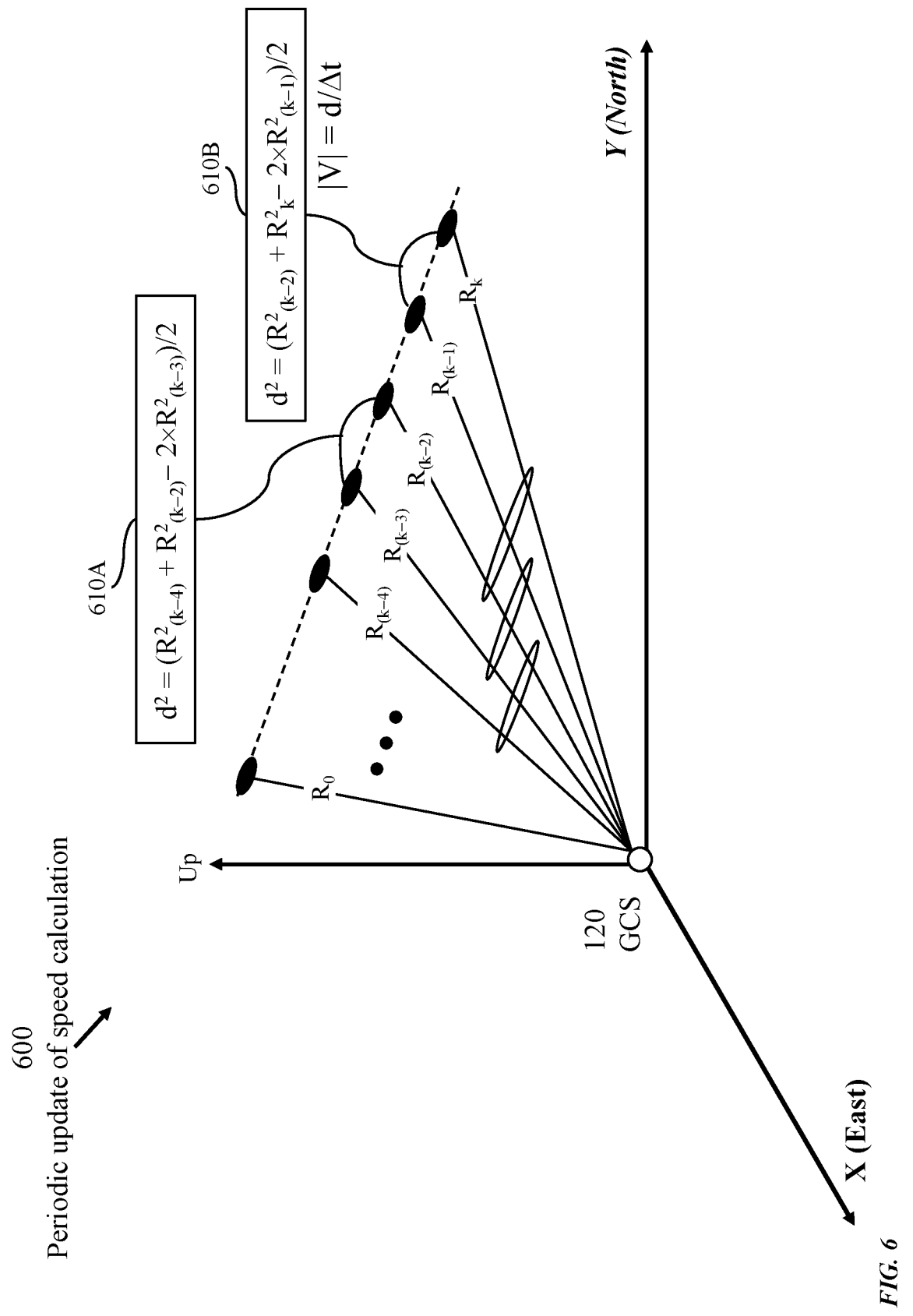
FIG. 6 illustrates periodic acquisition of flight data, including altitude and round-trip delay between the object and the GCS, at distinct time instants, for determining the object displacement between successive time instants and speed of object, based on radial distances between the GCS and the object at three consecutive time instants, in accordance with an embodiment of the present invention.

FIG. 6 illustrates a scheme 600 of periodic update of flight-data, for use in process 430, according to a second requisite flight-data type which comprises three successive round-trip delay values.

The flight data includes altitude and round-trip delay between the object and a ground control station (GCS), at most recent three distinct time instants, for determining the object displacement between successive time instants and speed of object, based on the round-trip delay. Process 610 computes the magnitude, d, of the object displacement during successive interrogation time intervals ($\Delta t$ apart) based on three range values.

At the time instant ($k \times \Delta t$), for k>4, for example, the range values $R_0, \ldots, R_{(k-4)}, R_{(k-3)}, R_{(k-2)}, R_{(k-1)}, R_{(k)}$, would have been determined according to measured round-trip delays at time instants $0, \ldots, (k-4), (k-3), (k-2), (k-1), k$. A number of most recent measurements may be retained over a moving time window for further analysis.

The computation of $R_j$, $j=0, \ldots, k$, is described below with reference to FIG. 9 and FIG. 10. Generally, the magnitude d of the object's displacement, determined at time instant ($j \times \Delta t$), j>2, is a function of ($R_j$, $R_{(j-1)}$), $R_{(j-2)}$). The magnitude d of the object's displacement may be determined (reference 610A) from:

$$d^2 = (R^2_{(j-2)} + R^2_j - 2 \times R^2_{(j-1)})/2.$$

Thus, for j=(k-2), k>4, the displacement magnitude d would be determined as (reference 610A):

$$d^2 = (R^2_{(k-4)} + R^2_{(k-2)} - 2 \times R^2_{(k-3)})/2.$$

The magnitude |V| of the velocity (the speed) is determined as: $|V| = d/\Delta t$.

The value 610A of d determined at time instant (($k-2) \times \Delta t$) and the value 610B of d determined at time instant (($k-4) \times \Delta t$) may differ due to varying speed.

Figure 7:
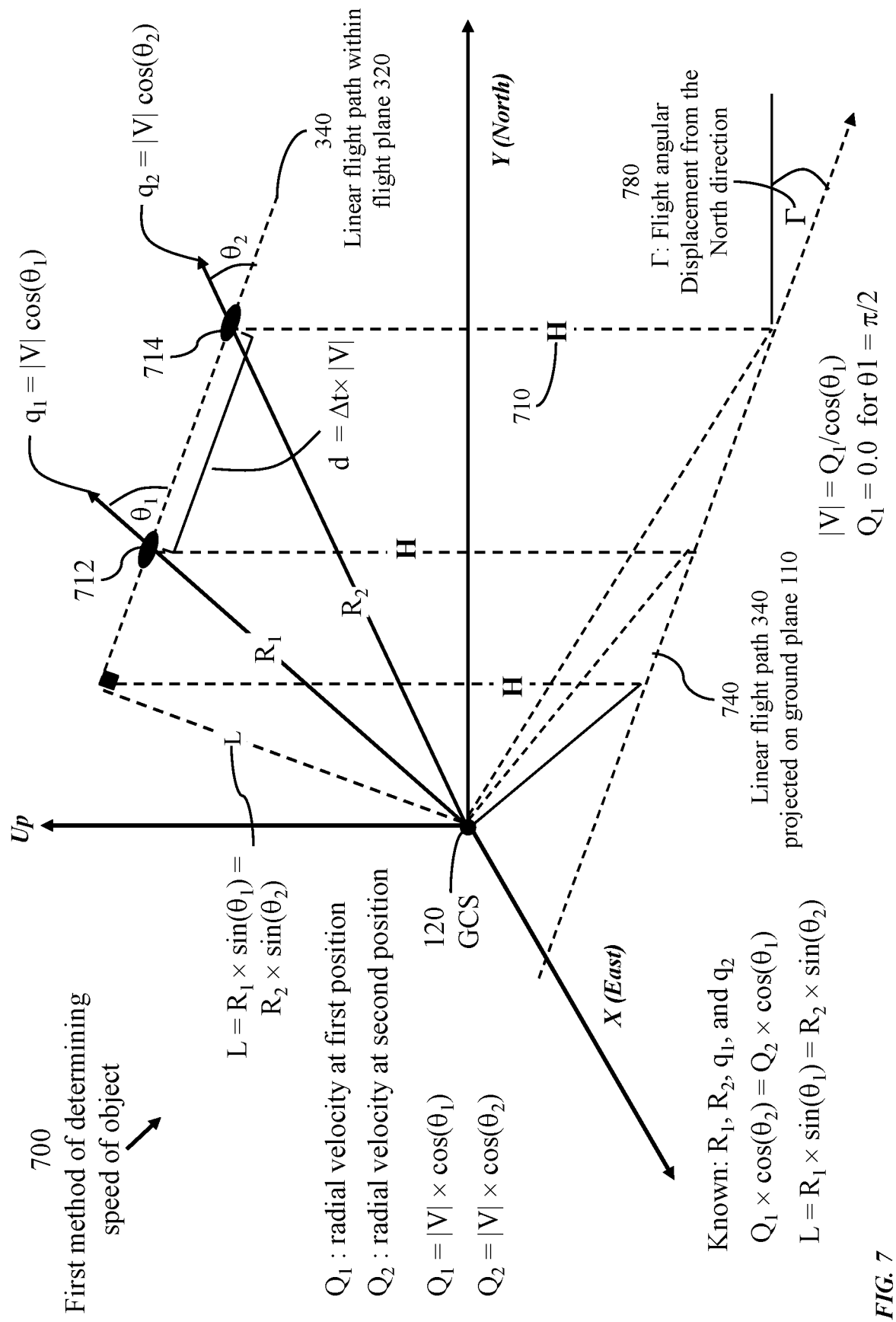
FIG. 7 illustrates a first method of determining the speed of the object based on determining two values of the radial distance between the GCS and the object at two distinct time instants and measuring Doppler frequency shift at the two instants, in accordance with an embodiment of the present invention.

FIG. 7 illustrates a first method of determining the speed of the object (magnitude of the velocity but not the direction) based on determining two values of the radial distance between the GCS 120 and the object 140 at two distinct time instants, during a tracking period, and measuring frequency shift at the two instants.

The altitude 710, denoted H, of the object during tracking period is verified to remain unchanged, or is determined as a mean value, or some other estimator, of acquired multiple values (FIG. 5) of the altitude during the tracking period to account for altitude-measurement noise.

The round-trip delay between the GCS 120 and the object 140 is measured at some instant $\tau$ of time, where the object is at a first position 712, and at time instant ($\tau + \Delta t$), where the object is at a second position 714. The round-trip delay includes three components: the propagation delay $\delta_1$ between the GCS and the object, the processing delay $\delta_0$ of the transponder, and $\delta_2$, the propagation delay between the object and the GCS. The delay $\delta_0$ is standardized, With the object positioned at a radial distance $R_1$ from the GCS when the object receives an interrogation signal, the value of $\delta_1$ is ($R_1/c$), c being the speed of light ($3 \times 10^{-8}$ meters/second). With $R_1 = 7.5$ kilometers, for example, $\delta_1$ is 25 microseconds. With the object moving at a speed of 150 meters per second (540 kilometers/hour) and with a relatively small processing delay $\delta_0$, the object would have travelled a distance of less than 4 millimeters before transmitting a response signal to the GCS. Thus, there is an infinitesimal difference between the value of $\delta_2$ and the value of $\delta_1$. With a known (standardized) value of $\delta_0$, the range $R_1$ is determined precisely. Likewise, the range $R_2$ is determined precisely.

For any interrogation, the magnitude of frequency shift of the central frequency of the carrier signal transmitted from the transponder to the GCS may be used to determine the magnitude of the radial velocity of the object, i.e., $|V| \times \cos(\theta)$, where $|V|$ is the magnitude of the velocity and $\theta$ is the angular displacement of the position vector of the object 140 with respect to the GCS 120.

Figure 8:
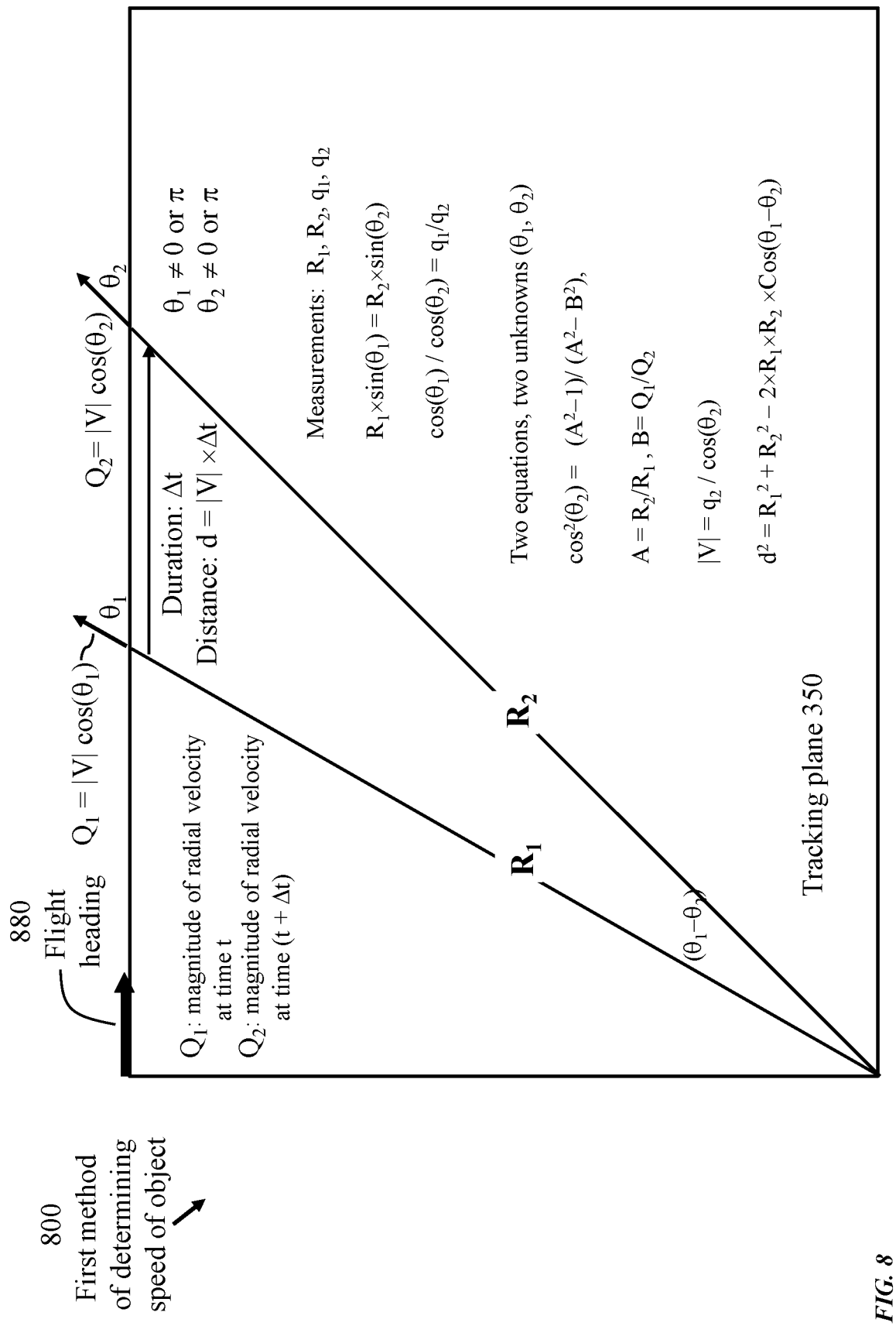
FIG. 8 details the method of FIG. 7.

FIG. 8 illustrates a tracking-plane representation 800 of the position vectors of the object to clarify the steps of the method of determining speed of the object. The position vectors of the object 140 at the two instants $\tau$, and ($\tau + \Delta t$) within the tracking plane 350 are indicated. As described above, with reference to FIG. 3, the GCS 120 and the line of flight of the object during a tracking period define a tracking plane.

With $R_1$ denoting the radial distance between the object and the GCS at time instant $\tau$, $R_2$ denoting the radial distance between the object and the GCS at time instant ($\tau + \Delta t$), $Q_1$ denoting the radial velocity at time instant $\tau$, and $Q_2$ denoting the radial velocity at time instant ($\tau + \Delta t$), $$R_1 \times \sin(\theta_1) = R_2 \times \sin(\theta_2),$$

$$Q_1 = |V| \times \cos(\theta_1), Q_2 = |V| \times \cos(\theta_2), \text{ from which:}$$

$$(\sin \theta_2)^2 = [1 - (Q_1/Q_2)^2]/[(R_2/R_1)^2 - (Q_1/Q_2)^2].$$

$\theta_1$ denotes the angular displacement of the position vector of the object with respect to the GCS at time instant $\tau$, and $\theta_2$ denotes the angular displacement of the position vector of the object with respect to the GCS at time instant ($\tau + \Delta t$). For example, with $R_2/R_1 = 1.1$, and $Q_1/Q_2 = 0.94$, $\sin \theta_2 = 0.5972$, ($\theta 2 = 0.640$ radians), $\sin \theta_1 = 0.6569$, ($\theta 1 = 0.7167$ radians). The magnitude d of the object's displacement during the $\Delta t$ interval is then determined from: $d^2 = R_1^2 + R_2^2 - 2 \times R_1 \times R_2 \times \cos(\theta_1 - \theta_2)$. The speed of the object is then determined as: $|V| = (d/\Delta t)$.

So far, the angular displacement 780, denoted $\Gamma$, of flight direction (with respect to the North direction) is unknown.

Figure 9:
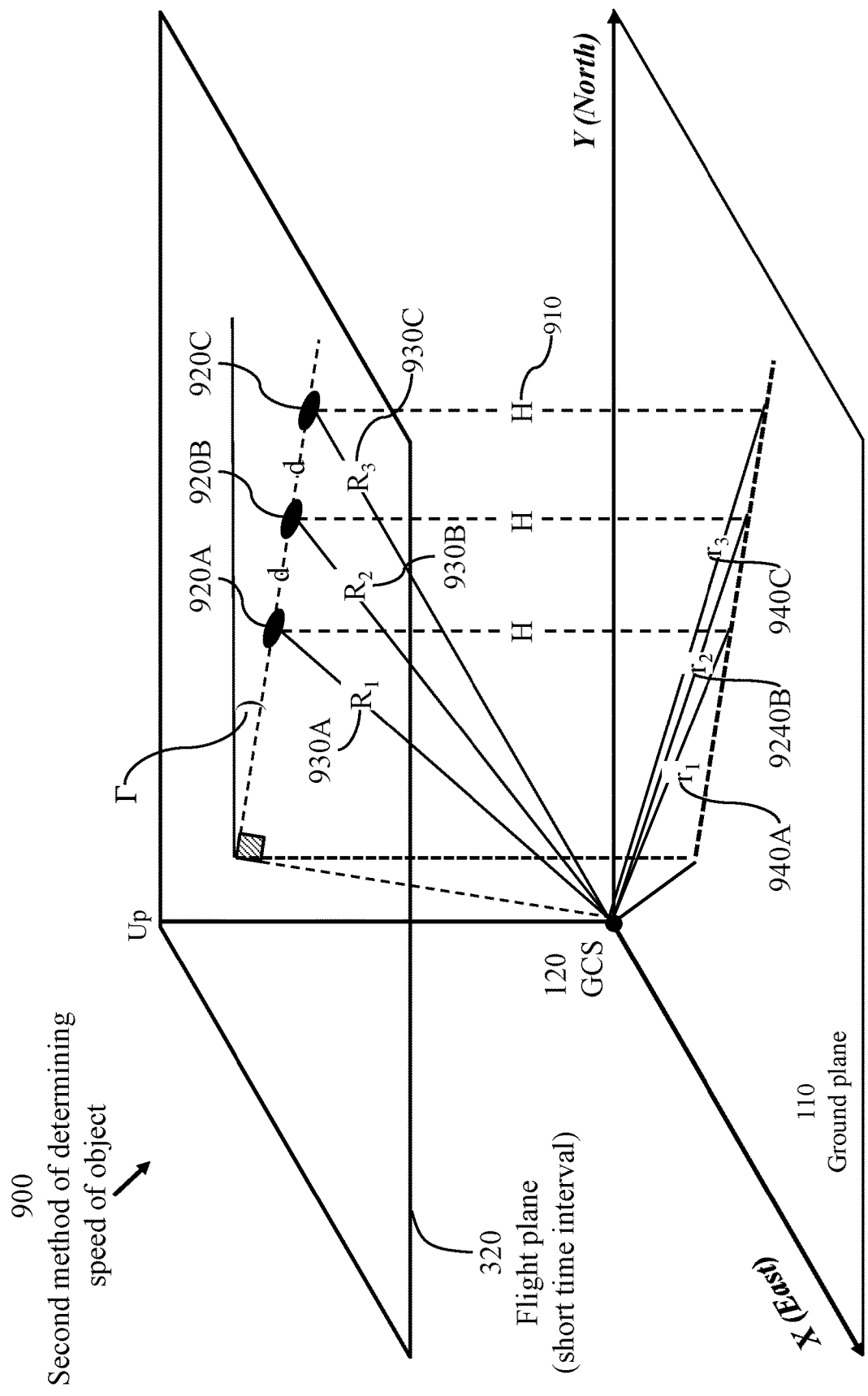
FIG. 9 illustrates a second method of determining the speed of the object based on determining values of the range of the object, with respect to the GCS, at three distinct time instants, in accordance with an embodiment of the present invention.

FIG. 9 illustrates a second method 900 of determining the speed of the object (magnitude of the velocity but not the direction) based on determining values of the range of the object, with respect to the GCS, at three distinct time instants. The altitude 910, denoted H, of the object during tracking period is verified to remain unchanged, or is determined as a mean value, or some other estimator, of acquired multiple values (FIG. 6) of the altitude during the tracking period to account for altitude-measurement noise.

The GCS communicates with a transponder of the object 140 at three consecutive time instants $\tau$, ($\tau + \Delta t$), ($\tau + 2 \times \Delta t$) to acquire data relevant to the altitude and measure round-trip delays to determine the range at the three instants. The position vectors 930A, 930B, and 930C of the object correspond to positions 920A, 920B, and 920C of the object 140 at the three instants.

Figure 10:
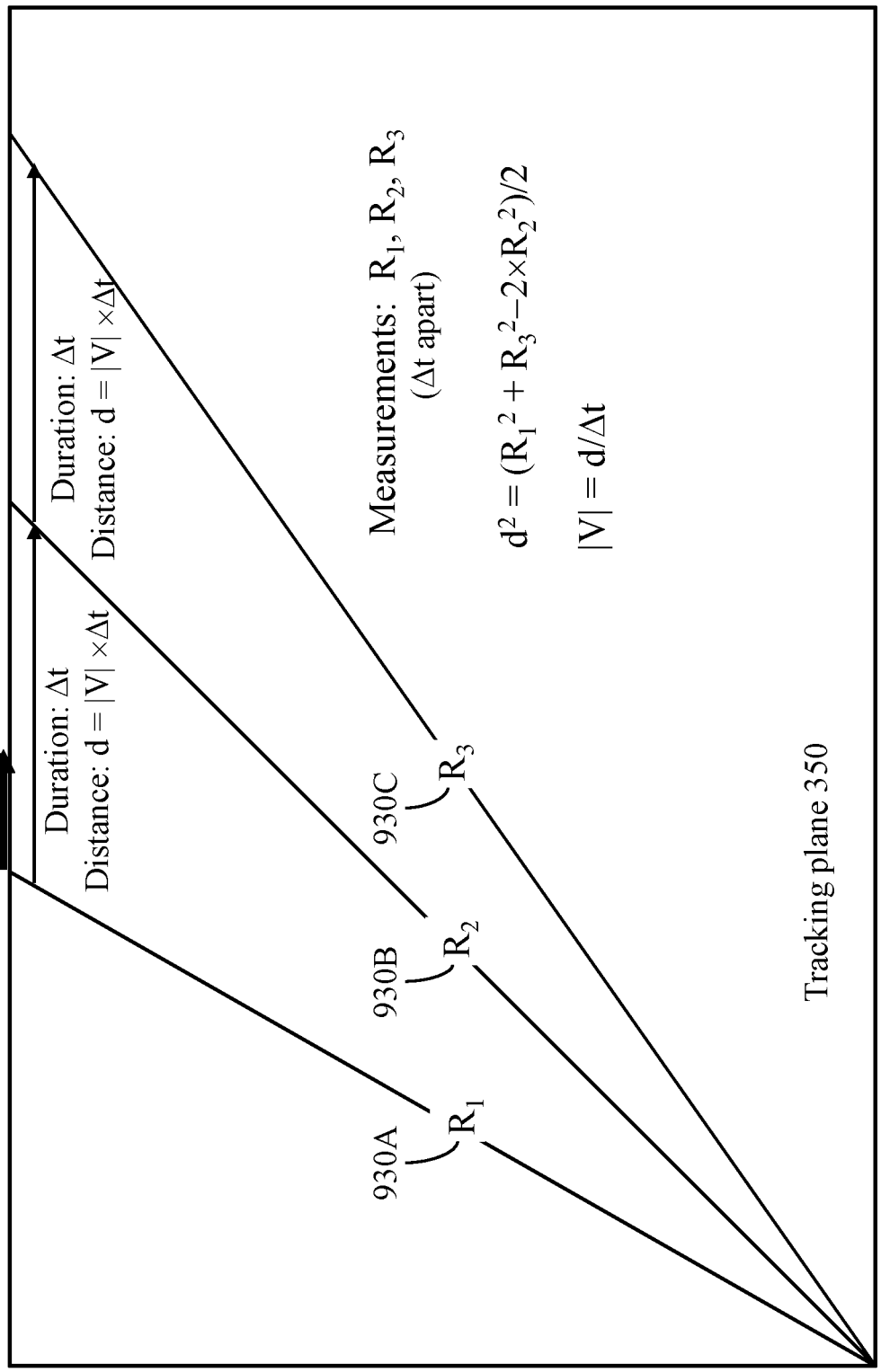
FIG. 10 details the method of FIG. 9.

FIG. 10 illustrates a tracking-plane representation 1000 of the position vectors of the object to clarify the steps of the method of determining speed of the object. The position vectors of the object 140 at the time instants $\tau$, ($\tau + \Delta t$), and ($\tau + 2 \times \Delta t$) within the tracking plane 350 are indicated. As described above, with reference to FIG. 3, the GCS 120 and the line of flight of the object during a tracking period define a tracking plane.

With $R_1$ denoting the range (radial distance between the object and the GCS) at time instant $\tau$, $R_2$ denoting the range at time instant ($\tau + \Delta t$), and $R_3$ denoting the range at time instant ($\tau + 2 \times \Delta t$), the magnitude, d, of the object displacement during an interval $\Delta t$ is determined from:

$d^2=(R_1^2+R_3^2-2\times R_2^2)/2$ and the speed of the object is determined as: $|V|=d/\Delta t$.

The projections $r_1$, $r_2$, and $r_3$ (reference 940A, 940B, and 940C) of $R_1$, $R_2$, and $R_3$, onto ground plane 110 are determined for use in determining the object position as described below with reference to FIG. 12.

Figure 11:
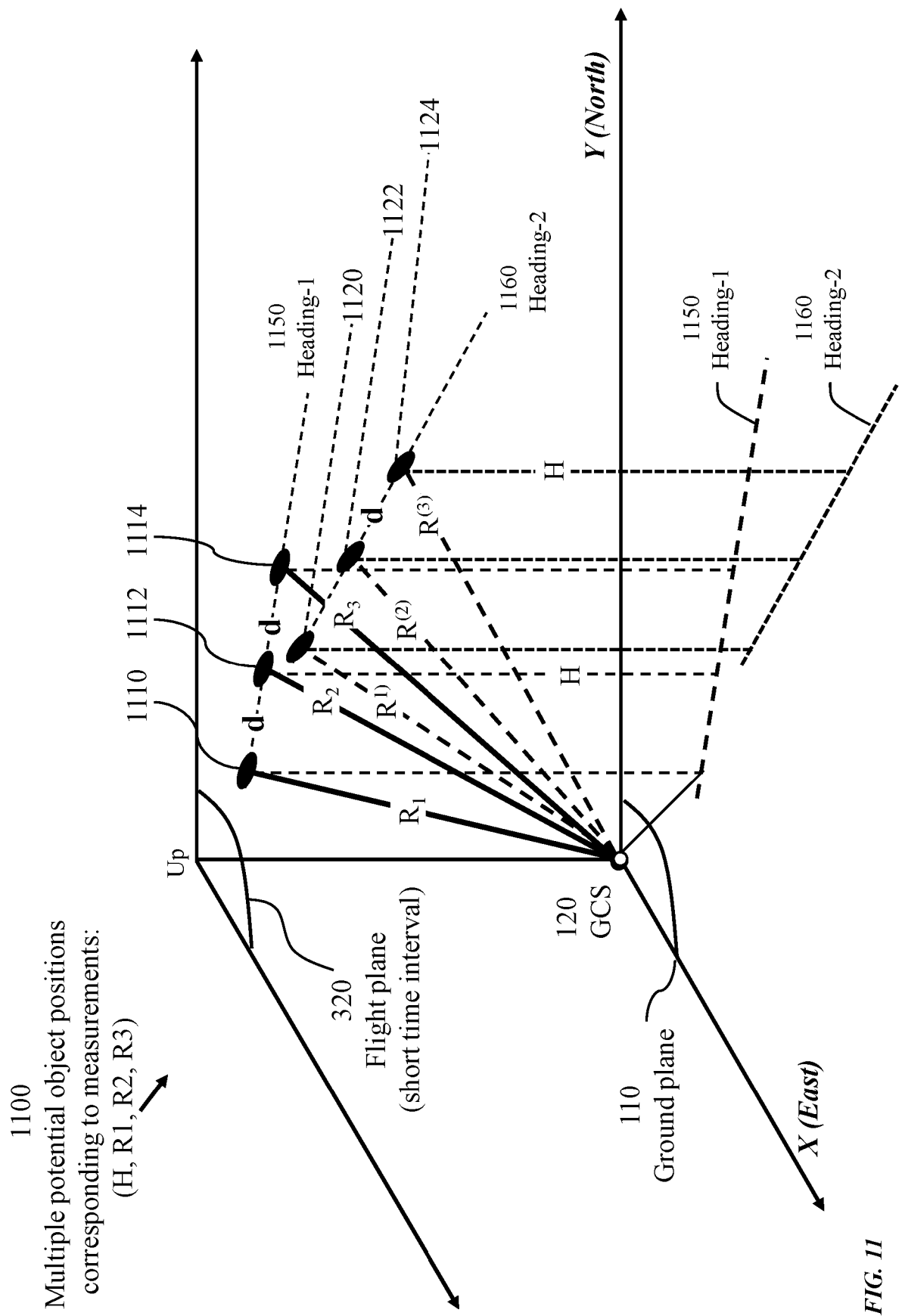
FIG. 11 illustrates multiple potential object positions that correspond to a set of range measurements.

FIG. 11 illustrates multiple potential object positions 1100 corresponding to a set of values (magnitude only) of object's position vectors. A set $\{R_1, R_2, R_3\}$ of range values is not sufficient to determine the position of the object at any of the time instants $\tau$, $(\tau+\Delta t)$, and $(\tau+2\times\Delta t)$. As illustrated, a first potential heading 1150 corresponds to a displacement of magnitude d and a set $\{R_1, R_2, R_3\}$ of position vectors if the object is at positions 1110, 1112, and 1114 during the three instants of time. A second potential heading 1160 corresponds to the displacement magnitude d and a set $\{R^{(1)}, R^{(2)}, R^{(3)}\}$ of position vectors if the object is at positions 1120, 1122, and 1124, during the three instants of time, where $|R_1|=|R^{(1)}|$, $|R_2|=|R^{(2)}|$, $|R_3|=|R^{(3)}|$. The actual heading of the object is, therefore, needed in order to locate the object.

Figure 12:
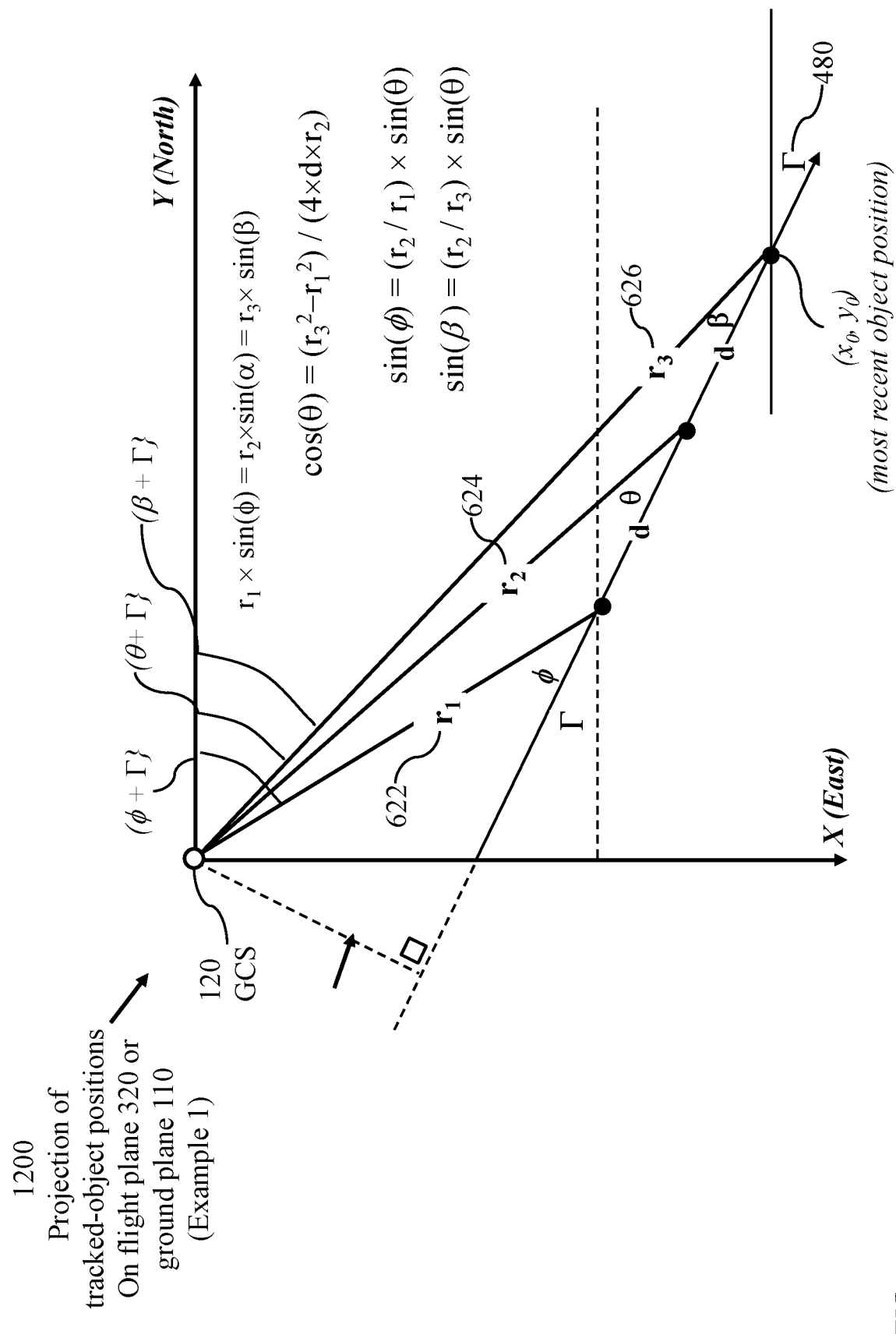
FIG. 12 illustrates, projection of position vectors of the object onto the flight plane (or the ground plane), and computation of the object's position vector based on an acquired heading of the object, in accordance with an embodiment of the present invention.

The projections $r_1$, $r_2$, and $r_3$ (reference 940A, 940B, and 940C) of $R_1$, $R_2$, and $R_3$, FIG. 12 illustrates a method 1200 of determining the position of the object at any of the three instants of time, T, $(\tau+\Delta t)$, and $(\tau+2\times\Delta t)$, using heading information acquired from the object and the projections $r_1$, $r_2$, and $r_3$ (reference 940A, 940B, and 940C) of the position vectors of magnitudes $R_1$, $R_2$, and $R_3$ (FIG. 9). The projections are determined from:

$$r_1^2=(R_1^2-H^2), r_2^2=(R_2^2-H^2), \text{ and } r_3^2=(R_3^2-H^2).$$

With the values of $r_1$, $r_2$, $r_3$, and d already determined, the angular displacement values, $\phi$, $\theta$, $\beta$, of the line of flight with respect to the projections of the position vectors can be determined. With $r_1\times\sin(\phi)=r_2\times\sin(\theta)=r_3\times\sin(\beta)$, the angular displacement $\phi$ is determined from:

$$\cos(\theta)=(r_3^2-r_1^2)/(4\times d\times r_2),$$

$$\sin(\phi)=(r_2\times\sin(\theta))/r_1, \text{ and}$$

$$\sin(\beta)=(r_2\times\sin(\theta))/r_3.$$

The above expressions yield two sets of solutions for $\phi$, $\theta$, and $\beta$. Hence, there are two potential values for each of positions 920A, 920B, and 920C.

The angular displacements of the projections 940A, 940B, and 940C of the position vectors 930A, 930B, and 930C with respect to the North direction (the direction of the Y axis) are $(\phi+\Gamma)$, $(\theta+\Gamma)$, and $(\beta+\Gamma)$, respectively.

The coordinates (along the X, Y, and U, axes, respectively) of the most recent position of the object (position 920C) are:

$$\{r_3\times\sin(\beta+\Gamma), r_3\times\sin(\beta+\Gamma), H\}$$

The coordinates of position 920B of the object are:

$$\{r_2\times\sin(\theta+\Gamma), r_2\times\sin(\theta+\Gamma), H\}$$

The coordinates of position 920A of the object are:

$$\{r_1\times\sin(\phi+\Gamma), r_1\times\sin(\phi+\Gamma), H\}.$$

Figure 13:
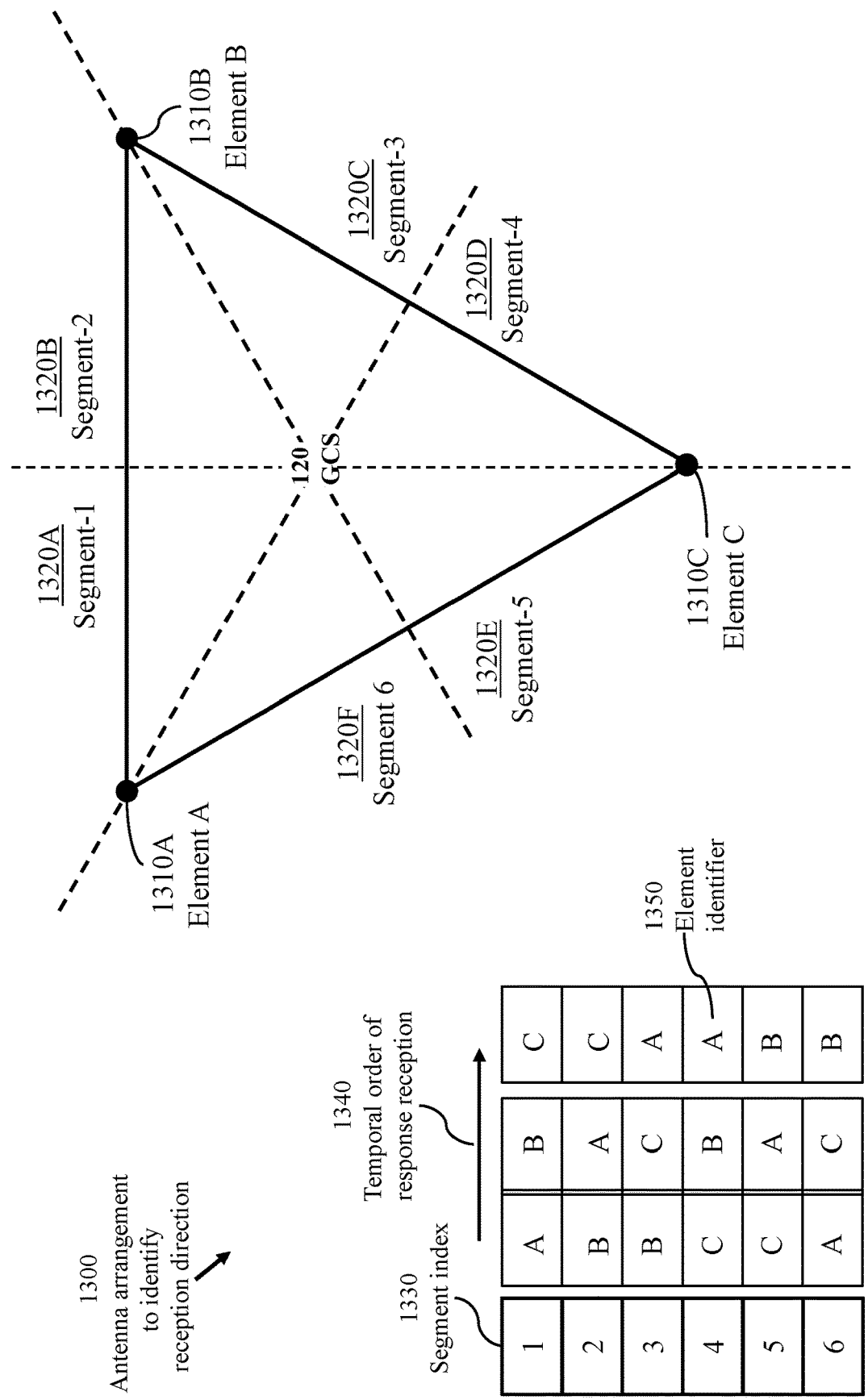
FIG. 13 illustrates an antenna arrangement collocated with the GCS to identify a direction of reception.

FIG. 13 illustrates an antenna arrangement 1300 of three elements 1310A, 1310B, 1310C, labelled "A", "B", and "C", respectively, configured to enable associating direction of a signal received at the GCS with one of six segments 1320A, 1320B, 1320C, 1320D, 1320E, and 1320F, labeled segment-1 to segment-6, respectively. Each antenna element is omni-directional. Each element, A, B, or C comprises a 1030 MHz transmitter and a 1090 MHz receiver. One element is coupled to the 1030 MHz transmitter for active interrogation. It is also connected to a dual band receiver that receives at 1030 MHz and 1090 MHz.

The elements of the phased array antenna are placed at the vertices of an equilateral triangle. The indicated 6 segments represent projection of reception coverage onto a horizontal plane, such as the horizontal flight plane 320. The direction of reception may be determined based on the time of arrivals at the antenna elements. For example, if the object's position is within segment 4 onto the horizontal flight plane 320, then antenna element C will be the first to receive the 1090 MHz reply signal from the object. Antenna element B will be the second to receive the reply signal and antenna element C will be the third to receive the reply signal. Observing the temporal order of reception of the reply signal, the proper location of the object can be determined from the table below:

| Segment index | Temporal order of reception of response from transponder | | |
|---|---|---|---|
| | First element | Second element | Third element |
| 1 | A | B | C |
| 2 | B | A | C |
| 3 | B | C | A |
| 4 | C | B | A |
| 5 | C | A | B |
| 6 | A | C | B |

Figure 14:
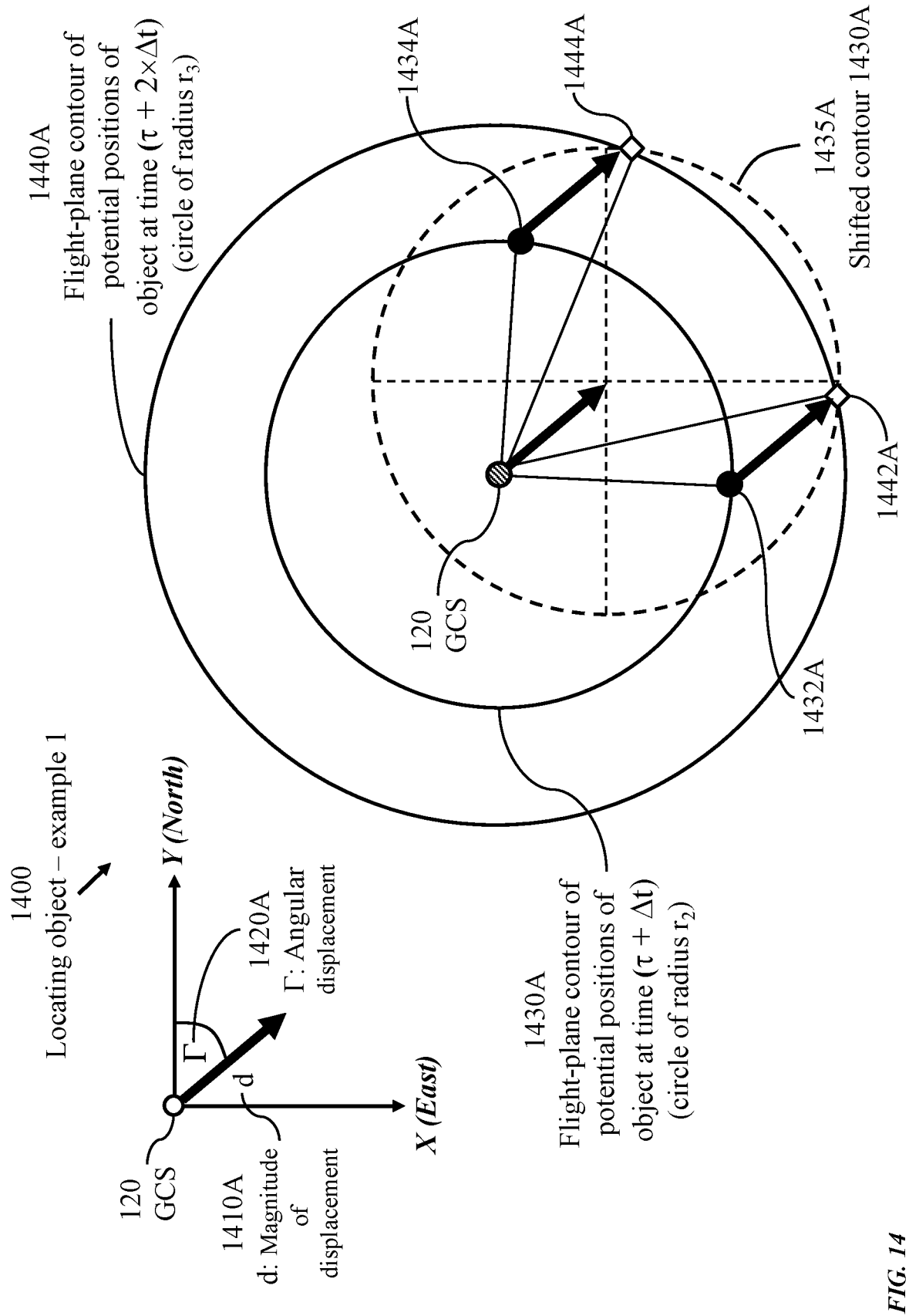
FIG. 14 illustrates determination of two positions of the object based on values of the object's range at two distinct time instants and computed displacement vector, for a first case where the object moves away from the GCS, in accordance with an embodiment of the present invention.

FIG. 14 illustrates a method 1400A of determining of the two positions of the object that can be determined from values of the object's range at two distinct time instants and the computed displacement vector, for a first case where the object moves away from the GCS. The displacement vector has a magnitude d (reference 1410A) and angular displacement $\Gamma$ (reference 1420A) from the North direction.

To determine the most recent position (920C) of the object, the position vectors 930B and 930C are used. Contour 1430 represents potential positions of the object within the flight plane at time instant $(\tau+\Delta t)$. Each point of contour 1430 is a potential position of the object 140 at time instant $(\tau+\Delta t)$. Contour 1430A shifts to contour 1435A where each potential object position at time $(\tau+\Delta t)$ undergoes a shift of magnitude d and angle $\Gamma$ with respect to the North direction. Contour 1440A represents potential positions of the object within the flight plane at time instant $(\tau+2\times\Delta t)$. Thus, the shifted contour 1435A and contour 1440A based on the determined projection of position vector 930C on the horizontal flight plane 320 represent contemporaneous object positions. Consequently, the intersection of the two contours should yield valid positions of the object at time instant $(\tau+2\times\Delta t)$. The intersection points 1442A and 1444A of the shifted contours 1435A and contour 1440A represent the most recent valid positions (based on the available data). Points 1432A and 1434A can be determined directly from points 1442 and 1444 (simply subtracting the displacement vector) to represent positions at time instant $(\tau+\Delta t)$.

Figure 15:
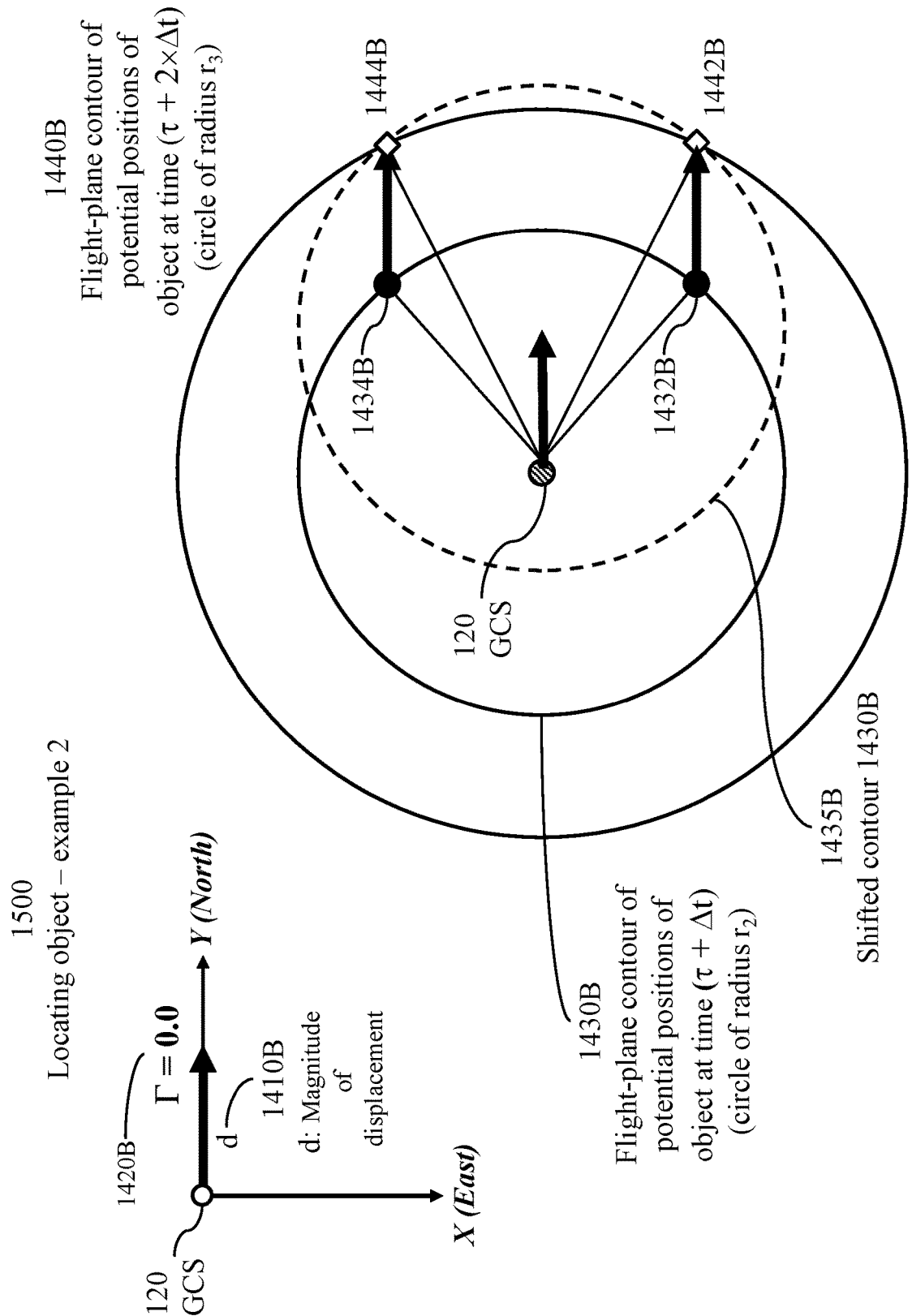
FIG. 15 illustrates determination of two positions of the object based on values of the object's range at two distinct time instants and computed displacement vector, for a second case where the object moves away from the GCS, in accordance with an embodiment of the present invention.

FIG. 15 illustrates application 1500 of method 1400A of determining of the two positions of the object that can be determined from values of the object's range at two distinct time instants and the computed displacement vector, for a second case where the object moves away from the GCS. The displacement vector has a magnitude d (reference 1410B) and angular displacement $\Gamma$ (reference 1420B) from the North direction. The only distinctive difference of application 1500 from the application of FIG. 14 is the displacement vector where $\Gamma$ is 0.0.

Figure 16:
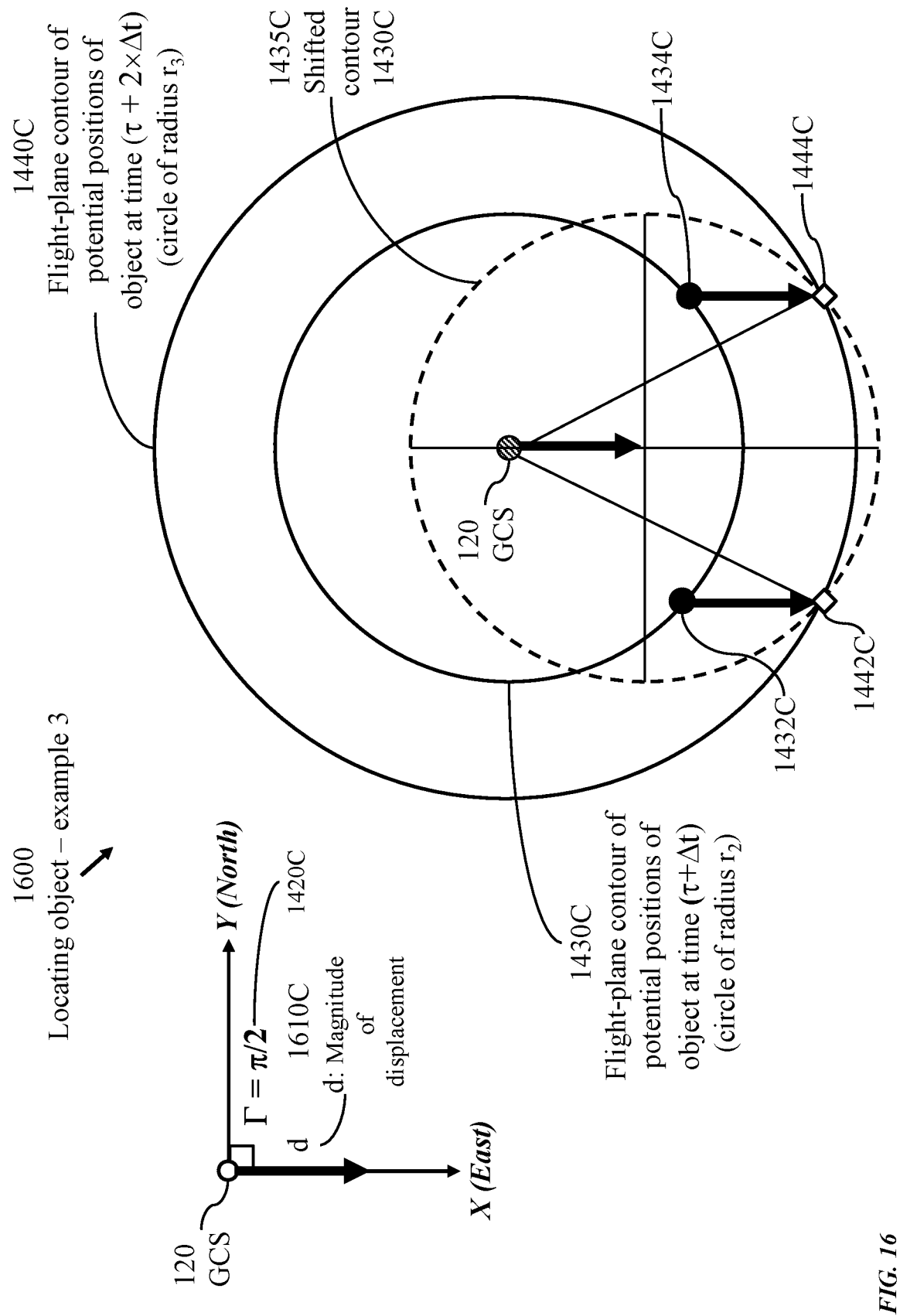
FIG. 16 illustrates determination of two positions of the object based on values of the object's range at two distinct time instants and computed displacement vector, for a third case where the object moves away from the GCS, in accordance with an embodiment of the present invention.

FIG. 16 illustrates application 1600 of method 1400A of determining of the two positions of the object that can be determined from values of the object's range at two distinct time instants and the computed displacement vector, for a third case where the object moves away from the GCS. The displacement vector has a magnitude d (reference 1410C) and angular displacement Γ (reference 1420C) from the North direction. The only distinctive difference of application 1600 from the application of FIG. 14 is the displacement vector where Γ is π/2.

Figure 17:
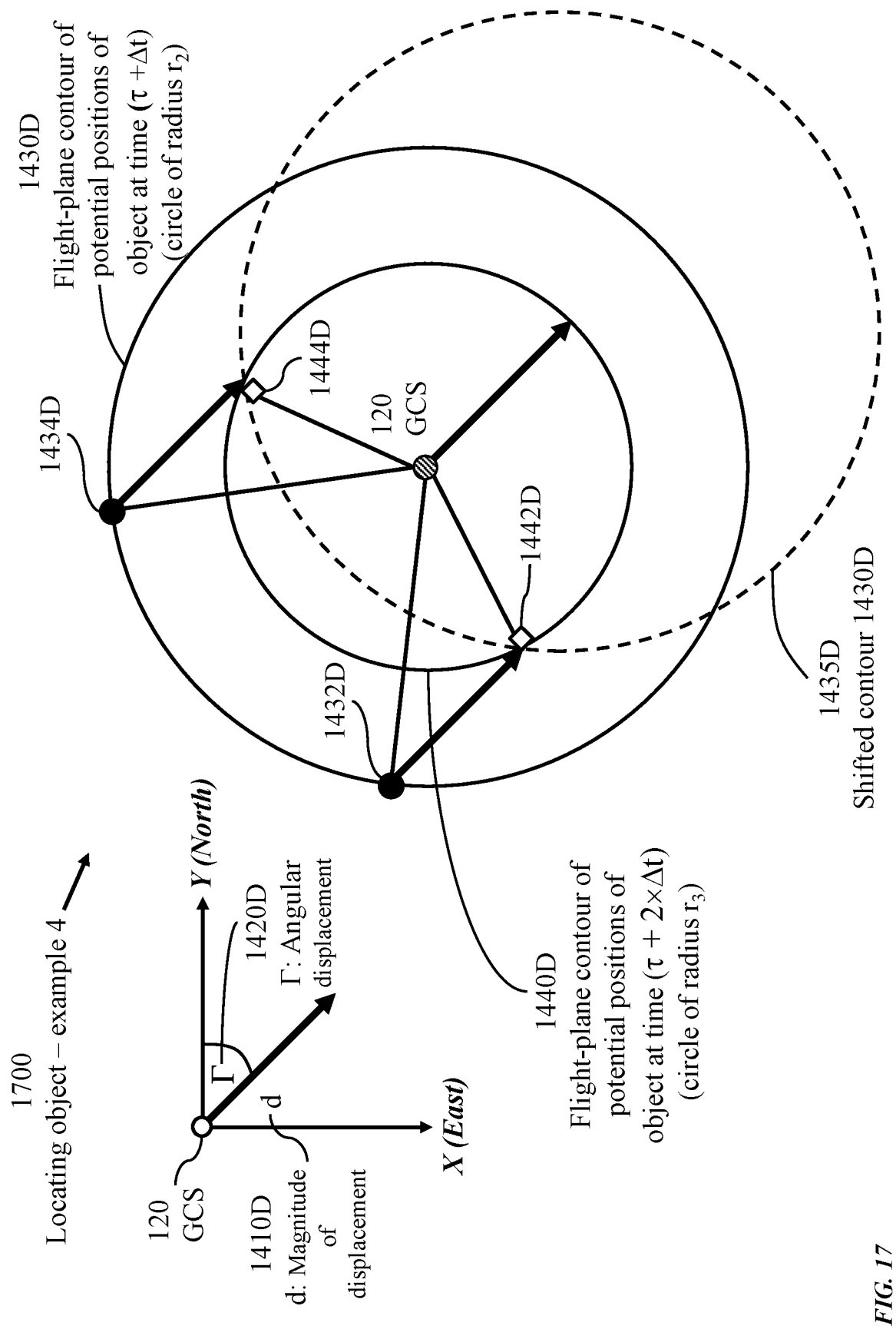
FIG. 17 illustrates determination of two positions of the object based on values of the object's range at two distinct time instants and computed displacement vector, for a first case where the object moves towards the GCS, in accordance with an embodiment of the present invention.

FIG. 17 illustrates application 1700 of method 1400A of determining of the two positions of the object that can be determined from values of the object's range at two distinct time instants and the computed displacement vector, for a first case where the object moves towards the GCS. The displacement vector has a magnitude d (reference 1410C) and angular displacement Γ (reference 1420C) from the North direction. The only distinctive difference of application 1700 from the application of FIG. 14 is the flight direction towards the GCS.

Figure 18:
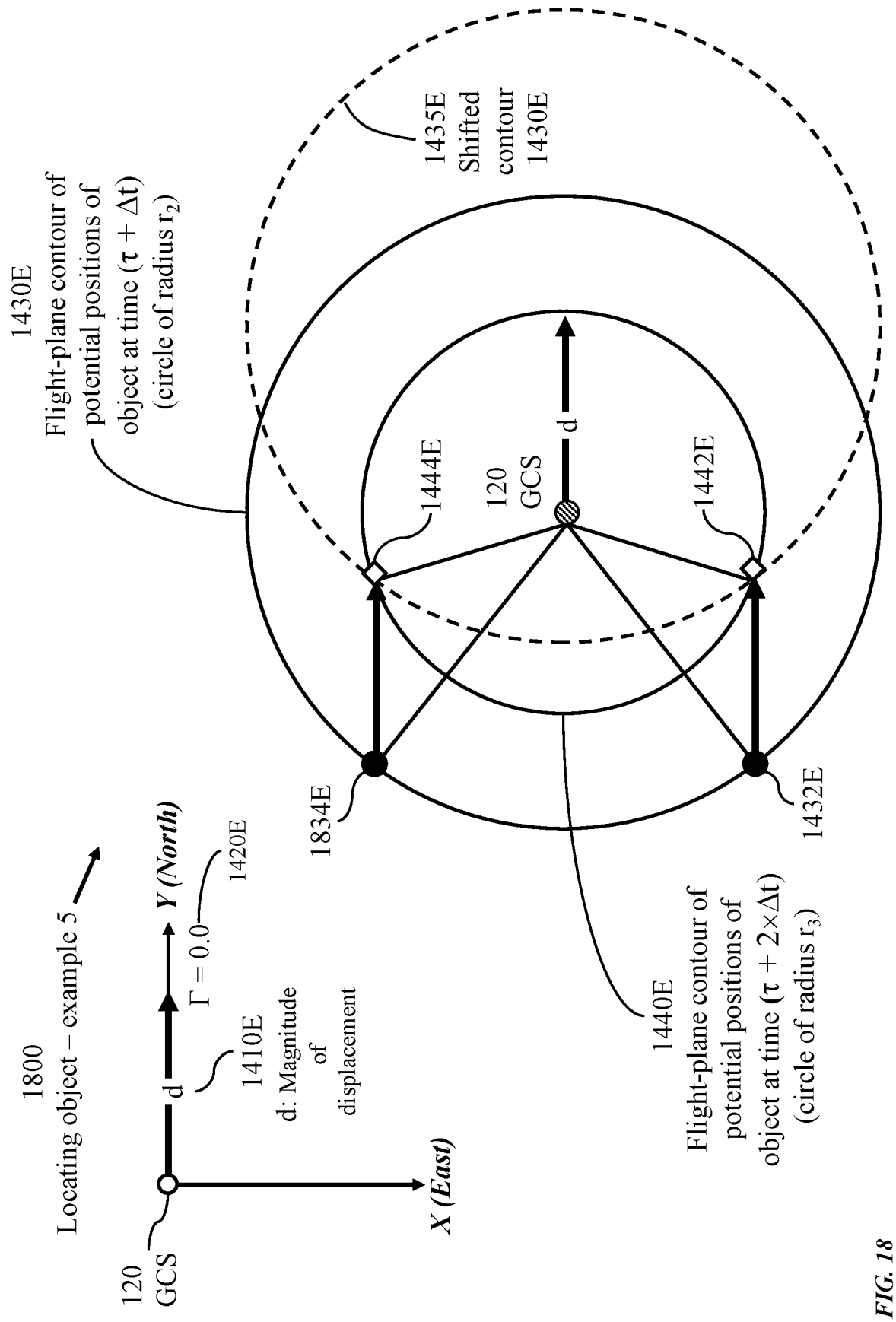
FIG. 18 illustrates determination of two positions of the object based on values of the object's range at two distinct time instants and computed displacement vector, for a second case where the object moves towards the GCS, in accordance with an embodiment of the present invention.

FIG. 18 illustrates application 1800 of method 1400A of determining of the two positions of the object that can be determined from values of the object's range at two distinct time instants and the computed displacement vector, for a second case where the object moves towards the GCS. The displacement vector has a magnitude d (reference 1410C) and angular displacement Γ (reference 1420C) from the North direction. The only distinctive difference of application 1800 from application 1700 is the displacement vector where Γ is 0.0.

Figure 19:
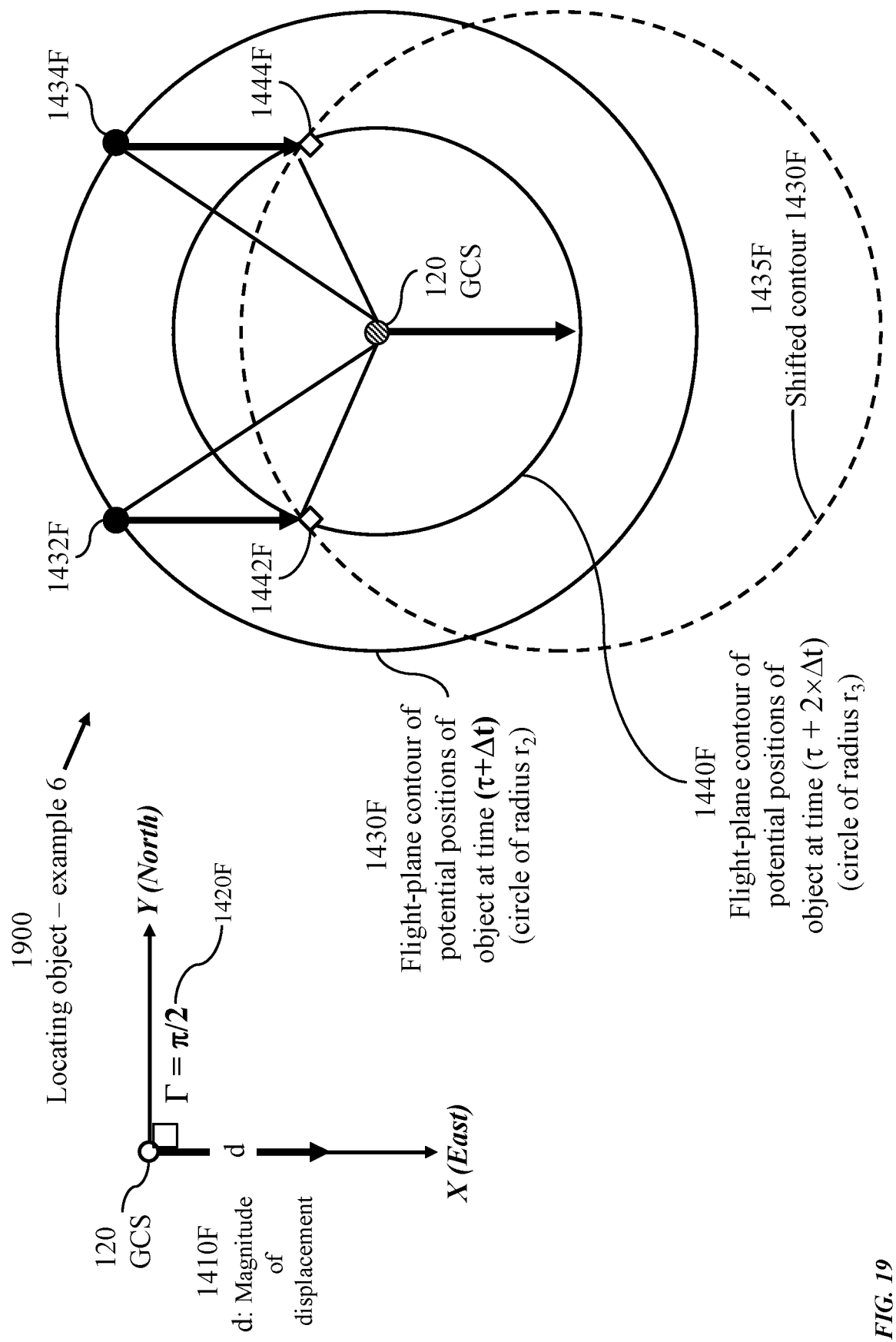
FIG. 19 illustrates determination of two positions of the object based on values of the object's range at two distinct time instants and computed displacement vector, for a third case where the object moves towards the GCS, in accordance with an embodiment of the present invention.

FIG. 19 illustrates application 1900 of method 1400A of determining of the two positions of the object that can be determined from values of the object's range at two distinct time instants and the computed displacement vector, for a third case where the object moves towards the GCS. The displacement vector has a magnitude d (reference 1410C) and angular displacement Γ (reference 1420C) from the North direction. The only distinctive difference of application 1800 from application 1700 is the displacement vector where Γ is π/2.

Figure 20:
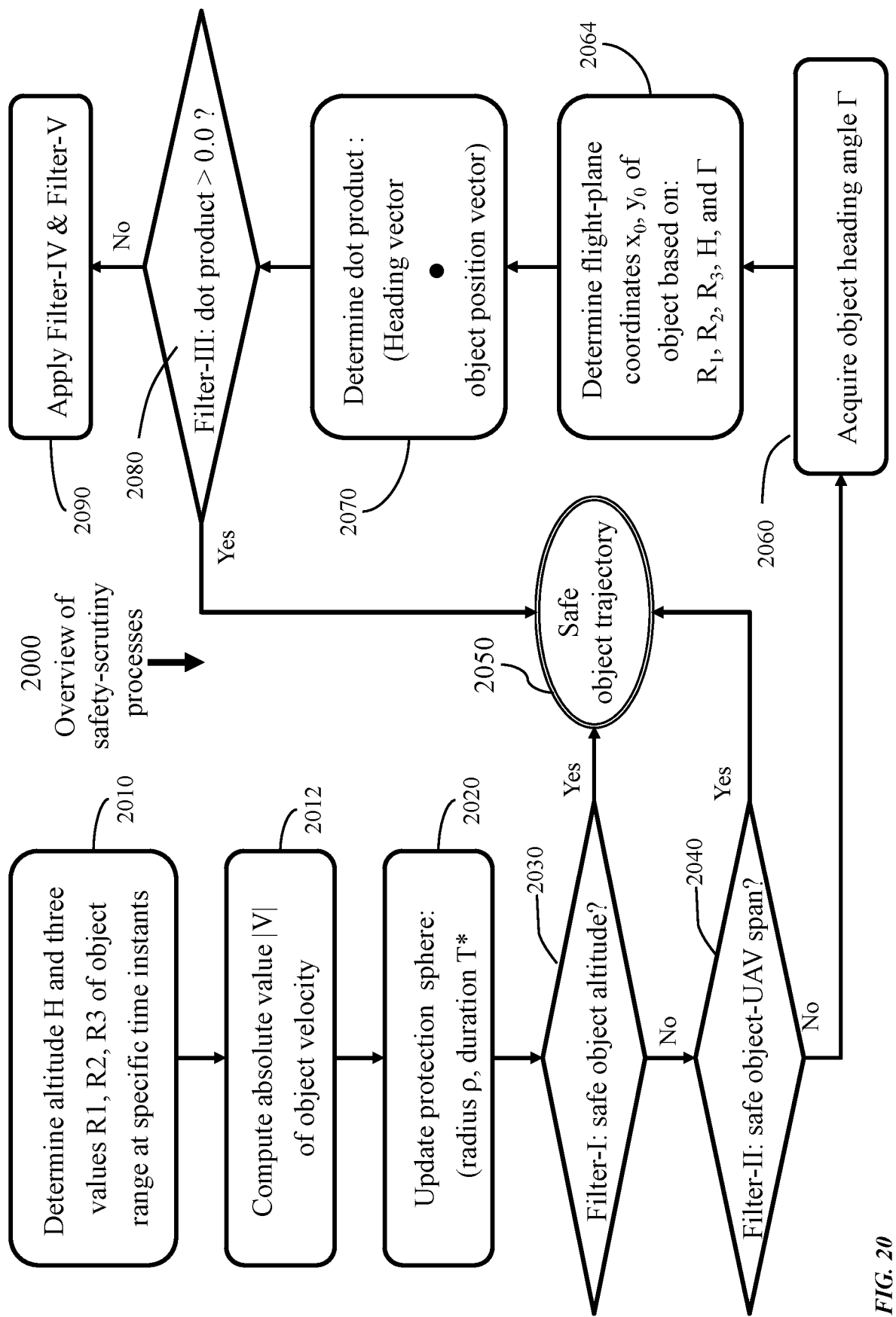
FIG. 20 illustrates an overview of safety-assessment method to determine potential risk of the object crossing the protection zone, in accordance with an embodiment of the present invention.

FIG. 20 illustrates an overview 2000 of a safety-assessment method for determining potential risk of the object crossing the protection zone. Process 2010 determines the altitude H and three values $R_1$, $R_2$, and $R_3$ of object's range at distinct time intervals as described above with reference to FIG. 9 and FIG. 10. The magnitude |V| of the object's velocity is determined in process 2012. Process 2020 updates the position, radius, and duration of protection sphere. Process 2030 applies a criterion of a first filter (Filter-I). Process 2040 applies a criterion of a second filter (Filter-II). Process 2050 indicates safe object trajectory at the time instant of the most recent interrogation. Process 2060 communicates with the object 140 to acquire heading information (angle Γ, angular displacement from the North direction)
Process 2064 determines coordinates $(x_0, y_0)$ of object within the flight plane according to current values of $R_1$, $R_2$, $R_3$, H, and Γ. Process 2070 computes the dot product of the relative position vector of the object and the heading vector. The relative position vector of the object is the vector connecting the center of the intersection circle of the horizontal flight plane 320 and the protection sphere 240 to the object. Process 2080 indicates either safe object trajectory or the need to apply further assessment criteria. Process 2090 invokes execution of subsequent filters (Filter-IV then Filter-V, or Filter-V directly).

Figure 21:
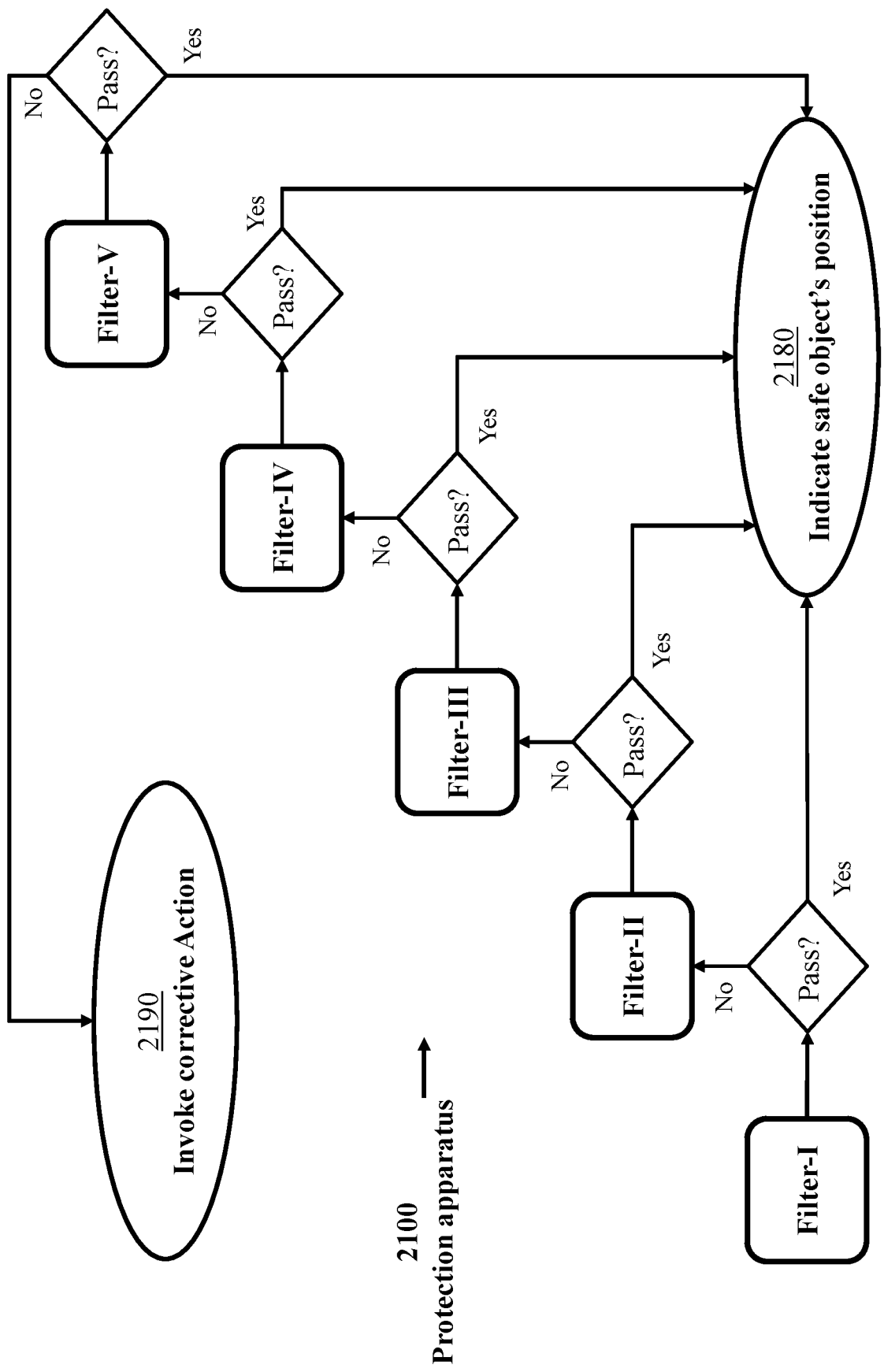
FIG. 21 illustrates a protection apparatus, in accordance with an embodiment of the present invention.

FIG. 21 illustrates a protection apparatus 2100 comprising five filters, labelled Filter-I, Filter-II, Filter-III, Filter-IV, and Filter-V to be detailed below. The five filters may employ separate hardware processors or share a pool of processors. The outcome of each of Filter-I, Filter-II, Filter-III, and Filter-IV is either "pass", i.e., a determination that the object is not bound to cross the protection zone or a determination that further examination of the object's path is needed. The outcome of Filter-V is either a determination that the object is not bound to cross the protection zone during a remaining operation time-interval of the UA or a determination that corrective action to modify the path of the UA is required (process 2190). Process 2180 indicates an "all clear" state.

Figure 22:
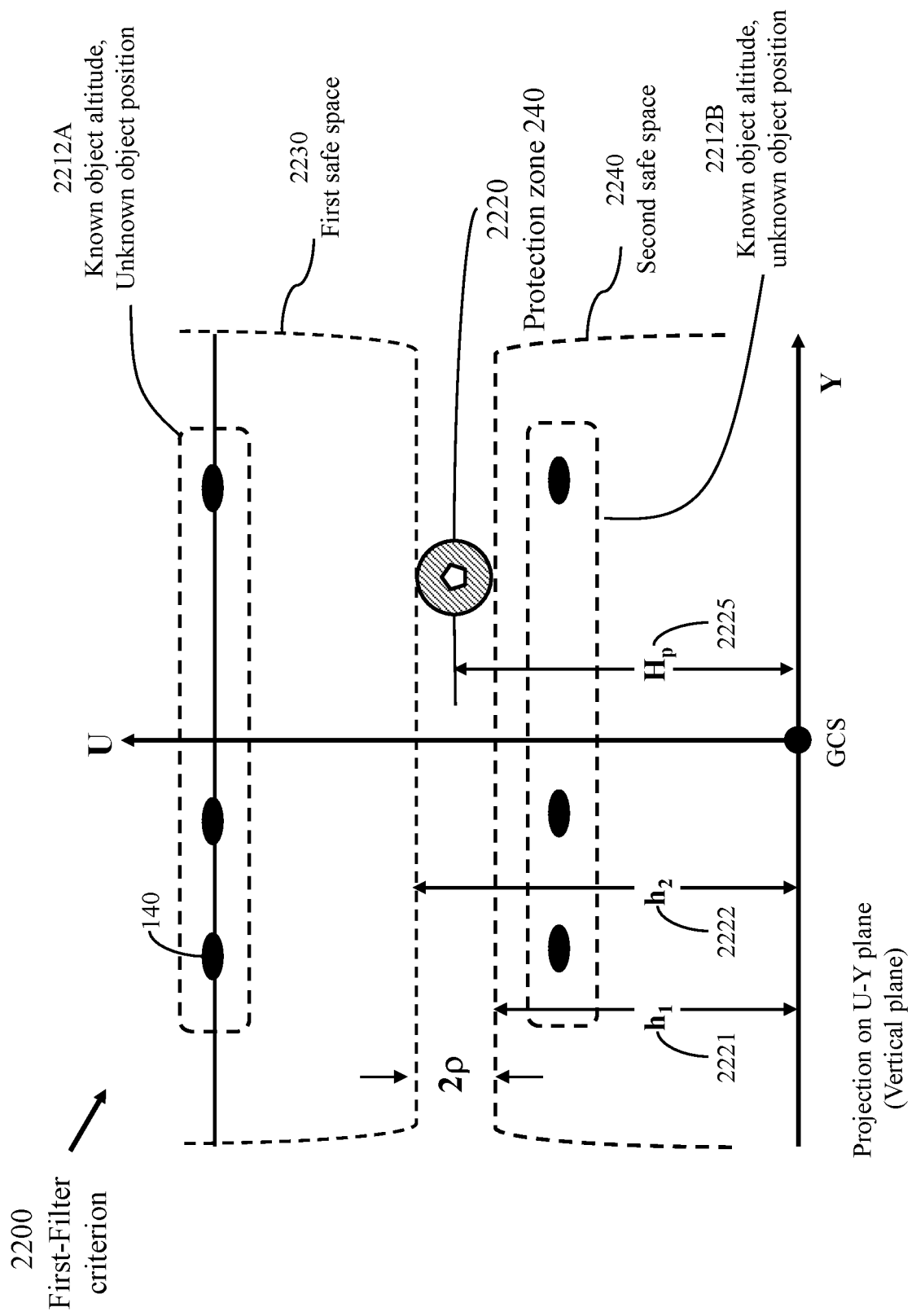
FIG. 22 illustrates a first criterion for assessing potential object crossing of the protection zone based solely on the altitude of the object, in accordance with an embodiment of the present invention.

FIG. 22 illustrates a first criterion 2200 for assessing potential object crossing of the protection zone based solely on the altitude of the object. The GCS frequently updates the location and radius of the protection sphere 240. Thus, at any instant of time the radius ρ and coordinates $(x_p, y_p, H_p)$ of the center of the current protection sphere are known. If the flight plane 320 of the object 140 is above the protection sphere (case 2212A) or below the protection sphere (case 2212B), the trajectory of the object is considered to be safe and no further action is taken other than to continuously track the object.

The altitude 2221 of the lowest tangential horizontal plane of the current protection zone is $(H_p-\rho)$. The altitude 2222 of the highest tangential horizontal plane of the current protection zone is $(H_p+\rho)$. A first safe space 2230 includes any point of altitude greater than $(H_p+\rho)$. A second safe space 2240 includes any point of altitude less than $(H_p-\rho)$.

Thus, presence of the object at any point within the first safe space or the second safe space is considered inconsequential.

Figure 23:
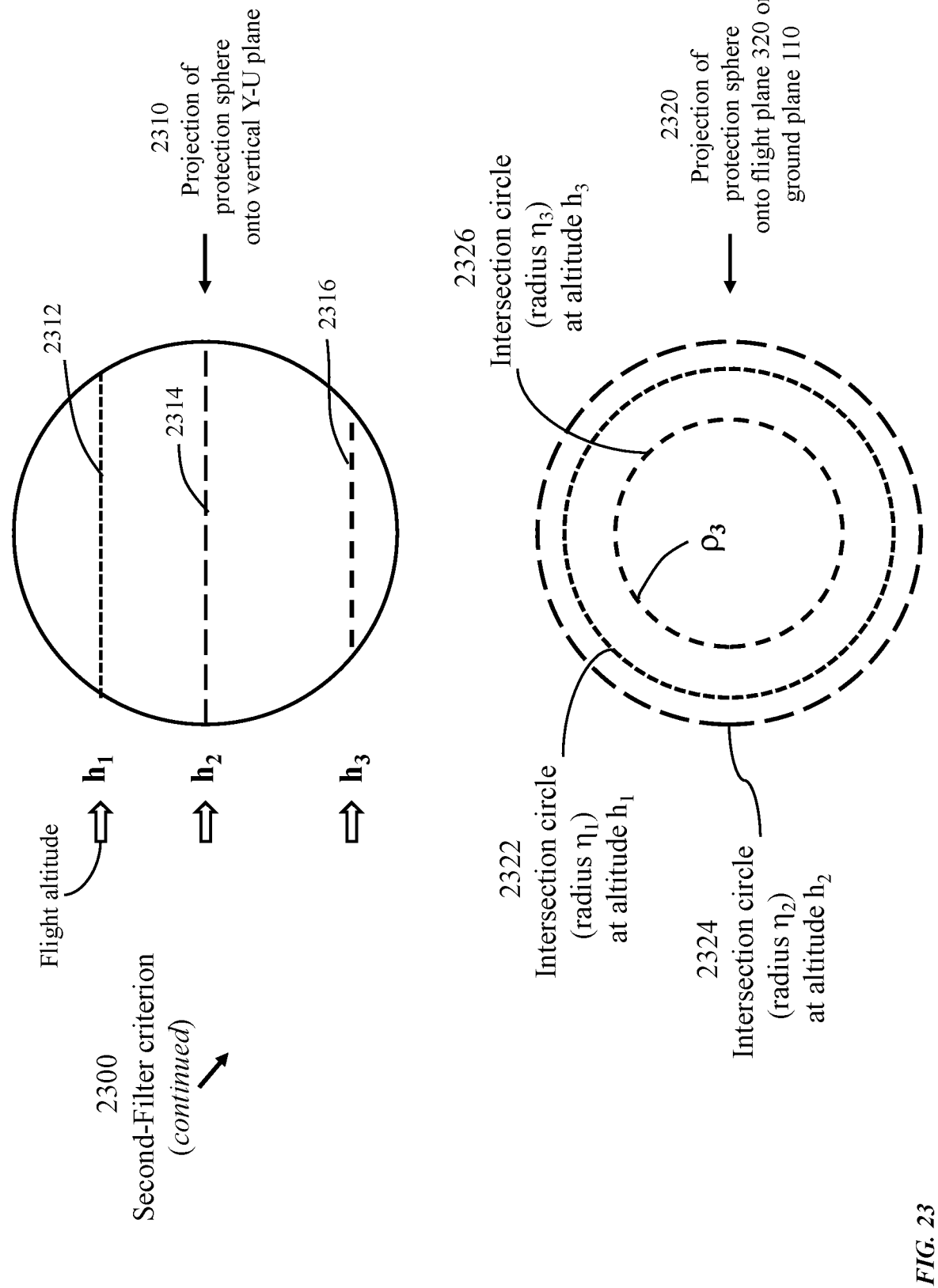
FIG. 23 illustrates views of potential intersections of the protection zone and the flight plane.

FIG. 23 illustrates views 2300 of potential intersection of the protection sphere and the flight plane 320, indicating projection 2310 of the protection sphere 240 onto the vertical Y-U plane, and intersection 2320 of the protection sphere with the flight plane, for values $h_1$, $h_2$, $h_3$ of object's altitude, where:

$$(H_p-\rho)<h_1<(H_p+\rho), (H_p-\rho)<h_2<(H_p+\rho), (H_p-\rho)<h_3<(H_p+\rho).$$

The projections of the circles of intersection onto the Y-U plane for $h_1$, $h_2$, and $h_3$ are indicated (reference 2312, 2314, and 2316, respectively). Intersection circle 2322 of radius $\eta_1$ corresponds to altitude $h_1$. Intersection circle 2324 of radius $\eta_2$ corresponds to altitude $h_2$. Intersection circle 2326 of radius $\eta_3$ corresponds to altitude $h_3$. The radii of the circles of intersection are determined as:

$$\eta_1^2=\rho^2-(h_1-Hp)^2, \eta_2^2=\rho^2-(h_2-Hp)^2, \eta_3^2=\rho^2-(h_3-Hp)^2.$$

Figure 24:
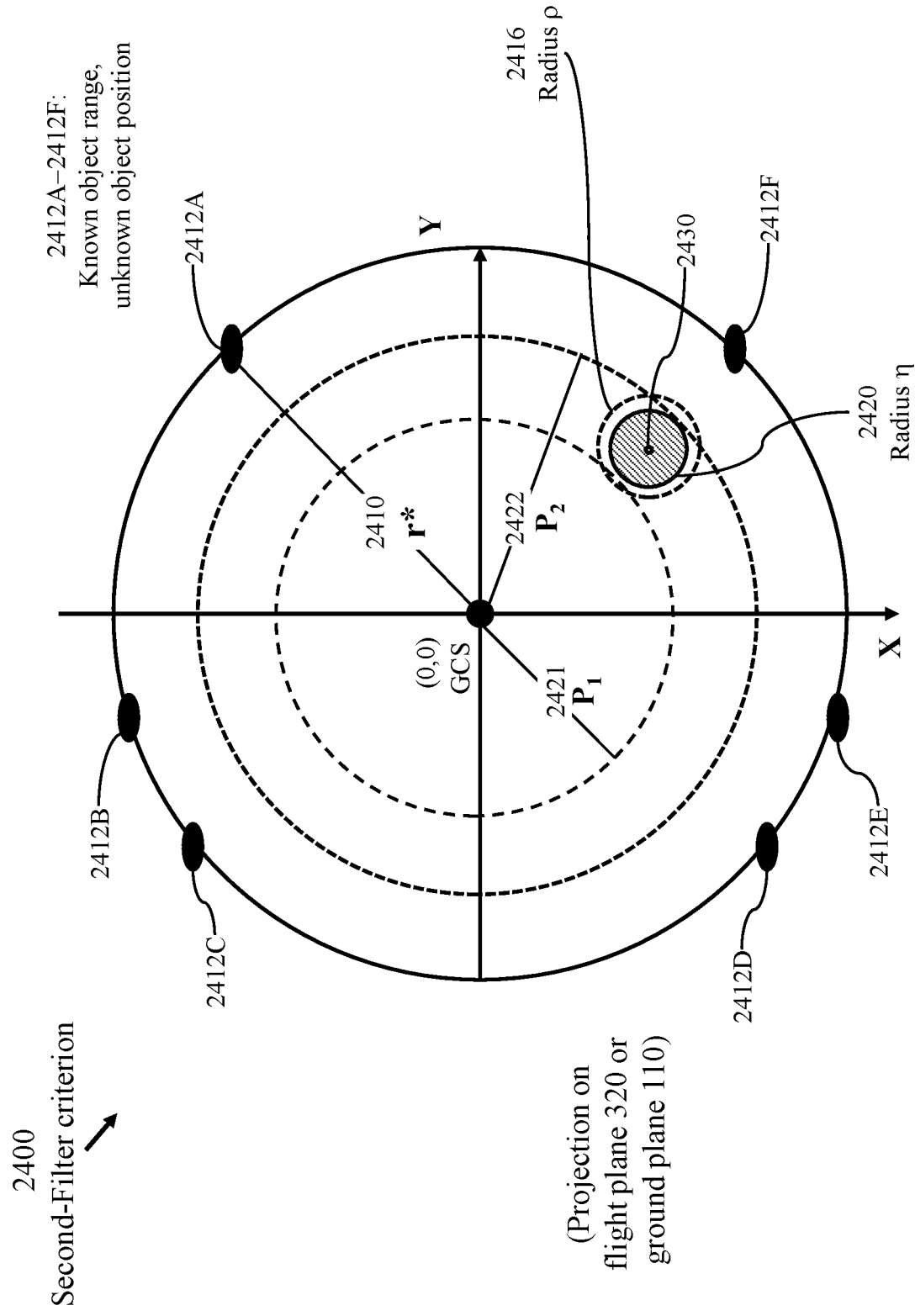
FIG. 24 illustrates a view of the intersection of the protection zone with the flight plane.

FIG. 24 illustrates a view 2400 of the intersection of the protection sphere 240 with the flight plane 320. The GCS frequently determines the range of the object 140. Thus, at any instant of time the range R* and altitude H* of the object 140 are known. The magnitude r* (reference 2410) of the projection of the position vector of the object onto the flight plane 320 is determined as $r^*=((R^*)^2-H^2)_{1/2}$. The object 140 may be present at any point on a circular contour of radius r*, center (0,0) within flight plane 320. As indicated, the object may be present at any of positions 2412A, 2412B, 2412C, 2412D, 2412E, 2412F. The second criterion is applied when it is determined that the altitude H* of the object is between $(H_p-\rho$ and $(H_p+\rho)$.

The radius ρ and coordinates $(x_p, y_p, H_p)$ of the center 2430 of the current protection sphere are known. The radius of the projection circle 2416 of current protection sphere onto the flight plane 320 equals p. The radius of the intersection circle 2420 of the current protection sphere and he flight plane 320 is η, 0<η≤ρ; $\eta^2=\rho^2-(H^*-H_p)^2$.

The radius 2421, denoted $P_1$, of the inner circle of center (0,0) that is tangential to the circle of intersection 2420 of the protection sphere and the flight plane 320 is determined as:

$$P_1=(x_p^2+y_p^2)^{1/2}-\eta.$$

The radius 2422, denoted $P_2$, of the outer circle of center (0,0) that is tangential to the projection circle 2420 of the protection sphere onto the flight plane 320 is determined as:

$$P2=(x_p^2+y_p^2)^{1/2}+\eta; P_2=P_1+2\times\eta.$$

Figure 25:
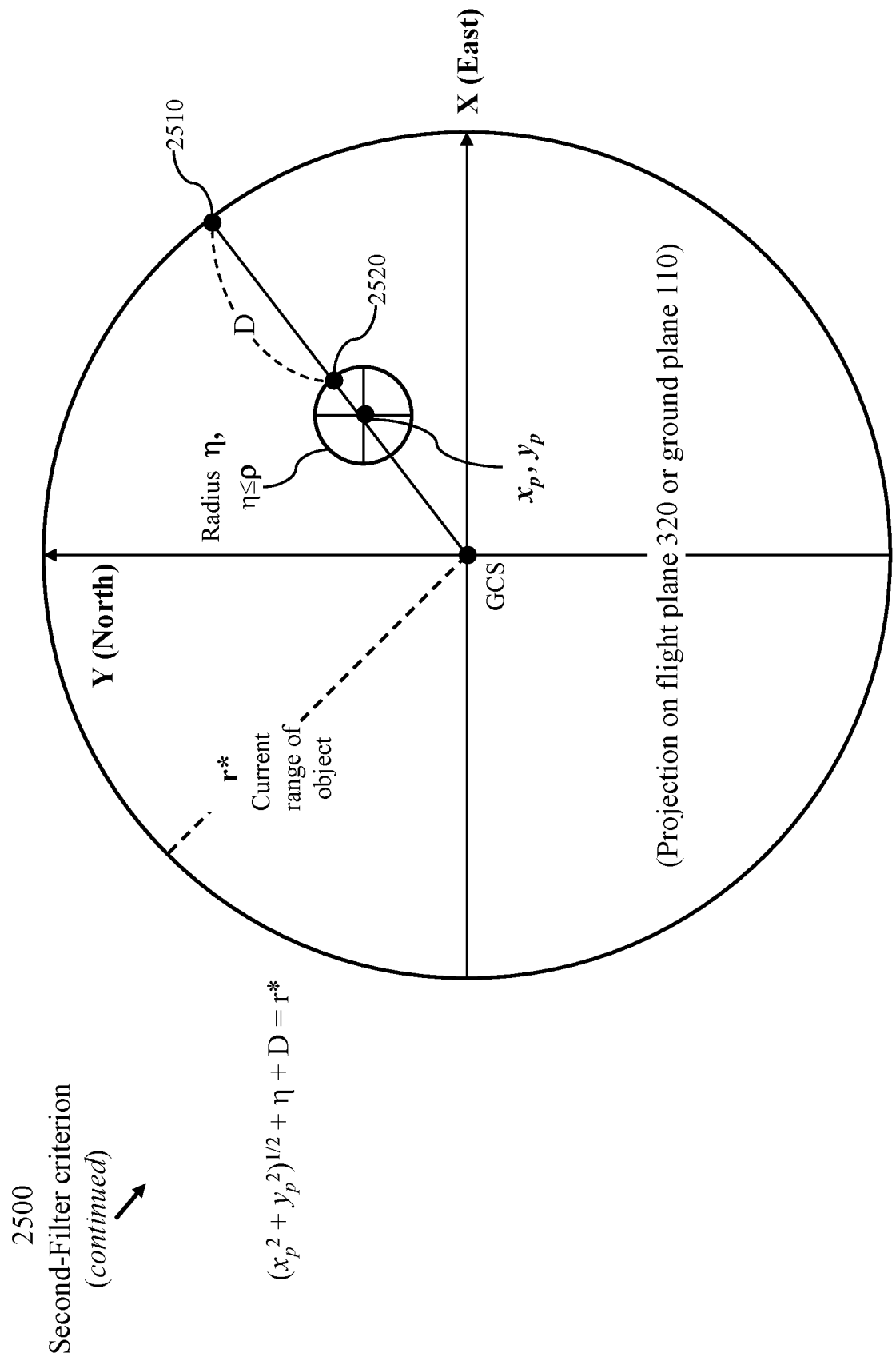
FIG. 25 illustrates a second criterion for assessing potential object crossing of the protection zone based on worst-case potential proximity of the object to the boundary of the protection zone, in accordance with an embodiment of the present invention.

FIG. 25 illustrates a second criterion 2500 (applied to Filter-II) for assessing potential object crossing of the protection zone based on worst-case potential proximity of the object to the boundary of the protection zone.

The current distance D of the object to protection sphere is determined as:

$$D=r^*-\eta-(x_p^2+y_p^2)^{1/2}.$$

If the travel time of the object from the current position to the border of the protection sphere is less than an assigned duration of the protection sphere, the path of the object is considered to be threatening to the protection zone. It is noted that this assessment is based on a worst condition determined according to the range of the object without knowledge of the actual position of the object or the actual direct of flight. Further examination may determine that the object is moving away from the protection sphere.

Filter-III, Filter-IV, and Filter-V, described below rely on knowledge of the direction of flight. Applying Filter-I and Filter-II may ascertain safety for a current position of the object without the need to activate any of Filter-III, Filter-IV, and Filter-V. However, even if safety is assured according to any of the filters, frequent re-assessment is needed, even if the speed of the object is determined to be constant and the object's path remains at a constant altitude and heading. A compelling reason for re-assessment is the time-varying position of the protected asset (at the center of the protection sphere).

Figure 26:
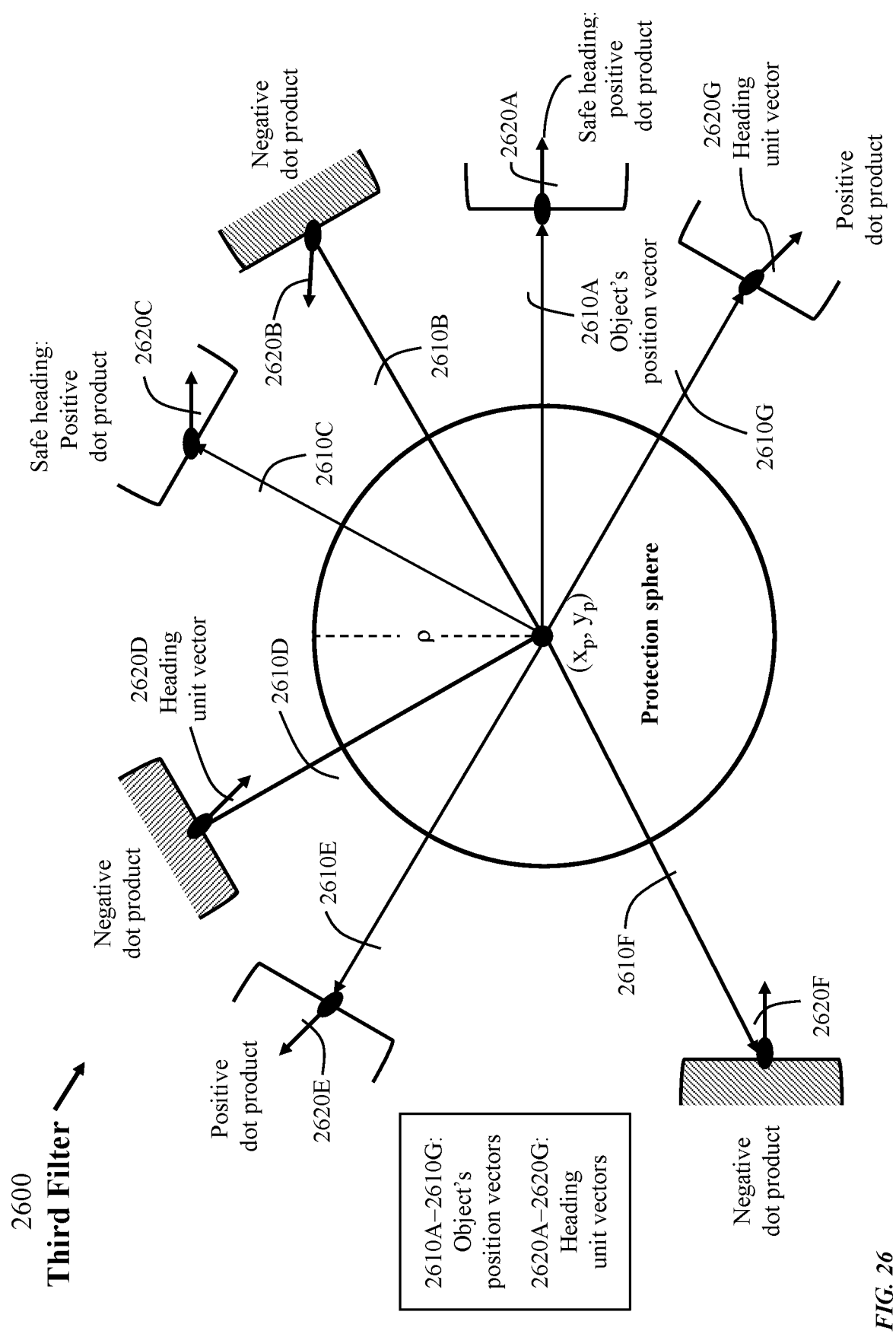
FIG. 26 illustrates a third criterion for assessing potential object crossing of the protection zone, based on the dot product of the position vector of the object and the object's heading, in accordance with an embodiment of the present invention.

FIG. 26 illustrates a third criterion 2600 for assessing potential object crossing of the protection zone, based on the dot product of the object's heading and the relative position vector of the object with respect to the center of the circle of intersection 2420.

Seven positions vectors 2610A to 2610G of the object and corresponding heading vectors, 2620A to 2620G, are illustrated. The heading vector may be determined as unit vectors (of magnitude 1.0, each) based on the angular displacement Γ of the flight line from the North direction (the Y axis). Thus, for a specific value of Γ, the projection of the heading unit vector on the X-axis (East direction) is (sin Γ) and the projection of the heading unit vector on the Y-axis (North direction) is (cos Γ).

As illustrated, the dot product of relative position vector 2610A and heading vector 2620A is positive. Thus, the object is moving away from the circle of intersection 2420. Likewise, the dot products corresponding to position vectors 2610C, 2610E, and 2610G are positive indicating the object is moving away from the circle 2420 of intersection of the protection sphere 240 and the flight plane.

The dot product of relative position vector 2610B and heading vector 2620B is negative; indicating that the object is moving towards the circle of intersection 2420 but not necessarily crossing the protection sphere 240. Likewise, the dot products corresponding to position vectors 2610D and 2610F are negative. Where the dot product is negative, the object's trajectory is further examined to determine whether the object is destined to cross the protection sphere 240.

Figure 27:
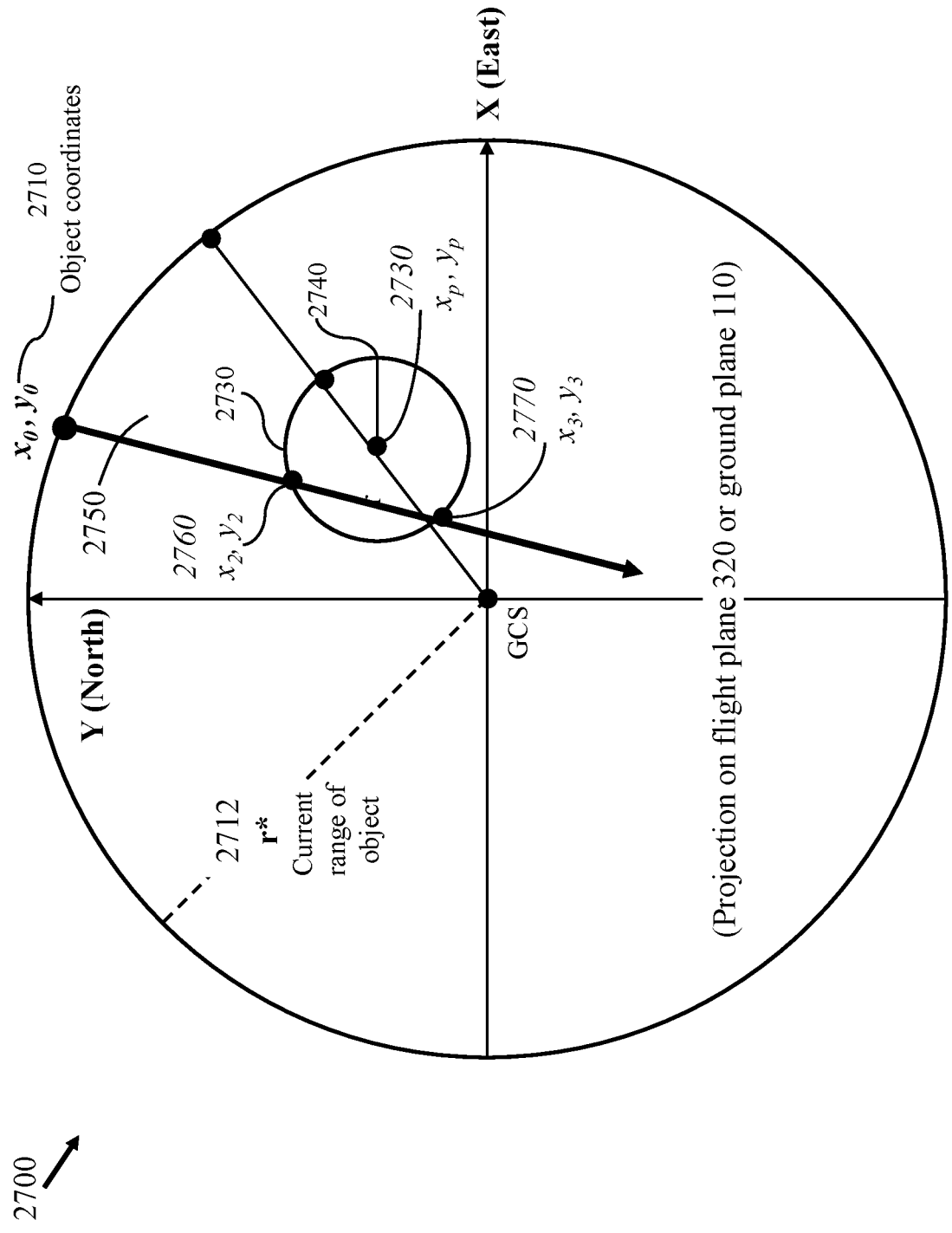
FIG. 27 illustrates a snapshot of an object's crossing of the protection zone.

FIG. 27 illustrates a snapshot 2700 of an object's crossing of the protection sphere 240. The projection 2712 of the current range of object, denoted r*, and the objects coordinates 2710 within flight plane 320, denoted $(x_0, y_0)$, are determined as described above. The radius η, 0<η≤ρ, (reference 2740) of the intersection circle 2720 of protection sphere and flight plane 320, and the coordinates $(x_p, y_p)$ of the center of the intersection circle (reference 2730) are determined as illustrated in FIG. 23. The heading of the object's path 2750 within the flight plane 320 has been acquired from the object.

To determine whether the object's path is bound to cross the protection sphere, and the distance between a current position of the object and the first point of intersection with the protection sphere, the coordinates $(x_2, y_2)$ of a first intersection point (reference 2760) of object's path 2750 and intersection circle 2720, and coordinates $(x_3, y_3)$ of a second intersection point (reference 2770) of object's path 2750 and intersection circle 2720 are computed. If the coordinates are real numbers, it is determined that the object's path is destined to cross the protection sphere after a period of time determined as the distance D* between the current position of the object and the calculated intersection point 2760; $D^*=((x_2-x_p)^2+(y_2-y_p)^2)^{1/2}$.

Figure 28:
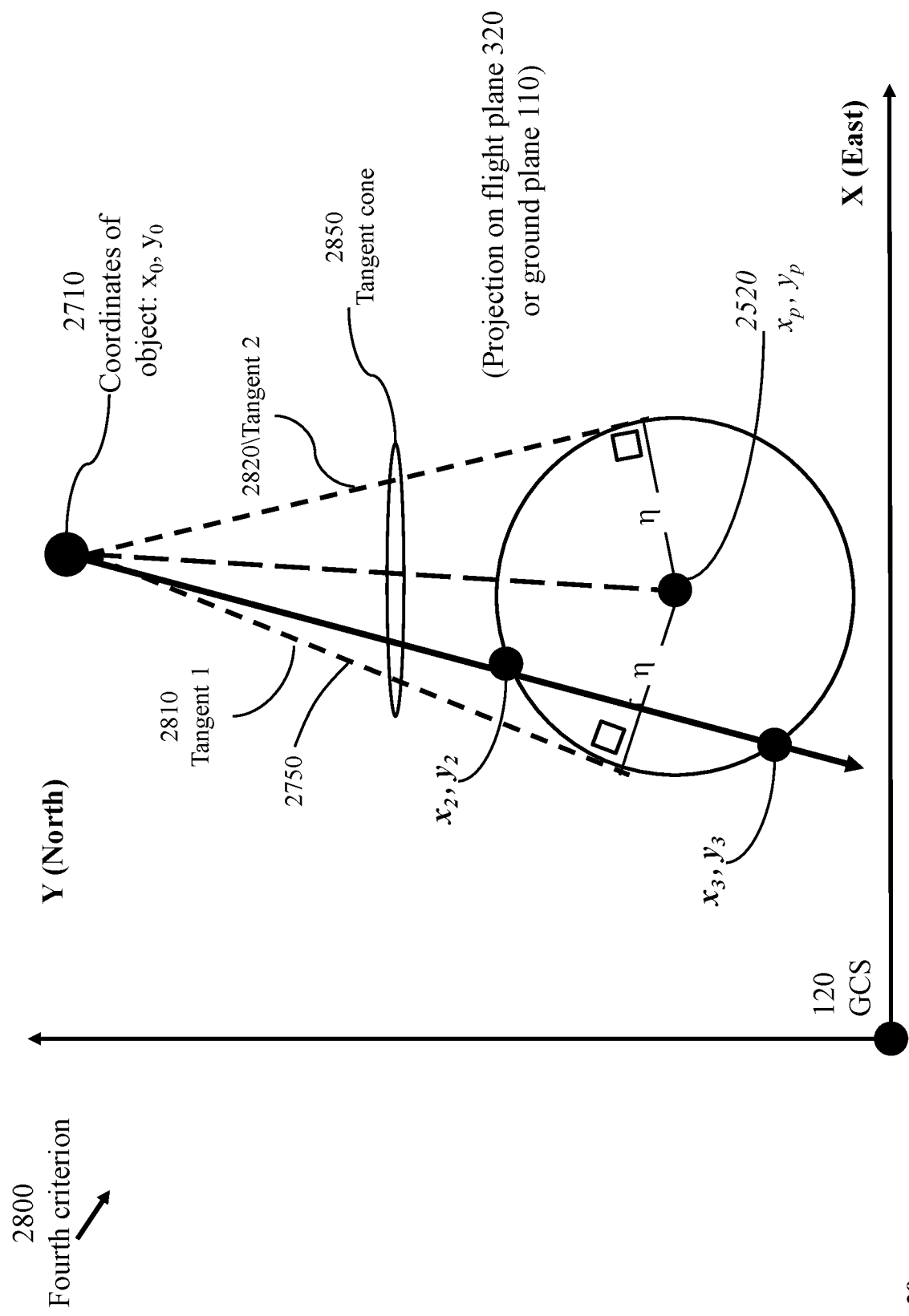
FIG. 28 illustrates a tangent cone of a spherical protection zone, the apex of the cone being a current position of the object.

FIG. 28 illustrates projection 2800 onto the flight plane 320 of a tangent cone of the spherical protection zone, the apex of the cone being a current position of the object. The object's path 2750, from the current position (coordinates $(x_0, y_0)$) of the object crosses the protection sphere 240 if the path is within the interior angle of a first tangential line 2810 of the intersection circle 2720 from the current position of the object and a second tangential line 2820 of the intersection circle 2720 from the position of the object. The interior angle is less than π radians.

Figure 29:
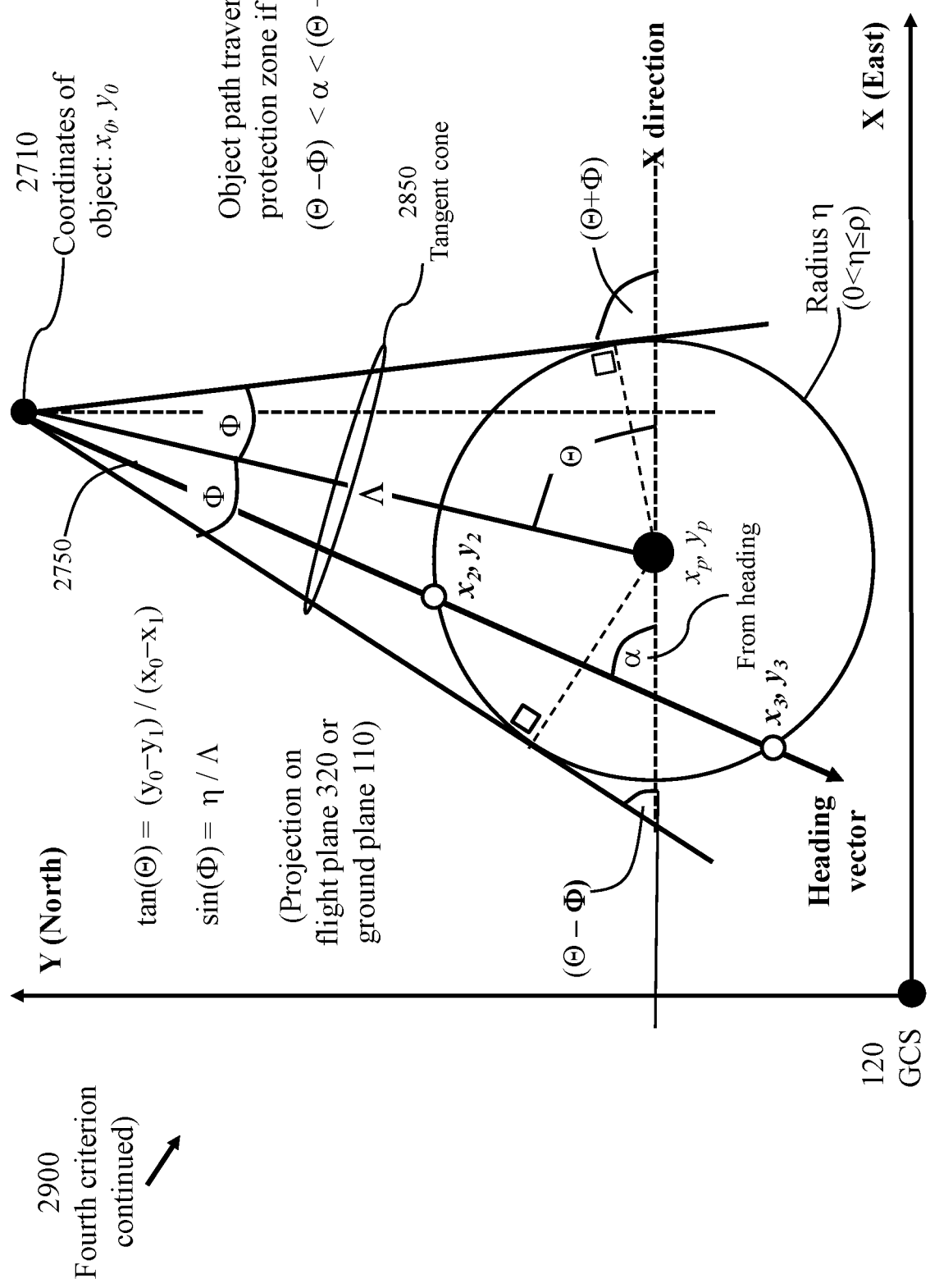
FIG. 29 illustrates a fourth criterion for assessing potential object crossing of the protection zone, based on presence, or otherwise, of the line of flight within the tangent cone, in accordance with an embodiment of the present invention.

FIG. 29 illustrates a fourth criterion 2900 for assessing potential object crossing of the protection zone, based on presence, or otherwise, of the line of flight within the tangent cone.

Figure 30:
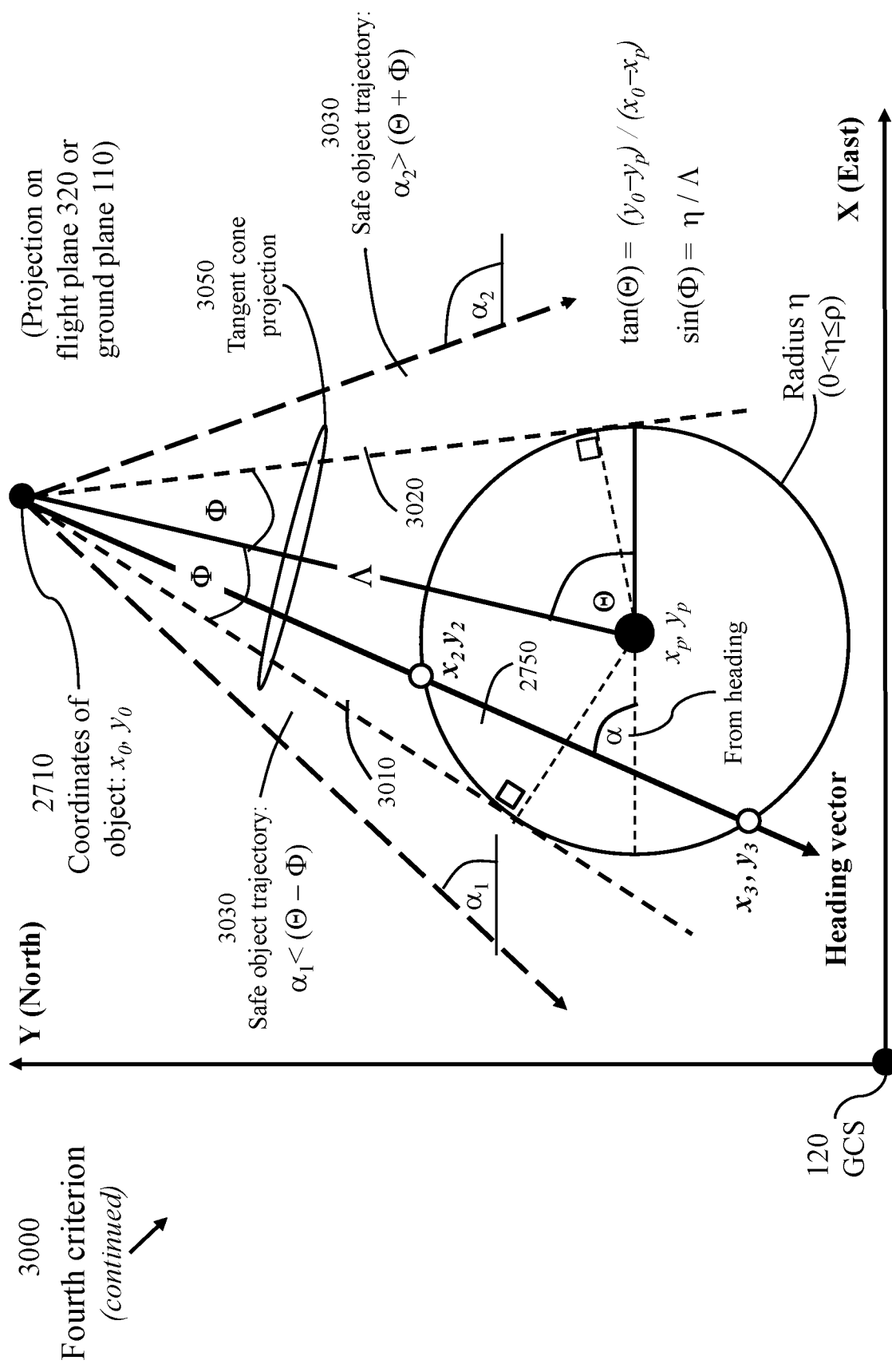
FIG. 30 further details the fourth criterion.

FIG. 30 depicts details 3000 of the fourth criterion for assessing the risk of the object crossing the protection zone. A first tangential line 3010 of the intersection circle 2720 from the object (coordinates $(x_0, y_0)$ within the flight plane 320 defines a first boundary of the projection of the tangent cone. A second tangential line 3020 of the intersection circle 2720 from the object (coordinates $(x_0, y_0)$ within the flight plane 320 defines a second boundary of the projection of the tangent cone.

The distance Λ from the object's position to the center of the circle of intersection is determined as: $\Lambda=((x_0-x_p)^2+(y_0-y_p)^2)^{1/2}$.

The angle Θ between the line from the object to the center of the circle of intersection and the X-axis (East direction) is determined from: $\tan\Theta=(y_0-y_p)/(x_0-x_p)$.

The angle Φ between the line from the object to the center of the circle of intersection and tangent 3010 or tangent 3020 is determined from: $\sin(\Phi)=\eta/\Lambda$.

The angular displacement $\alpha_1$ of an object's path 3030 from the X-axis is less than $(\Theta-\Phi)$. Thus, the path is exterior to the tangent cone indicating that the object is moving away from the protection sphere 240. The angular displacement $\alpha_2$ of an object's path 3030 from the X-axis is greater than (Θ+Φ). Thus, the path is exterior to the tangent cone indicating that the object is moving away from the protection sphere 240.

Figure 31:
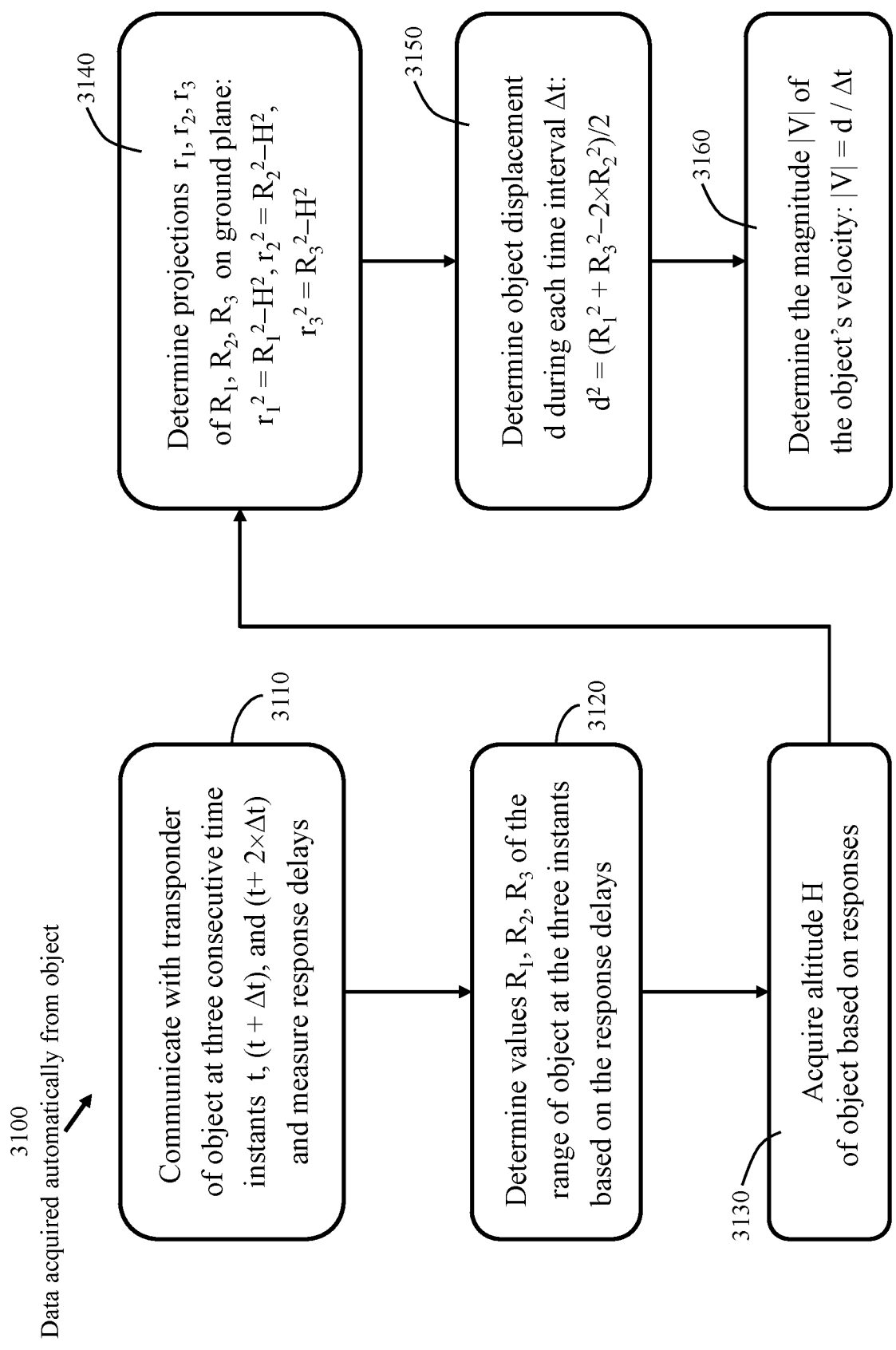
FIG. 31 illustrates frequent acquisition of data through communication with the object, the data including altitude and round-trip delay, to be used for determining current speed of the object.

FIG. 31 illustrates processes 3100 of frequent acquisition of data through communication with the object, the data including altitude and round-trip delay, to be used for determining current speed of the object. Process 3110 communicates with a transponder of the object at three distinct, consecutive, time instants, for acquiring flight altitude, and measuring respective round-trip delays, the time instants are preferably evenly spaced, sent at time instants $\tau$, $(\tau+\Delta t)$, $(\tau+2\times\Delta t)$. Process 3120 determines values $R_1$, $R_2$, and $R_3$ of the object range at the three time-instants based on the round-trip delays. Process 3130 determines the altitude H of the object based on the responses from the transponder.

Process 3140 computes the magnitudes $r_1$, $r_2$, and $r_3$ of the projections of the position vectors onto the flight plane 320. Process 3150 determines object displacement magnitude, d, during each time interval $\Delta t$:

$$d^2 = (R_1^2 + R_3^2 - 2\times R_2^2)/2 = (r_1^2 + r_3^2 - 2\times r_2^2)/2.$$

Process 3160 determines the magnitude of velocity $|V|$.

Figure 32:
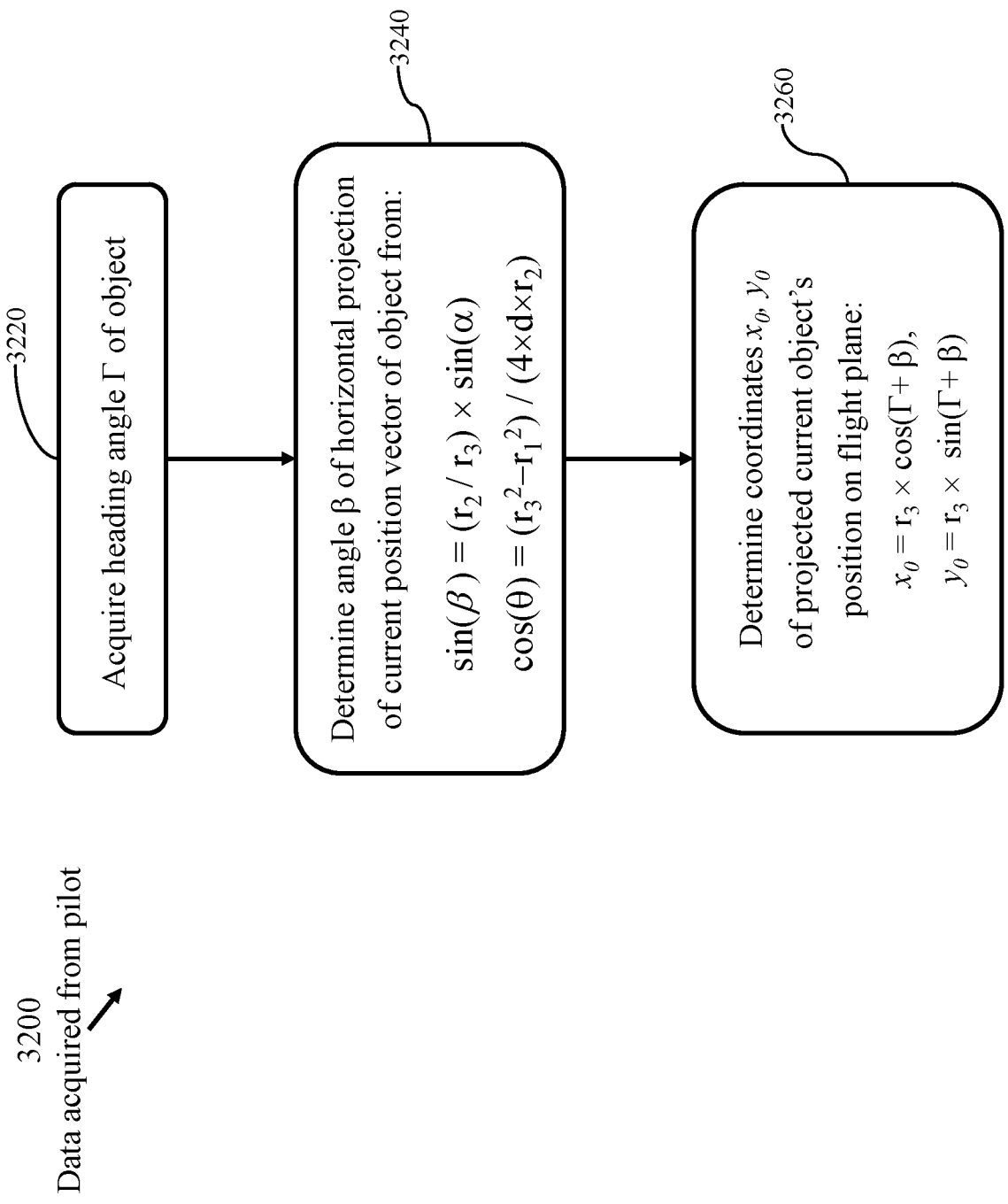
FIG. 32 illustrates a method of determining a current position of the object using heading information received from a human pilot of the object for use, together with the data of FIG. 29, in accordance with an embodiment of the present invention.

FIG. 32 illustrates a method 3200 of determining a current position of the object using heading information received from a human pilot of the object for use, together with the data of FIG. 29. Process 3220 acquires heading data from the object indicating the angular displacement, $\Gamma$, of the object path from the North direction (the Y axis). Process 3240 determines the angular displacement $\beta$ of the flight heading from the projection of the current position vector of the object onto the flight plane 320:

$$\sin(\beta) = (r_2 \times \sin(\theta))/r_3, \text{ where } \theta \text{ is determined from:}$$
$$\cos(\theta) = (r_3^2 - r_1^2)/(4 \times d \times r_2).$$

Process 3260 computes coordinates of the current position of the object:

$$\{r_3 \times \sin(\beta+\Gamma), r_3 \times \sin(\beta+\Gamma), H\}.$$

Figure 33:
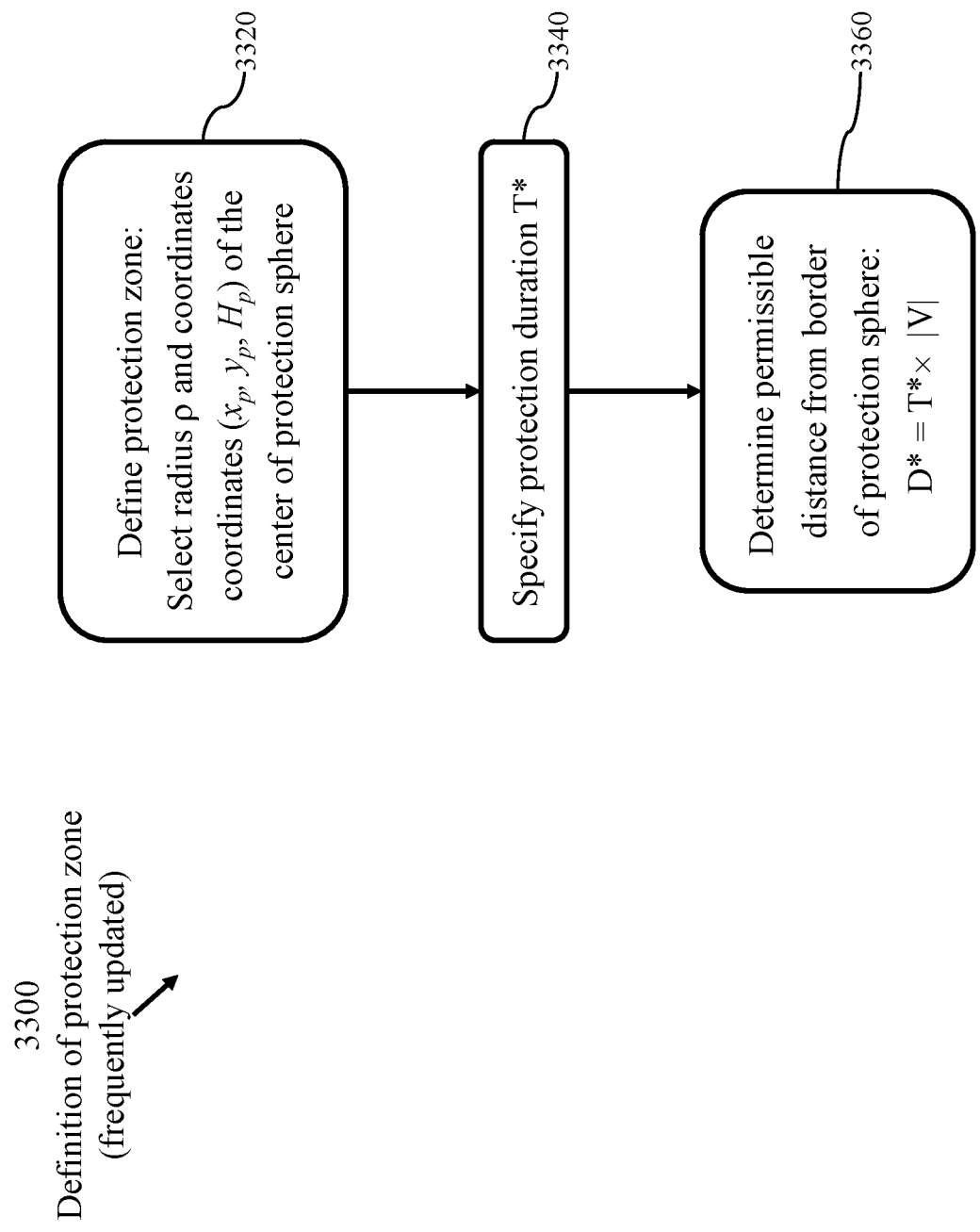
FIG. 33 illustrates definition of the protection zone as a spherical zone of a specified center and radius.

FIG. 33 illustrates definition 3300 of the protection zone as a spherical zone of a specified center and radius. Process 3320 selects a radius $\rho$ and center coordinates $(x_p, y_p, H_p)$ of a protection sphere. Process 3340 specifies corresponding protection duration T*. Process 3360 determines permissible proximity D* to the border of the protection sphere: $D^* = T^* \times |V|$.

Figure 34:
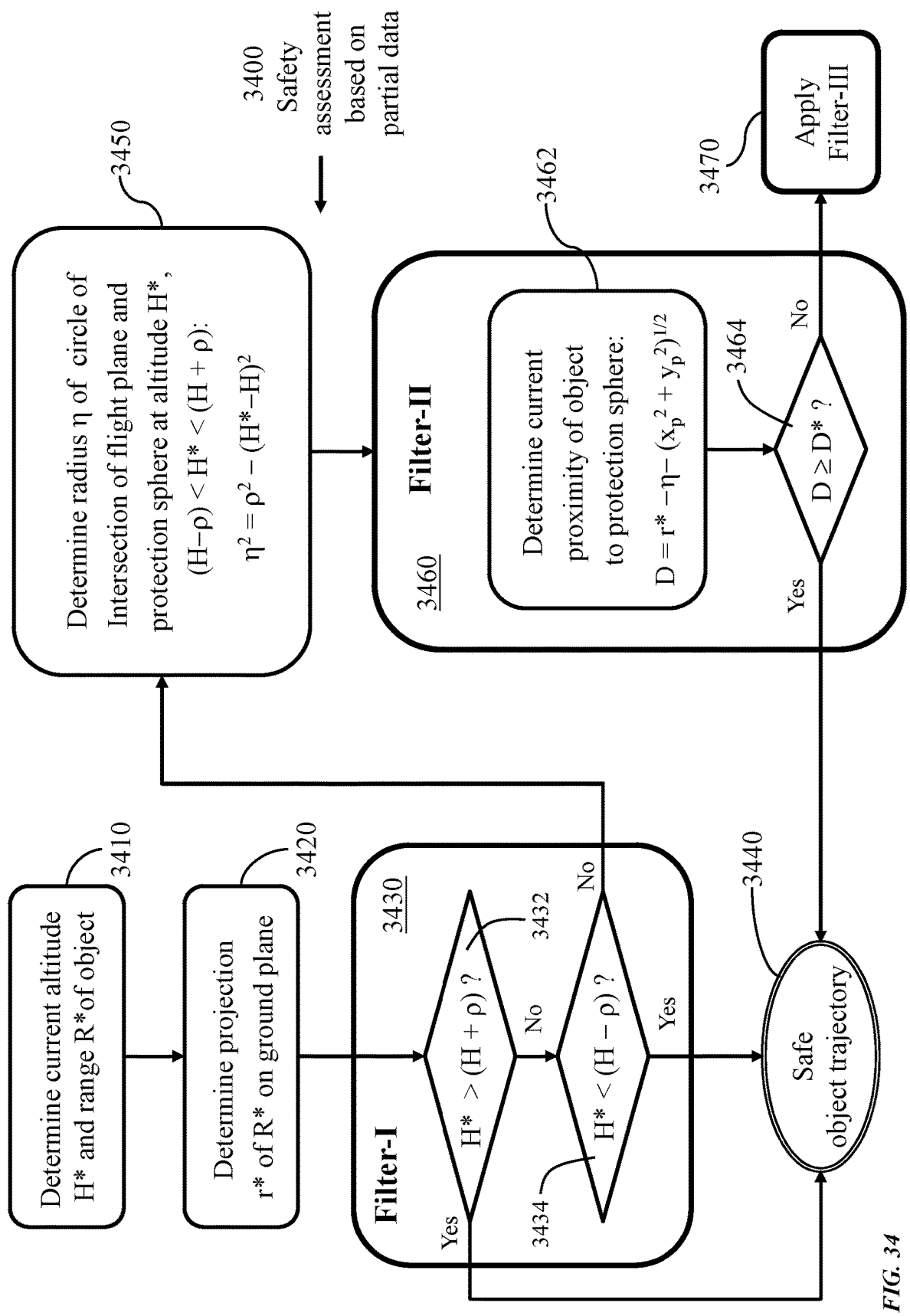
FIG. 34 illustrates an algorithm for protection-zone safety assessment implementing the criterion of Filter-I and the criterion of Filter-II, in accordance with an embodiment of the present invention.

FIG. 34 illustrates algorithm 3400 for protection-zone safety assessment implementing the criterion of Filter-I and the criterion of Filter-II. The algorithm is based on partial data acquired from a transponder of the object.

Process 3410 determines a current altitude H* and a current range R* of the object according to either the method of FIG. 7 and FIG. 8 or the method of FIG. 9 and FIG. 10. Process 3420 computes the magnitude r* of the projection of the position vector of the object on flight plane 320 (or ground plane 110). Process 3430 applies the criterion of Filter-I according to which the object's trajectory may be considered safe for the protection zone or that further examination of the trajectory is needed. If the current altitude H* is higher than the altitude of an upper horizontal tangential plane of the protection sphere, or lower than the altitude of a lower horizontal tangential plane of the protection sphere, process 3440 is activated to indicate a safe object trajectory with respect to the protection zone.

Otherwise, process 3450 computes the radius $\eta$, $0 < \eta \leq \rho$, of the intersection circle of the flight plane 320 and the protection sphere. The radius $\eta$ is determined from: $\eta^2 = \rho^2 - (H^* - H)^2$. Process 3460 applies the criterion of Filter-II which determines whether the object's trajectory is safe for the protection zone or that further examination of the trajectory is needed. Process 3462 determines current proximity D of object to protection sphere: $D = r^* - \eta - (x_p^2 + y_p^2)^{1/2}$. If the travel time $(D/|V|)$ equals, or exceeds, the specified protection duration (process 3464), process 3440 is activated. Otherwise, the criterion of Filter-III is applied (process 3470).

Figure 35:
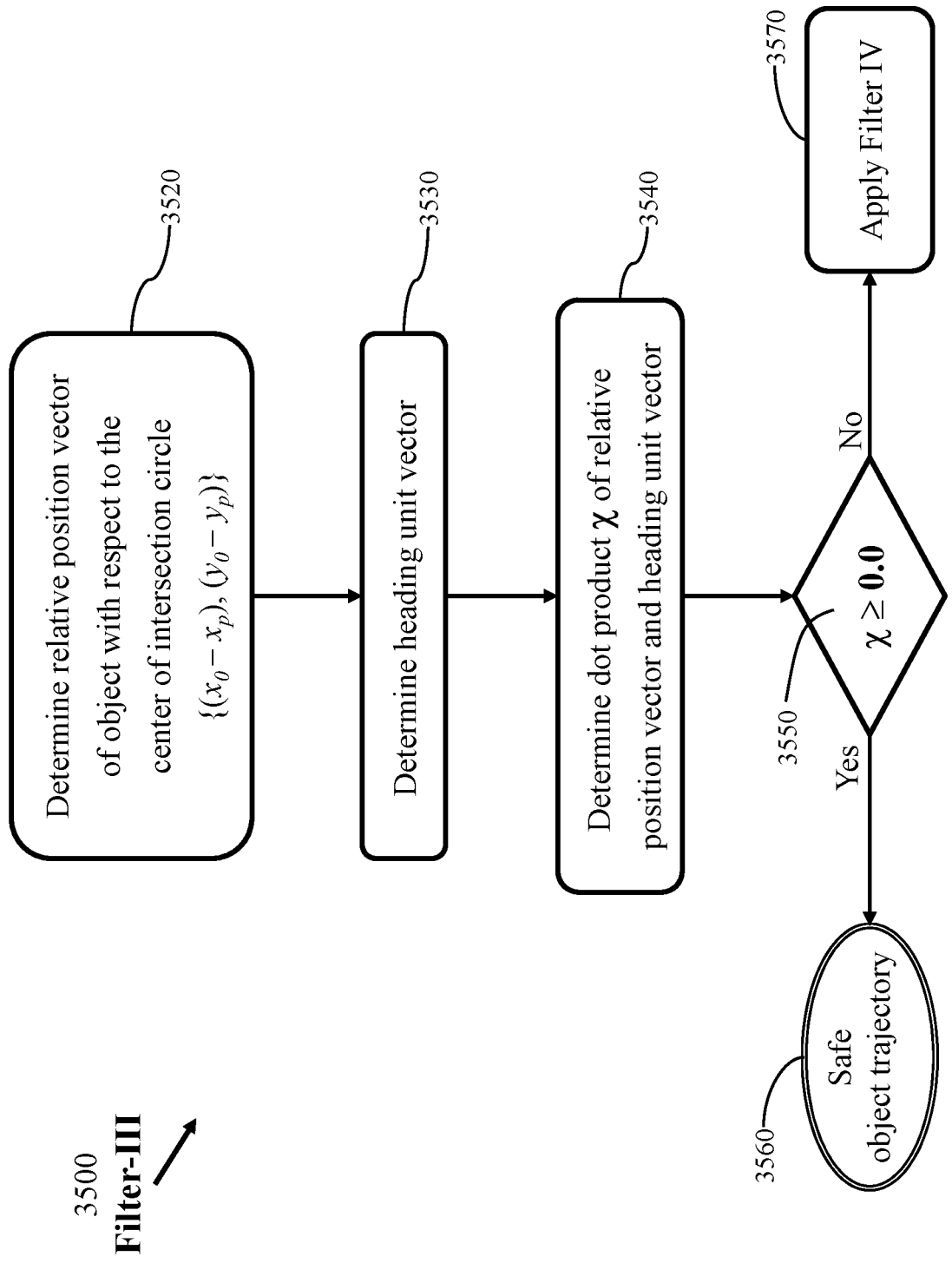
FIG. 35 illustrates an algorithm implementing the third criterion of FIG. 26, in accordance with an embodiment of the present invention.

FIG. 35 illustrates an algorithm 3500 implementing the third criterion of FIG. 26. The algorithm is invoked in process 3470. Process 3520 determines the current relative position-vector of the object with respect to the center of the protection sphere. Process 3530 determines a heading unit vector based on heading data received from a pilot of the object. Process 3540 computes a dot product $\chi$ of the relative position vector and the heading unit vector.

Process 3550 determines whether further safety assessment is needed. If the dot product $\chi$ is zero or positive, the object would be moving away from the protection sphere and process 3560 revisits application of Filter-I, then possibly Filter-II, etc., to account for changes of the protection zone and changes of the flight path. If the dot product $\chi$ is negative, further examination of the trajectory would be needed. The criterion of Filter-IV may be applied (process 3570) to determine whether the trajectory is safe. If Filter-IV determines that the trajectory may not be safe, the criterion of Filter-V is applied to provide a definite answer. Alternatively, the criterion of Filter-V may be applied directly if process 3550 determines that the dot product $\chi$ is negative.

Figure 36:
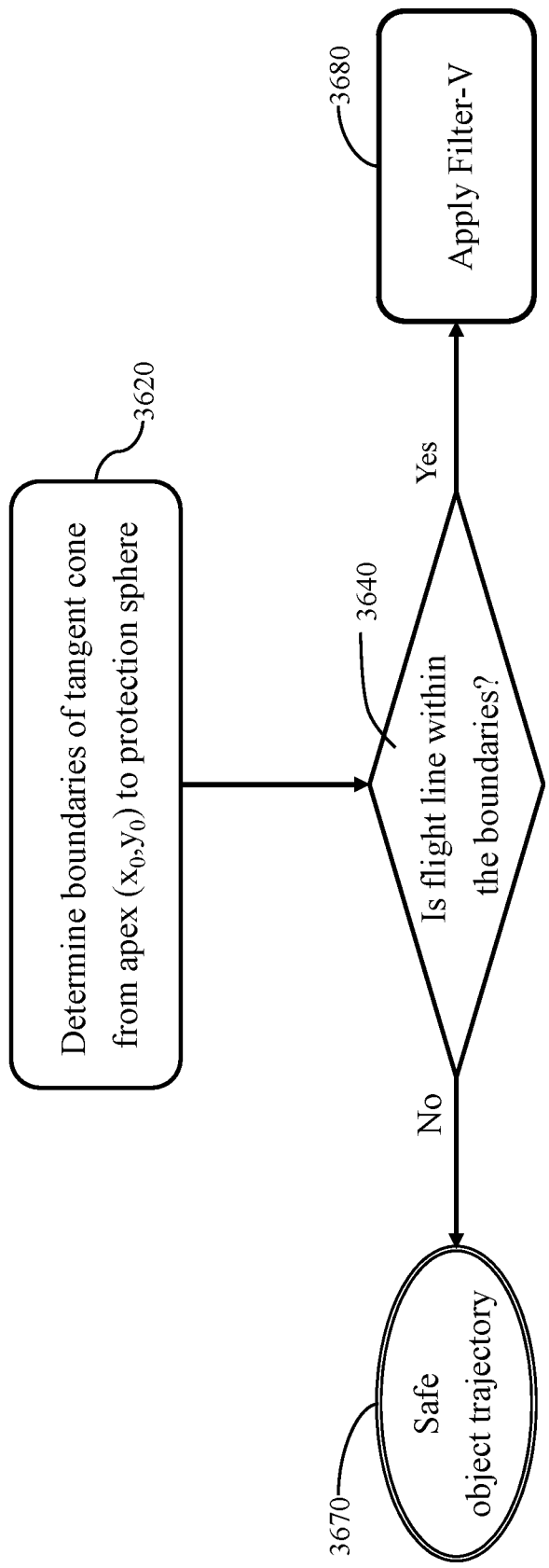
FIG. 36 depicts an overview of implementation of the fourth criterion, in accordance with an embodiment of the present invention.

FIG. 36 depicts an overview 3600 of implementation of the criterion of Filter-IV. Process 3620 determines boundaries of the projection onto the flight plane of a tangent cone of the spherical protection sphere with the current object position as the apex of the cone. Process 3640 of determining whether the flight path is within the projection of the tangent cone. Process 3670 of indicating a safe object trajectory but revisits application of Filter-I, then possibly Filter-II, etc., to account for changes of the protection zone and changes of the flight path. Process 3680 applies the criterion of Filter-V when process 3640 indicates that the flight path crosses the protection sphere 240.

Figure 37:
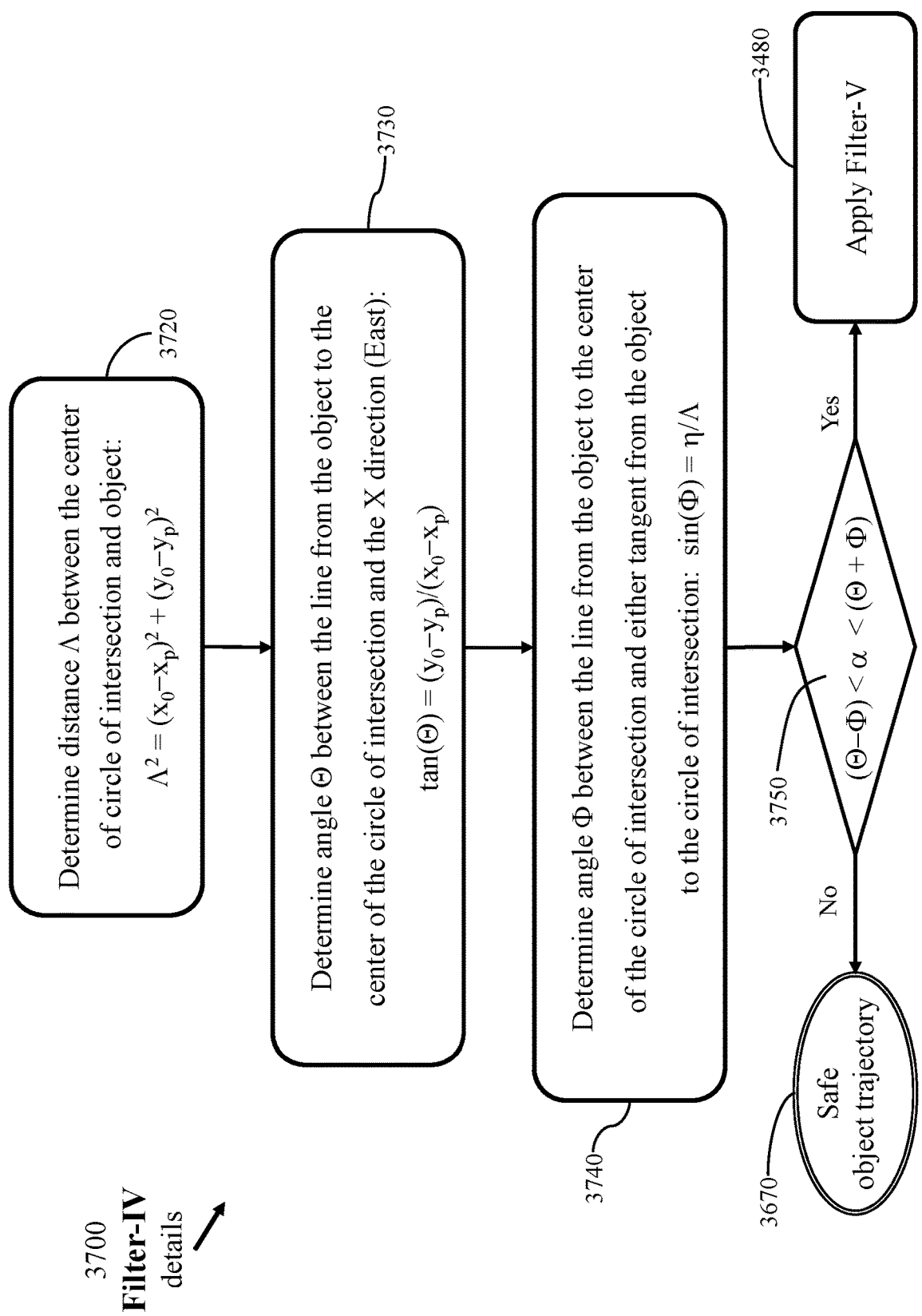
FIG. 37 illustrates an algorithm for implementing the fourth criterion for assessing potential object crossing of the protection zone, in accordance with an embodiment of the present invention.

FIG. 37 illustrates an algorithm 3700 for implementing the criterion of filter-IV. The algorithm is invoked in process 3570. Process 3720 computes the distance $\Lambda$ between the object and the center of the circle of intersection of the flight plane 320 and the protection sphere 240:

$$\Lambda^2 = (x_0 - x_p)^2 + (y_0 - y_p)^2.$$

Process 3730 determines the angle $\theta$ between the line from the object to the center of the circle of intersection and the X-axis (East direction): $\tan\Theta = (y_0 - y_p)/(x_0 - x_p)$. Process 3740 determines the angle $\Phi$ between the line from the object to the center of the circle of intersection and either projected tangent from the object to the circle of intersection: $\sin(\Phi) = \eta/\Lambda$.

Process 3750 applies the condition for the object trajectory to be within the tangent cone:

$$(\Theta - \Phi) < \alpha < (\Theta + \Phi),$$

$\alpha$ being the angular displacement between the flight line and the East direction (the X-axis).

Figure 38:
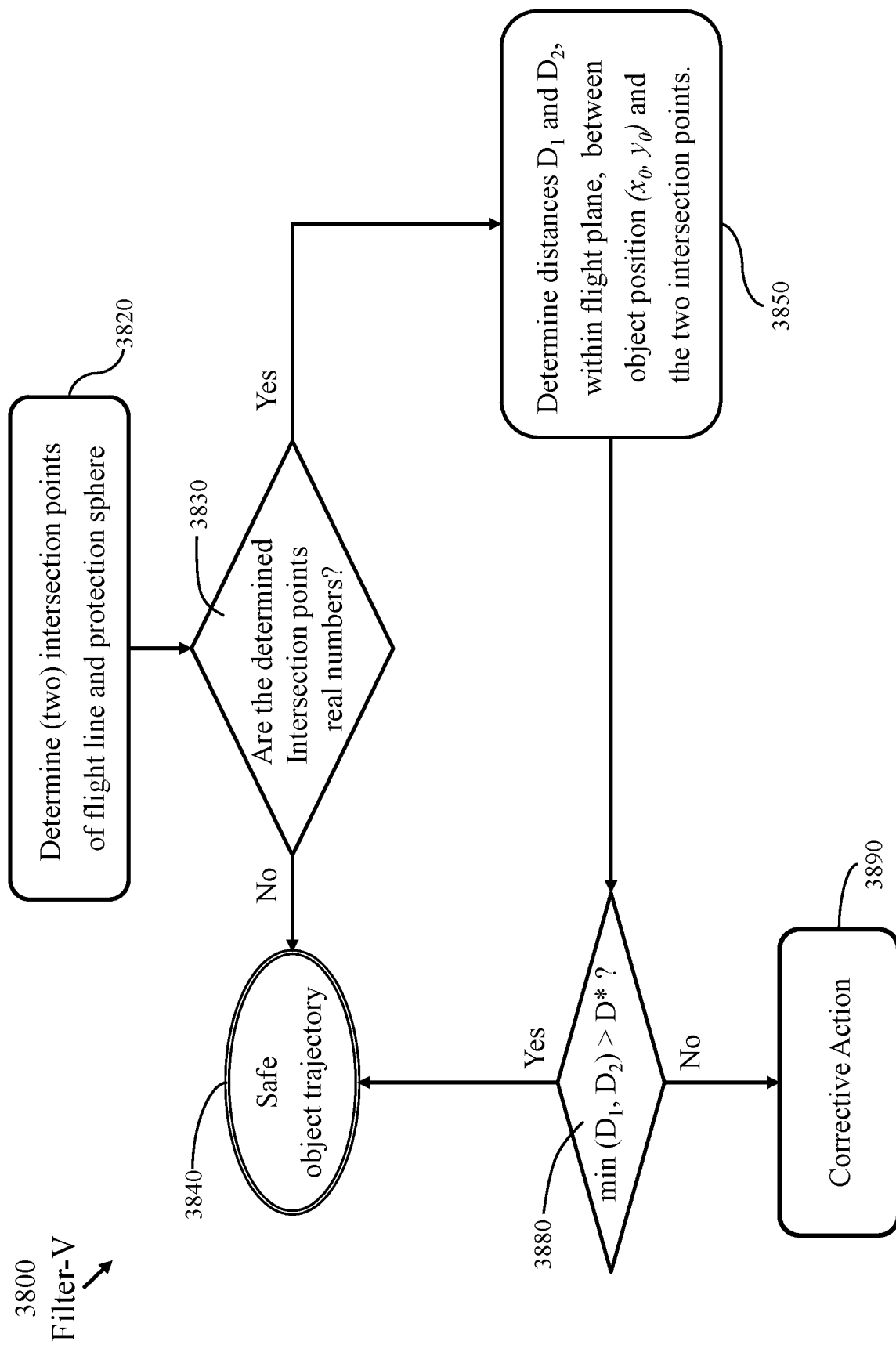
FIG. 38 illustrates an algorithm for implementing a fifth criterion for assessing potential object crossing of the protection zone, in accordance with an embodiment of the present invention.

FIG. 38 illustrates an algorithm 3800 for implementing the criterion of Filter-V.

Process 3820 computes two intersection points (FIG. 29) of coordinates $(x_2, y_2)$ and $(x_3, y_3)$, of object trajectory and circle of intersection of the flight plane and the protection sphere. Process 3830 determines whether the computed intersection points are real numbers Process 3840 indicates a safe object trajectory but revisits application of Filter-I, then possibly Filter-II, etc., to account for changes of the protection zone and changes of the flight path.

Process 3850 determines distances $D_1$ and $D_2$ within flight plane 320 between the object and the two intersection points. Process 3880 determines whether the smaller of the two distances $D_1$ and $D_2$ is larger than the permissible proximity D*. Process 3890 determines a corrective action.

Figure 39:
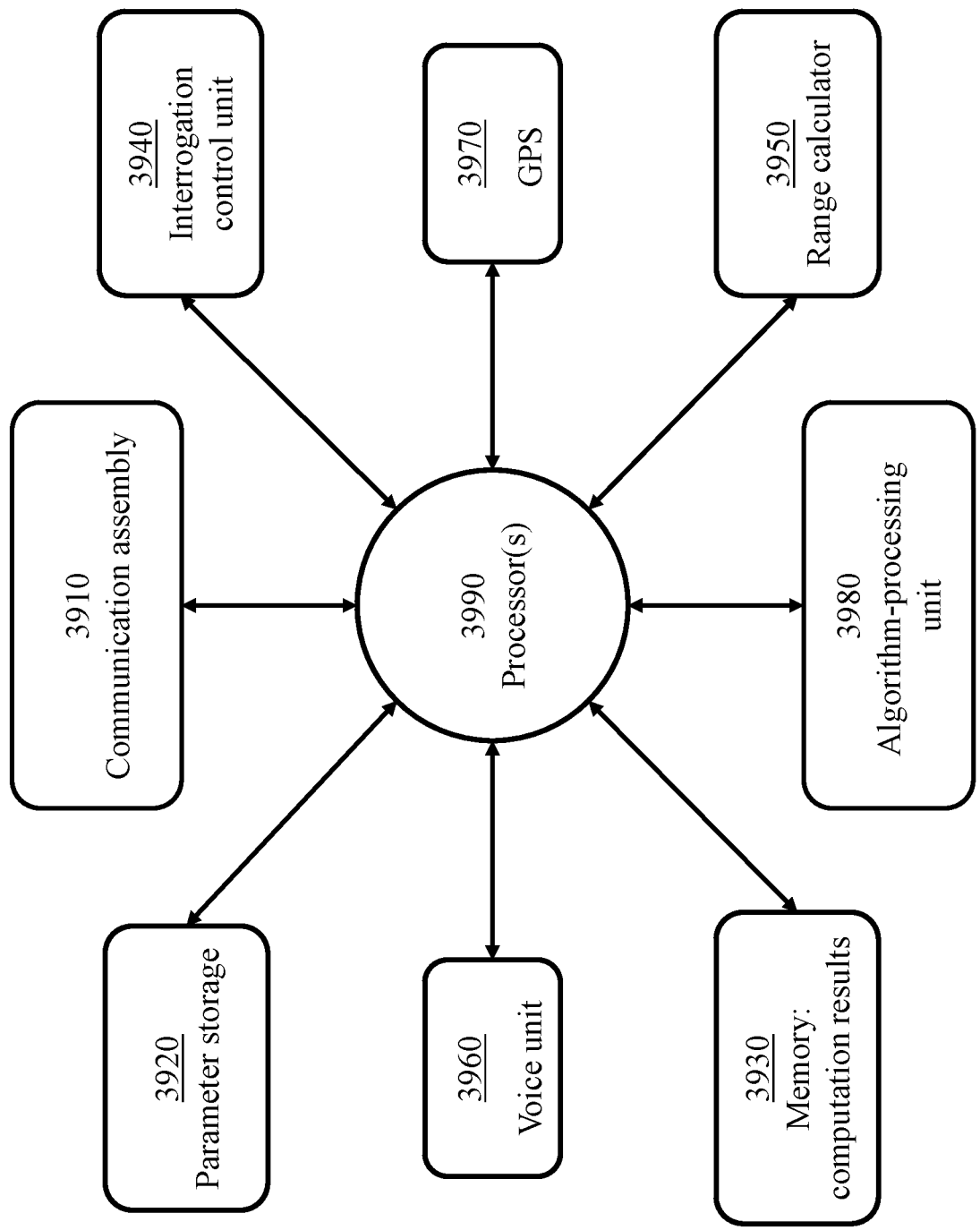
FIG. 39 illustrates an apparatus employed at the GCS, in accordance with an embodiment of the present invention.

FIG. 39 illustrates an apparatus employed at the GCS for implementing the features described above. A processor (or a multiplicity of processors) 3990 is coupled to:
(i) a communication assembly 3910;
(ii) a parameter-storage medium 3920;
(iii) a memory device 3930 for holding computation results;
(iv) an interrogation control unit 3940 which controls the interrogation, including the interrogation power and the pulse repetition frequency (PRF);
(v) a range calculator 3950;
(vi) a voice unit 3960 for monitoring the airband radio 4013;
(vii) a GPS unit 3970 for determining the location of the GCS and accurate timing; and
(viii) an algorithm-processing unit 3980.

Figure 40:
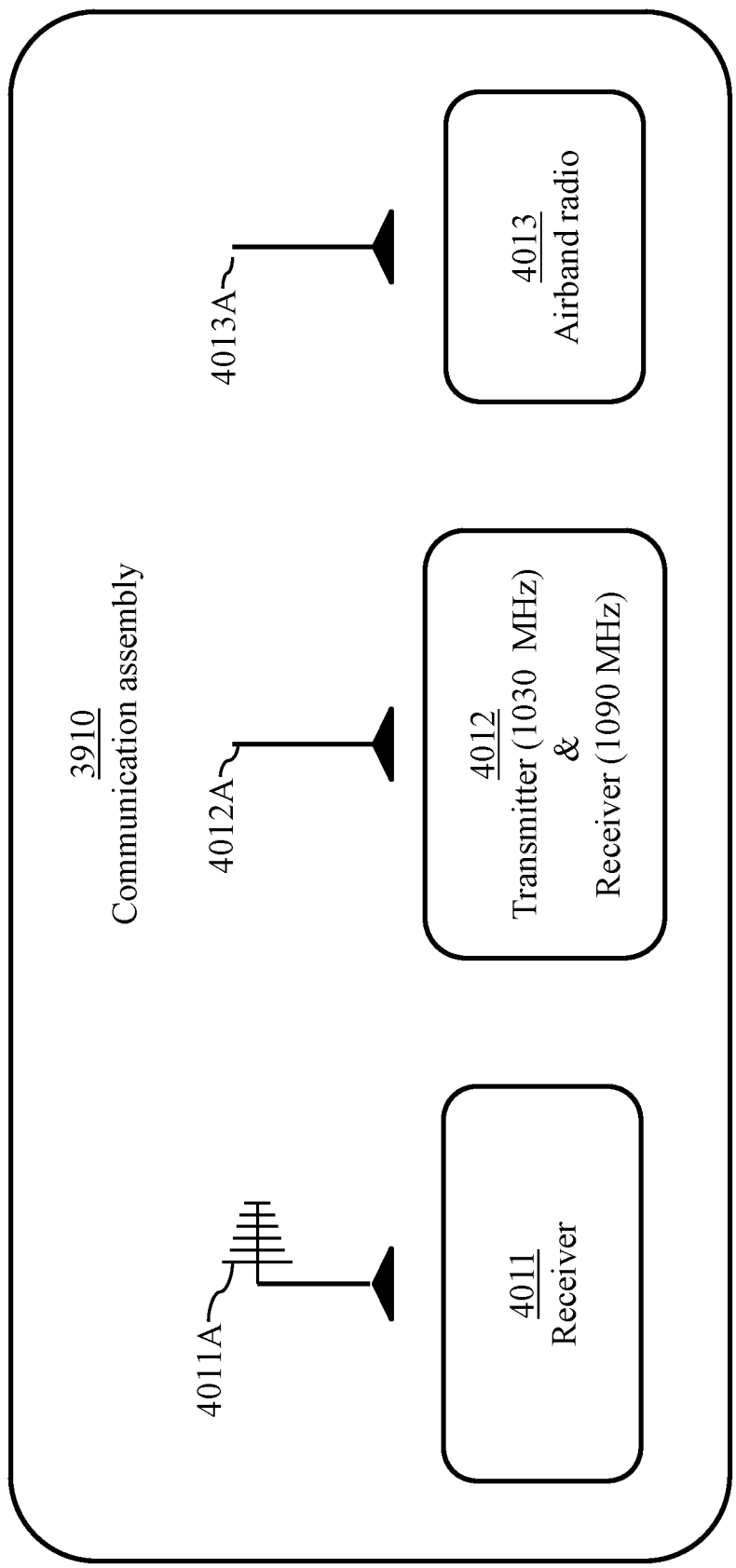
FIG. 40 details the communication assembly of FIG. 39.

FIG. 40 details the communication assembly of FIG. 39. Communication assembly 3910 comprises an interrogation unit 4012, a reply message receiver 4011 having a digitizer, and airband radio 4013 for communicating with a pilot of the flying object. The interrogation unit 4012 and the airband radio 4013 are connected to omni-directional antennas 4012A and 4013A, respectively. The receiver 4011 is connected to a directional antenna 4011A for identifying signal reception direction. An exemplary directional antenna is illustrated in FIG. 13. The receiver 4011 first demodulates the reply message to a baseband signal and then digitizes the baseband signal. The digitized signal is sent to the processor 3990 for decoding and validation. If the signal is valid, the approximate direction of the intruder is determined.

The interrogation control unit 3940 acquires data which enables the range calculator 3950 determines the range of the flying object. The voice unit 3960 automatically contacts the pilot of the flying object through airband radio 4013 to acquire heading information. Identification of the flying object is also obtained. The voice unit 3960 monitors the airband radio 4013 for any incoming voices. It has a voice recognition function and can automatically extract heading information from a voice. Once the heading information is known, the processor 3990 passes the heading information to the algorithm-processing unit for determining the position of the flying object.

Figure 41:
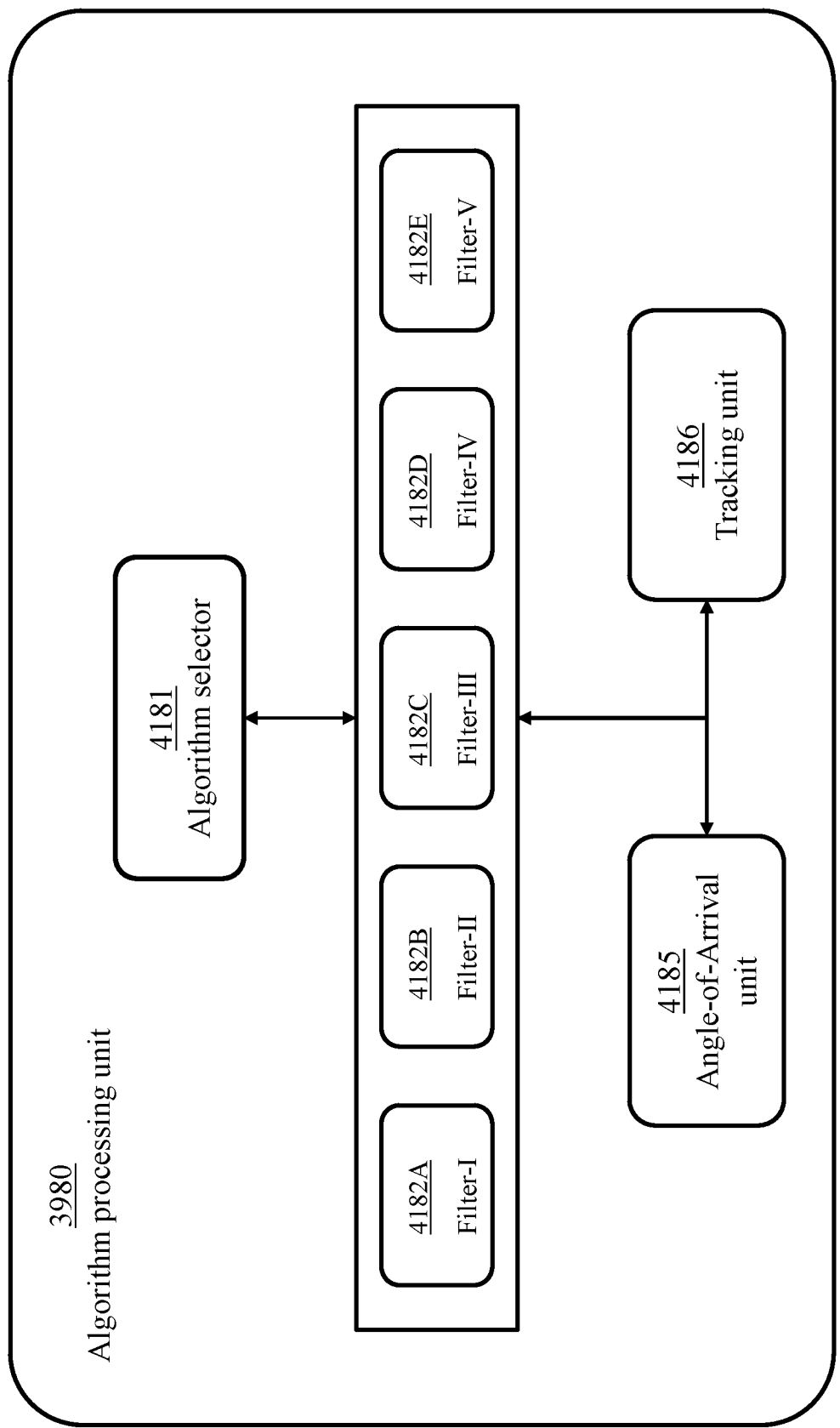
FIG. 41 details the algorithm processing unit of FIG. 39.

FIG. 41 details the algorithm processing unit of FIG. 39. The algorithm processing unit 3980 comprises an algorithm selector 4181 which determines which of the algorithms implementing the five filters (4182A to 4182E) is to be activated. The algorithm selector 4181 progresses from one filter to a subsequent filter as the need arises (FIG. 21). The angle-of-arrival unit 4185 uses the information from the directional antenna 4011A to determine the reception direction of reply messages from the transponder of the flying object. A tracking unit 4186 track the movement of the flying object to enable accurate determination of the position and velocity accuracy. The tracking unit 4186 calculates the time that the flying object enters the protection zone in real time, so that avoidance measures can be taken, depending on the position of the flying object and the UA. If the voice unit 3960 does not identify the voice from the intruder 130 within a certain time period, for example 1 minute, the algorithm selector 4181 invokes the corrective action of FIG. 38.

The safety assessment system described above relies on interrogating a flying object from a ground control station.

An alternative safety assessment system (not shown) may employ a distributed arrangement, where a certain equipment of the ground control station is placed at the ownship.

For example, the interrogation unit 4012, the omni-directional antennas 4012A and 4013A may be placed at the ownship, with the receiver 4011, the directional antenna 4011A, the airband radio 4013, the processor 3990, and the algorithm processing unit 3980 being placed on the ground.

Alternatively, the interrogation unit 4012, the omni-directional antennas 4012A and 4013A, the processor 3990, and the algorithm processing unit 3980 may be placed at the ownship, with the receiver 4011, the directional antenna 4011A, and the airband radio 4013 being placed on the ground.

Yet alternatively, the interrogation unit 4012, the omni-directional antennas 4012A and 4013A, the processor 3990, the algorithm processing unit 3980, the receiver 4011, the directional antenna 4011A, and the airband radio 4013 may be placed at the ownship.

In addition to telecommunication circuitry, hardware processors are employed for implementing the algorithms described above. At least one hardware processor, executes processor-executable instructions to implement the processes described above. Computer executable instructions may be stored in processor-readable storage media such as floppy disks, hard disks, optical disks, Flash ROMS, non-volatile ROM, and RAM. A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A method of determining a position of a flying object, comprising:
    by an omni-directional antenna at a control station, transmitting an interrogation signal;
    by a receiver at the control station, receiving a reply signal from a transponder of the flying object to the interrogation signal, the reply signal including an altitude of the flying object;
    determining a range from the flying object to the control station using a time instance of the transmitting the interrogation signal, a transponder delay, and a time instance of the receiving the reply signal;
    at the control station, determining a heading of the flying object, comprising:
        by an antenna arrangement, determining an angle of arrival of the reply signal; selecting, according to the angle of arrival, one of the two possible paths of the flying object;
    and
    determining the position of the flying object using the range, the altitude, and the heading.

2. The method of claim 1, wherein the control station is one of:
    a ground control station; and
    a control station disposed at an aircraft, wherein the aircraft is one of the unmanned aircraft and piloted aircraft.

3. The method of claim 1 further comprising implementing an avoidance measure to avoid the flying object by an aircraft, comprising:
    selecting a protection volume surrounding the aircraft; and
    provided the altitude of the flying object is between a lowest and highest altitudes of the protection volume:
        determining a minimum time interval for the flying object to reach the protection volume;
    and
        provided the minimum time interval is shorter than a preassigned operational time of the aircraft within the protection volume, implementing the avoidance measure to avoid reaching the protection volume by the flying object.

4. The method of claim 3, wherein the protection volume is at least one of:
    the protection volume which location and size are time varying;
    the protective volume, which is static.

5. The method of claim 3, wherein the protection volume is a sphere.

6. The method of claim 3, further comprising updating coordinates and boundary of the protection volume based on tracking of the aircraft.

7. The method of claim 1,
    further comprising implementing an avoidance measure to avoid the flying object by an aircraft, taking into account the position of the flying object with regard to the aircraft.

8. The method of claim 1, wherein the determining the angle of arrival comprises arranging antennas of the antenna arrangement so as to discriminate between the two possible paths of the flying object.

9. The method of claim 1, wherein the determining the angle of arrival comprises determining the angle of arrival by one of:
    a phase array antenna;
    a mechanically scanned directional antenna (MSDA).

10. The method of claim 1, wherein:
    the determining the angle of arrival comprises determining the angle of arrival by a phase array antenna; and
    arranging elements of the phase array antenna so as to be capable of discriminating between the two possible paths of the flying object.

11. The method of claim 1, wherein the determining the angle of arrival comprises determining the angle of arrival by a phase array antenna having three elements, collocated with the control station and having a predetermined distance between the three elements.

12. The method of claim 11, wherein each of the three elements is an omni-directional antenna coupled to a 1090 MHz receiver, and one of the three elements is also coupled to a 1030 MHz transmitter for transmitting the interrogation signal.

13. An apparatus for determining a position of a flying object, comprising:
    at a control station:
        an omni-directional antenna transmitting an interrogation signal;
            a receiver receiving a reply signal from a transponder of the flying object to the
            interrogation signal, the reply signal including an altitude of the flying object; and
        an antenna arrangement for detecting an angle of arrival of the reply signal;
        a memory device, storing computer executable instructions for execution by a processor causing the processor to determine:
            a range from the flying object to the control station using a time instance of the transmitting the interrogation signal, a transponder delay, and a time instance of the receiving the reply signal;
            a heading of the flying object, comprising selecting, according to the angle of arrival, one of the two possible paths of the flying object; and
            a position of the flying object based on the range, the altitude, and the heading.

14. The apparatus of claim 13, wherein the control station is one of:
    a ground control station; and
    a control station disposed at an aircraft, wherein the aircraft is one of the unmanned aircraft and piloted aircraft.

15. The apparatus of claim 13, wherein the computer executable instructions further cause the processor to:
    select a protection volume surrounding an aircraft;
    provided the altitude of the flying object is between a lowest and highest altitudes of the protection volume:
        determine a minimum time interval for the flying object to reach the protection volume;
    and
        provided the minimum time interval is shorter than a preassigned operational time of the aircraft within the protection volume, implement an avoidance measure to avoid reaching the protection volume by the flying object.

16. The apparatus of claim 15, wherein the computer executable instructions further cause the processor to update coordinates and boundary of the protection volume based on tracking of the aircraft.

17. The apparatus of claim 13, wherein the antenna arrangement comprises a phase array antenna, whose elements are arranged so as to discriminate between the two possible paths of the flying object.

18. The apparatus of claim 13, wherein the antenna arrangement comprises a phase array antenna having three elements, collocated with the control station and having a predetermined distance between the three elements, each of the three elements being an omni-directional antenna coupled to a receiver of the interrogation signal.

19. A system for determining a position of a flying object, comprising:

at a control station:
an omni-directional antenna transmitting an interrogation signal;
   a receiver receiving a reply signal from a transponder of the flying object to the interrogation
   signal, the reply signal including an altitude of the flying object; and
an antenna arrangement for determining an angle of arrival of the reply signal;

a processor;
a memory device having computer executable instructions stored thereon for execution by the processor, causing the processor to determine;
   a range from the flying object to the control station using a time instance of the transmitting the interrogation signal, a transponder delay, and a time instance of the receiving the reply signal;
   a heading of the flying object, comprising choosing, using the angle of arrival, one of the two possible paths of the flying object; and
the position of the flying object based on the range, the altitude, and the heading.

20. The system of claim 19, wherein the computer executable instructions further cause the processor to implement an avoidance measure to avoid the flying object by an aircraft, taking into account the position of the flying object relative to the aircraft.

* * * * *